United States Patent [19]
Akamatsu et al.

[11] Patent Number: 6,052,297
[45] Date of Patent: Apr. 18, 2000

[54] POWER CONVERSION APPARATUS

[75] Inventors: Masahiko Akamatsu; Michiharu Tsukada; Daisuke Itoh; Shinzo Tamai, all of Tokyo, Japan

[73] Assignee: Mitsubishi Denki Kabushiki Kaisha, Tokyo, Japan

[21] Appl. No.: 09/305,295

[22] Filed: May 5, 1999

[30] Foreign Application Priority Data

| May 6, 1998 | [JP] | Japan | 10-123707 |
| Jul. 31, 1998 | [JP] | Japan | 10-218303 |
| Dec. 21, 1998 | [JP] | Japan | 10-363261 |

[51] Int. Cl.[7] ............................................. H02M 5/42
[52] U.S. Cl. ............................................. 363/84; 363/50
[58] Field of Search ................... 363/50, 39, 71, 363/95, 84

[56] References Cited

U.S. PATENT DOCUMENTS

| 5,191,519 | 3/1993 | Kawakami | 363/71 |
| 5,504,404 | 4/1996 | Tamaki et al. | 318/432 |

OTHER PUBLICATIONS

Jiang et al., "Applying PWM To Control Overcurrents At Unbalanced Faults Of Force–Commutated VSCs Used As Static Var Compensators", IEEE Transactions on Power Delivery, vol. 12, No. 1, Jan. 1997, pp. 273–278.

Murakami et al., "Development Of An SVG Series For Voltage Control Over Three–Phase Unbalance Caused By Railway Load", Proceedings of the 1995 International Power Electronics Conference, Apr. 1995, pp. 603–608.

*Primary Examiner*—Shawn Riley
*Attorney, Agent, or Firm*—Leydig, Voit & Mayer, Ltd.

[57] ABSTRACT

A power conversion apparatus includes a current component control section which outputs q axis and d axis negative-sequence components and q axis and d axis positive-sequence components based on a detected current value or a voltage value, a current component control which compares a current component with the current instruction value from an instruction value generator and outputs to an adder/subtractor the result, a converter converting a control signal output from the adder/subtractor into three-phase components, and an adder adding these three-phase components to respective phases and outputting the result to a power conversion section.

17 Claims, 25 Drawing Sheets

POWER CONVERSION APPARATUS

BACKGROUND OF THE INVENTION

The present invention relates to a power conversion apparatus which is connected between, for example, a first three-phase alternating current power system, for example, a second direct current power system and which has a power conversion section (or a power converter circuit) including switching elements power between the first power system and the second power system.

DESCRIPTION OF RELATED ART

FIG. 1 shows a conventional power conversion apparatus such as disclosed in for example "Applying PWM to Control Overcurrents at Unbalanced Faults of Force-Commutated VSCs Used as Static Compensators" by Jiang et. al. which was published in IEEE Transactions on Power Delivery, Vol. 12, No. 1 at pages 273–278, January 1997. In the diagram, 1 is an three-phase alternating current (hereafter "AC") power system connected to the disclosed power converter, 2 is a transformer comprising a primary winding 3 and a secondary winding 4a, 4b, 5 is a power conversion section which converts the power between direct and alternating currents based on PWM (Pulse Width Modulation) using switch elements 5a, 5b such as a GTO (Gate Turn-Off Thyristor), 6 is a direct current capacitor, 7 is a voltage value detection means which detects the value of a voltage in a connected line which connects the transformer 2 to the AC power system, 8 is a current value detection means which detects the current in a connected line, 100 is a control section which controls the power conversion section 5 based on a detected value from the voltage value detection means 7 and the current value detection means 8.

In the control section 100, 9 is an operation means which calculates the values Vnd, Vnq in a synchronous rotary coordinate system (d,q) of a negative-sequence component of the voltage of the AC power system 1 from the voltage value of each phase detected by the voltage value detection means. 10 is an operation means which calculates the values Vpd, Vpq in a synchronous rotary coordinate system (or a synchronous rotating reference frame) of a positive-sequence component of the voltage of the AC power system 1 from the voltage value of each phase detected by the voltage value detection means 7. 11 is an operation means which calculates the q axial component Ipq in a synchronous rotary coordinate system of a positive-sequence component of the current output from the AC power system 1 (or the current input into the AC power system 1) from the value for the current of each phase detected by the current value detection means 8. 12a is a subtraction means which calculates the difference of a desired current reference value Ipqref and the output Ipq of the operation means 11. 13a is a parameter means which multiplies the parameter R corresponding to a fixed resistance with the desired current reference value Ipqref. 12b is a subtraction means which calculates the deviation of the output Vpq of the operation means 10 and the output of the parameter means 13a and outputs the result as a voltage instruction value Vpqi.

13b is a parameter means which multiplies the parameter X corresponding to a fixed reactance with the desired current reference value Ipqref. 14 is a proportional integral regulator. 12c is an addition means which calculates the sum of the output Vpd of the operation means 10, the output of the parameter means 13b and the output of the proportional integral regulator 14.

15 of an operation means which calculates a control signal Va, Vb, Vc for each phase based on the voltage instruction value Vpdi, Vpqi and the negative-sequence voltage component Vnd, Vnq and outputs it to the power conversion section 5 which has switching elements 5a, 5b. The voltage instruction value Vpdi, Vpqi is a value on synchronous rotatory coordinates of the positive-sequence component which is generated by the power conversion section 5 in order to regulate the q axial component of the positive phase of the current output by the AC power system 1. By calculating these values and the values Vnd, Vnq on synchronous rotary coordinates of the negative-sequence component, each phase voltage instruction value Va, Vb, Vc on the stator coordinate is calculated.

The operation of the invention will now be explained.

The operation means 9 calculates the negative-sequence component of the voltage of the AC power system 1 as values Vnd, Vnq on the synchronous rotatory coordinate system (d, q) from the detected value of the voltage value detection means 7 and outputs these values to the operation means 15. The operation means 10 calculates the positive-sequence component of the voltage of the AC power system 1 as values Vpd, Vpq on the synchronous rotary coordinate system from the detected value of the voltage value detection means 7 and outputs the d axial component Vpd to the addition means 12c and the q axial component Vpq to the subtraction means 12b.

The operation means 11 calculates the q axial component Ipq on the synchronous rotary coordinate system of the positive-sequence component in the line between the transformer 2 and the AC power system 1. It outputs the value to the subtraction means 12a. The subtraction means 12a calculates the deviation of the desired current reference value Ipqref and the output Ipq of the operation means 11 and outputs it to the proportional integral regulator 14. The proportional integral regulator 14 outputs the sum of the multiple of the value from the subtraction means 12a with the fixed proportional parameter and the multiple of the integral of that first calculated value with the fixed integral parameter, to the addition means 12c.

The subtraction means 12b calculates the deviation of the output Vpq of the operation means 10 and the output of the parameter means 13a and outputs the resulting value to the operation means 15 as a voltage instruction value Vpqi. The addition means 12c calculates the sum of the output Vpd of the operation means 10, the output of the parameter means 13b and the output of the proportional integral regulator 14 and outputs the resulting value to the operation means as a voltage instruction value Vpqi.

The operation means 15 calculates each phase instruction signal Va, Vb, Vc based on the negative-sequence voltage component Vnd, Vnq and the voltage instruction value Vpdi, Vpqi and outputs the resulting value to the switching elements 5a, 5b of the power conversion section 5. The power conversion section 5 operates the switching depending on the control signals and transduces the power. At this time, the power conversion section 5 generates a voltage which is proportional to the input signals Va, Vb, Vc.

By this type of operation, the voltage of the AC power system 1 is in a state of unbalance. When negative-sequence voltage Vnd, Vnq is generated in the AC power system 1, the power conversion section 5 is controlled so that a negative-sequence voltage is generated which is equal to the negative-sequence voltage Vnd, Vnq generated by the power conversion section 5. When the negative-sequence voltage generated by the power conversion section 5 is equal to the negative-sequence voltage of the AC power system 1, a negative-sequence current does not flow.

Since a multi-phase AC power system is often not in balance, it is necessary as above to control and supervise the multi-phase AC power system so that such unbalanced states do not occur. For example, when the load is unbalanced, it is necessary to balance the current of the power system. It is also necessary to control and supervise the power system in normal conditions in order to suppress extremely unbalanced states which are generated by faults in the power system.

Devices which perform supervision and control of multi-phase AC power systems are disclosed, for example, in "Development of Self-Excitation SVC Control Method with Compensation Functions" in Yamamoto et. al. published in the Institute of Electrical Engineers, Lecture Number 604, March 1993.

FIG. 2 is a block diagram showing for example a conventional synchronous rotary coordinate conversion apparatus as disclosed in: "Development of Self-Excitation SVC Control Method with Compensation Functions". In the diagram, 201 is a three-phase to two-phase conversion section which converts three-phase AC signals Xa, Xb, Xc, which are three-phase voltage signals Va, Vb, Vc or three-phase current signals Ia, Ib, Ic, to two-phase signals Xα, Xβ, which are two-phase voltage signals Vα, Vβ or two-phase current signals Iα, Iβ. 202 is a synchronous rotary coordinate conversion apparatus which supplies a voltage phase θ of the power system and which converts a two-phase AC signal Xα, Xβ to the signal Xpdo, Xpqo in the positive-sequence component in a synchronous rotary coordinate which is synchronized with the phase θ. 203 is a synchronous rotary coordinate conversion apparatus which supplies a voltage phase θ of the power system and which converts a two-phase AC signal Xα, Xβ to the signal Xndo, Xnqo in the negative-sequence component in a synchronous rotary coordinate which is synchronized with the phase (−θ). The gain of the three-phase to two-phase conversion section 201 and the synchronous rotary coordinate conversion apparatus 202, 203 are set to 1.

The operation of the invention will now be explained.

FIG. 3 is a block diagram showing a conversion section which converts an instruction value Xndr, Xnqr, which corresponds to a signal in a negative-sequence component in a synchronous rotary coordinate system, and an instruction value Xpdr, Xpqr, which corresponds to a signal in a positive-sequence component in a synchronous rotary coordinate system, to three-phase AC signal. FIGS. 4(A)–4(B) show the instruction signals Xpdr, Xpqr, Xndr, Xnqr supplied to the conversion section in FIG. 3 and the output signals Xpdo, Xpqo, Xndo, Xnqo which are the outputs obtained by applying the three-phase AC signals Xa, Xb, Xc, which are the outputs of the conversion section in FIG. 3, to the three-phase to two-phase conversion section and the synchronous rotary coordinate conversion section in FIG. 2. That is to say they are the output signals of positive and negative-sequence component in the synchronous rotary coordinate system.

Three-phase AC signals Xa, Xb, Xc, which are three-phase voltage signals Va, Vb, Vc or three-phase current signals Ia, Ib, Ic, are converted to two-phase AC signals Xα, Xβ which are two-phase voltage signals Vα, Vβ or two-phase current signals Iα, Iβ by the three-phase to two-phase conversion section 201. The two-phase AC signals Xα, Xβ are converted to Xpdo, Xpqo signals in the positive-sequence component in a synchronous rotary coordinate system. The two-phase AC signals Xα, Xβ are converted to Xndo, Xnqo signals in the negative-sequence component in a synchronous rotary coordinate system.

In this way, three-phase AC signals are converted to signals in the negative-sequence component and positive-sequence component in a synchronous rotary coordinate.

At this point, the fixed instruction signals Xpdr, Xpqr which correspond to the positive-sequence component in a synchronous rotary coordinate and the fixed instruction signals Xndr, Xnqr which correspond to the negative-sequence component in a synchronous rotary coordinate are converted to the three-phase AC signals depending on a transformation matrix Cr. When that three-phase signal has been converted to a Xpdo, Xpqo, Xndo, Xnqo signal in the negative and positive-sequence component in a synchronous rotatory coordinate system by the three-phase to two-phase conversion section 201 and the synchronous rotatory coordinate conversion section 202, 203, the instruction values Xpdr, Xpqr, Xndr, Xnqr and the signal values Xpdo, Xpqo, Xndo, Xnqo after conversion are as shown in FIGS. 4(A)–4(B).

The relationship between the instruction value at this time Xpr, Xnr and the signals Xpo, Xno after conversion are shown by the formula (1).

$$\begin{pmatrix} Xpo \\ Xno \end{pmatrix} = \begin{pmatrix} C(\theta) \\ C(-\theta) \end{pmatrix} ( C(-\theta) \quad C(\theta) ) \begin{pmatrix} Xpr \\ Xnr \end{pmatrix} \qquad (1)$$

$$= \begin{pmatrix} Xpr + C(2\theta)Xnr \\ Xnr + C(-2\theta)Xpr \end{pmatrix}$$

where $$C(\theta) = \begin{pmatrix} \cos\theta & \sin\theta \\ -\sin\theta & \cos\theta \end{pmatrix}, \quad C(-\theta) = \begin{pmatrix} \cos\theta & -\sin\theta \\ \sin\theta & \cos\theta \end{pmatrix}$$

$$C(2\theta) = C(\theta)C(\theta) = \begin{pmatrix} \cos 2\theta & \sin 2\theta \\ -\sin 2\theta & \cos 2\theta \end{pmatrix},$$

$$C(-2\theta) = C(-\theta)C(-\theta) = \begin{pmatrix} \cos 2\theta & -\sin 2\theta \\ \sin 2\theta & \cos 2\theta \end{pmatrix}$$

The matrix C (θ) is a transformation matrix used by the synchronous rotatory coordinate conversion section 202, and the matrix C (−θ) is a transformation matrix used by the synchronous rotatory coordinate conversion section 203. The matrices C (θ) and C (−θ) are mutually opposite sequences. Furthermore in Formula (1), the three-phase to two-phase converter and the two-phase to three-phase converter has been omitted.

In FIGS. 4(A)–4(B), the instruction value Xpdr which corresponds to the positive-sequence component in a d axis is set to a value 10 of up to 150 msec. After that time, it is set to a value 9. The instruction value Xpqr which corresponds to the positive-sequence component of the q axis is set up to the value 1 of 130 msec. After that time, it is set to value −1 of up to 180 msec and then set to the value 1. The instruction value Xndr which corresponds to the negative-sequence component of the d axis is set to the value 1 of up to 110 msec and then is set to the value −1 of up to 160 msec and then set to the value −1. The instruction value Xnqr which corresponds to the negative-sequence component of the q axis is set to the value −1 of up to 140 msec, after that is set to the value 1 of up to 190 msec and after that is set to the value −1.

Since the conventional power converter is constituted as shown above, the proportional relationship between the voltage instruction value and the value of the fundamental wave component of the voltage which the power conversion section 5 actually generates is adversely affected and control accuracy is insufficient when the PMW modulation signal, which is sent to the switching elements 5a, 5b, is operated at a low frequency due to switching loss generated by the power conversion section 5. Furthermore the PWM modulating signal is generated based on the size relationship between the voltage instruction value and the fixed frequency triangular wave carrier. However when the voltage instruction value exceeds an amplitude of the triangular wave carrier, that is to say when the degree of modulation exceeds a value of 1, the above proportional relationship is adversely affected. Furthermore the output voltage from the power conversion section 5 may diverge from the value indicated by the voltage instruction value due to various errors such as instantaneous value errors due to control errors, operation errors, detection errors and time delays. Therefore negative-sequence current flows in spite of such negative-sequence current being suppressed when the system is in an unbalanced state.

When the voltage of the power system is in an unbalanced state, the problem has arisen that it is difficult improve power conversion in the power system by the power conversion section as a result of the above problems. That is to say, if the voltage of the power system is in an unbalanced state, as in the conventional device, when the negative-sequence voltage generated by the power conversion section 5 is calculated based only on the negative-sequence voltage, the negative-sequence voltage generated by the power conversion section 5 will diverge from the negative-sequence voltage generated by the power system for one of the above reasons. Thus the problem arises that it is difficult to adequately suppress the generation of negative-sequence voltage.

When Xpdr, Xpqr, Xndr, Xnqr signals in the fixed negative and positive-sequence component in a synchronous rotatory coordinate system which have been converted to three-phase AC signals are supplied to a synchronous rotatory coordinate device, as shown in FIGS. 4(A)–4(B) and Formula (1), the pulsation component (C(2θ).Xnr) of the twice-frequency of the power system are mixed with the output of the synchronous rotatory coordinate conversion device. Thus the problem has arisen that it is difficult to accurately perform control of the power system.

For example, as shown in FIGS. 4(A)–4(B) when only the value of the positive-sequence component is large, the pulsation component is large relative to the value of the negative-sequence component and it is difficult to detect the value of the negative-sequence component value accurately.

SUMMARY OF THE INVENTION

The present invention is proposed to solve the above conventional drawbacks and has the object of providing an power converter apparatus which improves the power conversion between components in an power system even when the voltage of the power system is in an unbalanced state.

A power conversion apparatus according to a preferred embodiment of the present invention which converts power between a first AC power system handling an alternating current power with multiple-phase and a second power system by using a power converter circuit connected between AC terminals of said first AC power system and terminals of second power system. The power conversion apparatus comprises current detecting means which detects an AC current of each phase of an AC line connected between the AC terminals of said power converter circuit and the AC terminals of said first AC power system for detecting the AC current of input from said first AC power system into said power converter circuit or of output from said power converter circuit into said first AC power system, first coordinate transformation means which transforms the value of said AC current detected from the value on stationary reference frame into value of first d-q axes component on synchronously rotating reference frame of positive-sequence, second coordinate transformation means which transforms the value of negative-sequence component of said AC current detected from the value on stationary reference frame into value of second d-q axes component of negative-sequence on synchronously rotating reference frame of negative-sequence, first current control means which controls said value of the first d-q axes component on the synchronously rotating reference frame of the positive-sequence by comparing said value of the first d-q axes component and a value of positive-sequence component command, second current control means which controls said value of the second d-q axes component of the negative-sequence on the synchronously rotating reference frame of the negative-sequence by comparing said value of the second d-q axes component and a value of negative-sequence component command including nothing, and control signal generating means which generates a control signal to control said power converter circuit on the basis of the output of said first current control means and the output of said second current control means. In the power conversion apparatus, positive-sequence component of said detected AC current being controlled with higher speed and negative-sequence component of said detected AC current being controlled with at least lower speed.

A power conversion apparatus according to another preferred embodiment further comprises eliminating means having an input from the output of said second coordinate transformation means for decreasing a twice-frequency component which is proportional to the positive-sequence component of said AC current detected and which being mixed with the negative-sequence component in the output of said second coordinate transformation means. In the power conversion apparatus, by the operation of said eliminating means, the twice-sequence component proportioned to the positive-sequence component of said detected AC current is decreased and the negative-sequence component in the output of said second coordinate transformation means is selectively obtained.

In the power conversion apparatus according to another preferred embodiment, said eliminating means consists of moving average calculating means which calculates a moving average value of the output of said second coordinate transformation means in response to moving time interval with time interval of half cycle of said first AC power system.

In the power conversion apparatus according to another preferred embodiment, said eliminating means comprises single or plural signal delaying means which delay the output of said second coordinate transformation means; and adding means which adds the delayed output of said signal delaying means and said output of said second coordinate transformation means or adds the delayed outputs of said signal delaying means.

In the power conversion apparatus according to another preferred embodiment, said second coordinate transformation means comprises first calculating means for obtaining negative-sequence component of said AC current detected on stationary reference frame, and second calculating means for transforming the value of the negative-sequence component obtained by said first calculating means into values of the second d-q axes component of the negative-sequence on the synchronously rotating reference frame of the negative-sequence.

In the power conversion apparatus according to another preferred embodiment, said control signal generating means having a vector rotating means which rotates the first vector of the output of said first current control means and rotates the second vector of the output of said second current control means for generating said control signal to control said power converter circuit on the basis of said first and second vectors.

In the power conversion apparatus according to another preferred embodiment, said negative-sequence component command being designated to zero value.

The power conversion apparatus according to another preferred embodiment, further comprises AC voltage detecting means which detects AC voltage of AC lines of said first AC power system, third coordinate transformation means which transforms the value of said AC voltage detected from the value on stationery reference frame into value of third d-q axes component on the synchronously rotating reference frame of the positive-sequence, and voltage feed-forward means which adds the output vector of said third coordinate transformation means and the output vector of said first current control means. In the power conversion apparatus, a fluctuation of said AC current occurred to changing of the AC voltage of said first AC power system can be decreased.

In the power conversion apparatus according to another preferred embodiment, said second power system consists of DC power system. In addition to this, the power conversion apparatus further comprises DC current detecting means which detects DC current of DC line connecting said DC power system and said power converter circuit, DC voltage detecting means which detects DC voltage of DC line connecting said DC power system and said power converter circuit, and command generating means which generates at least said positive-sequence component command on the basis of one of following voltages, said DC current detected and said DC voltage detected, said DC current detected, and said DC voltage detected.

The power conversion apparatus according to another preferred embodiment, further comprises AC variable detecting means which detects AC voltage and/or AC current, and/or AC power of AC line of said AC power system or AC line connecting between AC terminals of said power converter circuit and AC terminals of said first AC power system, and command generating means which generates at least said positive-sequence component command on the basis of AC variables detected.

The power conversion apparatus according to another preferred embodiment which converts powers between a first AC power system handling an alternating current power with multiple-phase and a second power system by using a power converter circuit comprising switching means connected between AC terminals of said first AC power system and terminals of second power system. In the power conversion apparatus said power conversion apparatus comprises current detecting means which detects an AC current of each phase of an AC line connected between the AC terminals of said power converter circuit and the AC terminals of said first AC power system for detecting the AC current of input from said first AC power system into said power converter circuit or of output from said power converter circuit into said first AC power system, calculating and transformation means for calculating positive-sequence component and negative-sequence component of the AC current in said first AC power system on the basis of the value of the AC current detected by said current detecting means, for transforming the value of each of the positive-sequence component and the negative-sequence component into values of d-q axes component of the positive-sequence component and the negative-sequence on the synchronously rotating reference frame of each of the positive-sequence and the negative-sequence, first current control means which controls the value of the d-q axes component on the synchronously rotating reference frame of the positive-sequence by comparing the value of the d-q axes component with a value of positive-sequence component command, second current control means which controls the value of the d-q axes component on the synchronously rotating reference frame of the negative-sequence by comparing the value of the d-q axes component with a value of negative-sequence component command, control signal generating means having a vector rotating means which rotates, in opposite direction, a first vector and a second vector that are obtained based on the comparison result of the d-q axes component on the synchronously rotating reference frame of the positive-sequence and the negative-sequence, respectively, by a phase to be changed corresponding to a predetermined angular velocity, and then for generating a control signal to control said power converter circuit on the basis of the rotation results.

In the power conversion apparatus according to another preferred embodiment, said negative-sequence component command being designated to zero value.

BRIEF DESCRIPTION OF THE DRAWINGS

These and other objects, features, aspects and advantages of the present invention will become more apparent from the following detailed description of the present invention when taken in conjunction with the accompanying drawings in which.

EMBODIMENTS OF THE INVENTION

Other features of this invention will become apparent through the following description of preferred embodiments which are given for illustration of the invention and are not intended to be limiting thereof.

First Embodiment

Figure 5:
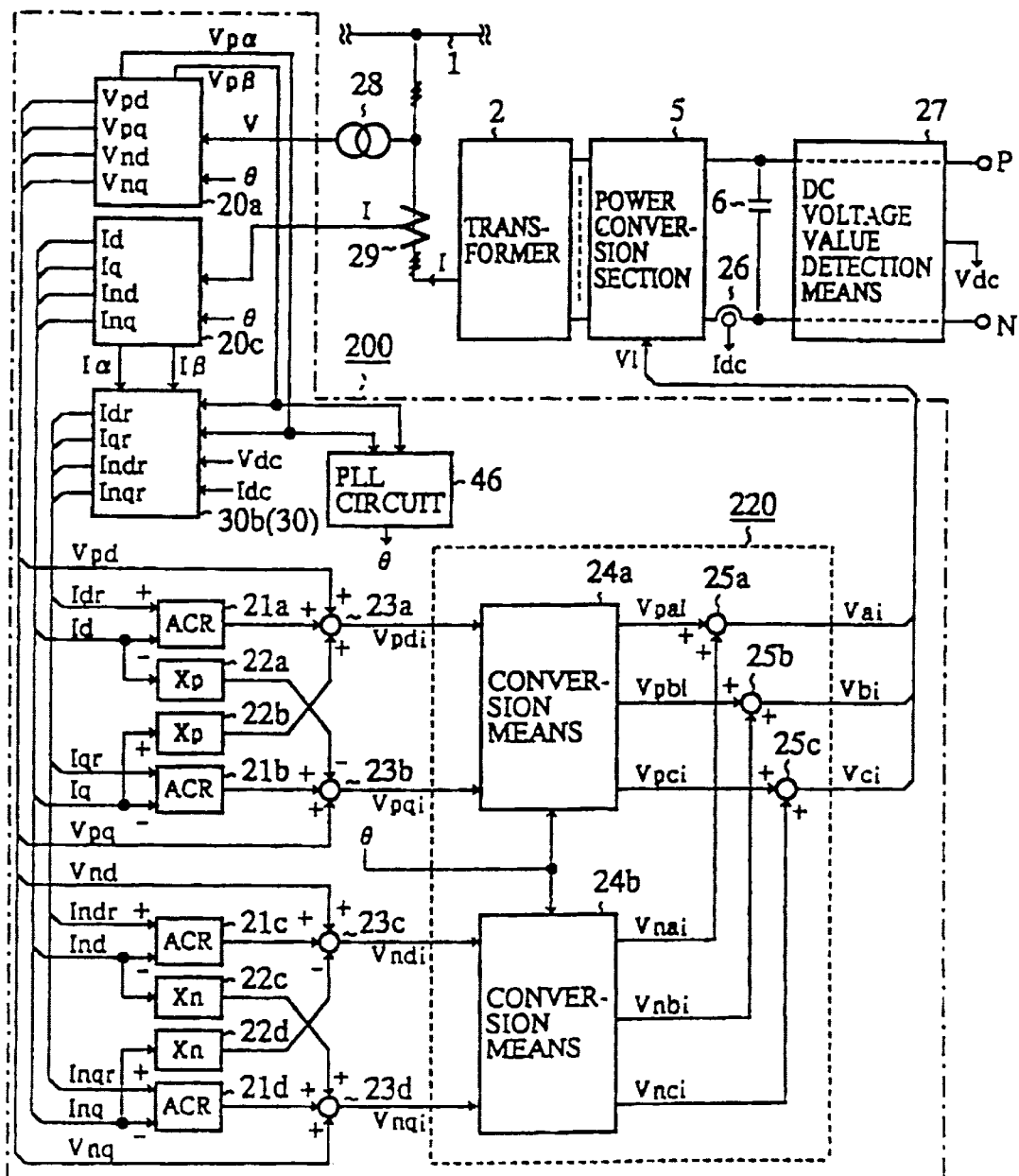
FIG. 5 is a diagram showing a configuration of a power conversion apparatus according to a first embodiment of the present invention.

FIG. 5 is a schematic representation of a power conversion apparatus according to a first embodiment of the present invention. In the figure, 20c is a third operation means which supplies an AC value I detected by the current value detection means 29 and which calculates a d axis current Id and a q axis current Iq in a positive-sequence component in a synchronous rotatory coordinate system as a synchronous rotating reference frame wherein all current values are taken to be positive-sequence components without making a distinction between negative-sequence components and positive-sequence components in an alternating current. The operation means 20c also calculates a d axis current Ind and a q axis current Inq in a negative-sequence component in a synchronous rotatory coordinate system as a synchronous rotating reference frame. The third operation means 20c calculates the αβ axis current Iα, Iβ in the same way without making a distinction between positive and negative-sequence components and supplies it to the instruction value generation means 30b.

30b is the instruction value generation means as a control signal generation means which generates a d axis current Idr and a q axis current Iqr in a positive-sequence component in a synchronous rotatory coordinate system with respect to a d axis current Id and a q axis current Iq in a positive-sequence component in a synchronous rotatory coordinate which is generated by the third operation means 20c taking values to be positive-sequence components and not making the distinction between positive and negative-sequence components. The instruction value generation means 30b also generates a d axis current instruction value Indr and a q axis current instruction value Inqr which correspond to a d axis current Ind and a q axis current Inq in a negative-sequence component in a synchronous rotatory coordinate system.

The other components of the operation means 20a are the same as those shown in seventh embodiment to be explained below and will not be discussed here. The term "take to be a positive-sequence component" means is defined as not considering the negative-sequence component which is actually contained in the twice-frequency pulsating components which are actually affected by negative-sequence components. Thus no particular error is generated in the values of the d axial component and the q axial component of the positive-sequence component synchronous rotatory coordinate which is actually contained in currents which are taken to be positive-sequence components. Thus the influence of the negative-sequence components is simply mixed (the same meaning is taken below).

Figure 6:
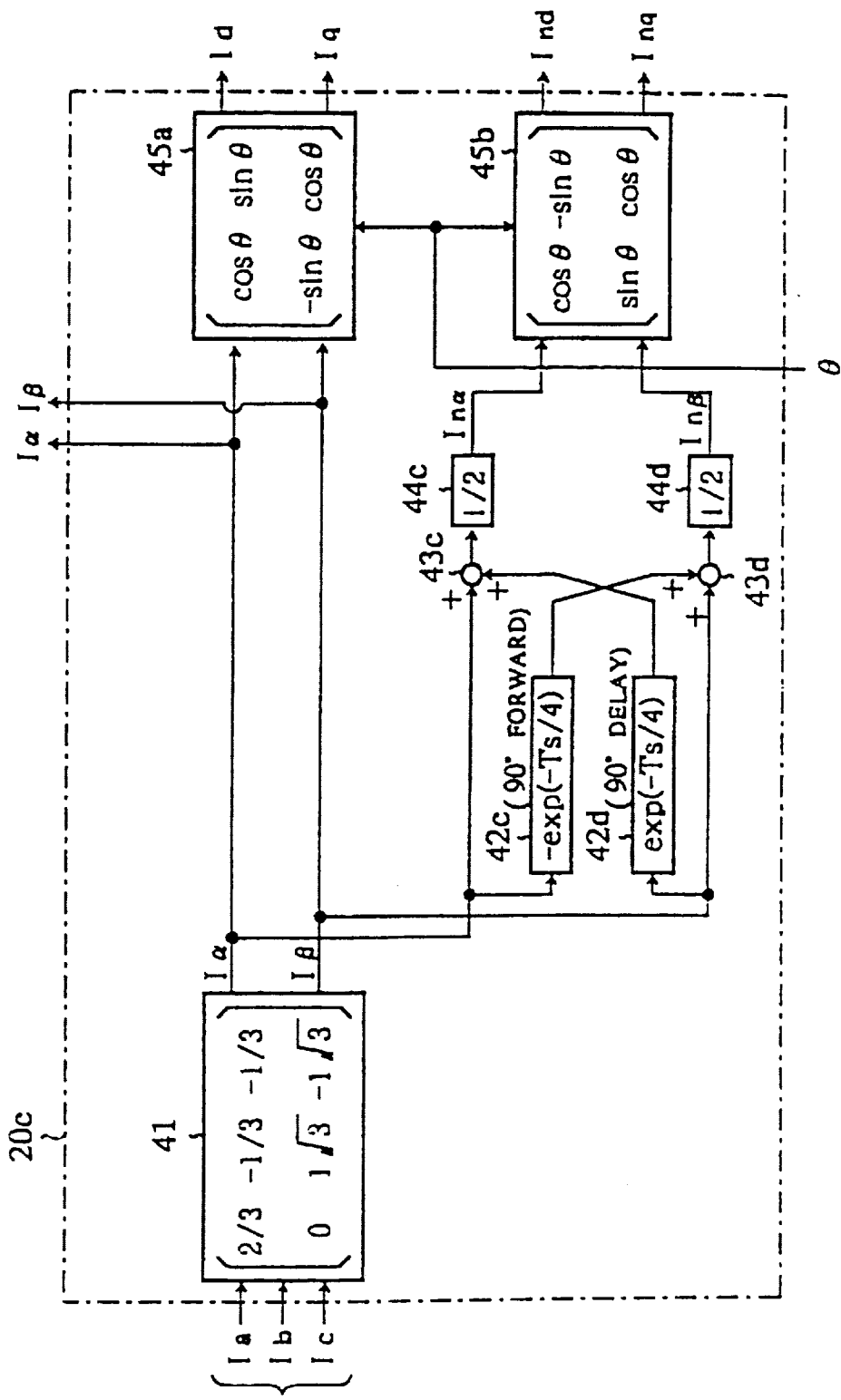
FIG. 6 is a diagram showing a configuration of the detailed structure of a third operation means.

FIG. 6 shows the detailed components of a third operation means 20c. In the third operation means 20c, the circuit which calculates the current value Ind, Inq (the phase shifter 42c, 42d, the addition means 43c, 43d, the parameter means 44c, 44d and the vector rotating means 45b) is the same as that shown in FIG. 21. In the third operation means 20c, the phase shifter 42a, 42b, the addition means 43a, 43b, the parameter means 44a, 44b which calculate the positive-sequence component of the current value as shown in FIG.

21 are omitted. Therefore the output of the three/two-phase converting means 41 is output as Iα, Iβ and directly supplied to the vector rotating means 45a.

That is to say, the α axial current Iα and the β axial current Iβ are taken to be positive-sequence currents and supplied to the vector rotating means 45a. The vector rotating means 45a converts the coordinates of these values to values of a positive-sequence component in a synchronous rotatory coordinate system and calculates the d axis current Id and the q axis current Iq in a positive sequence direction of the synchronous rotatory coordinate system.

Even if all components are taken to be positive-sequence without making a distinction between positive and negative-sequence components, normally since there are few negative-sequence components, it is possible to suppress it with only proportional gain, and thus there is no particular problem. Furthermore negative-sequence components are accurately suppressed by their control and separation. That is to say, since it is possible to perform control so that the negative-sequence components of the current Ind, Inq are calculated and the negative-sequence current becomes zero, no problem is generated by taking the a axis current Iα and the β axis current Iβ to be composed entirely of positive-sequence components.

Figure 7:
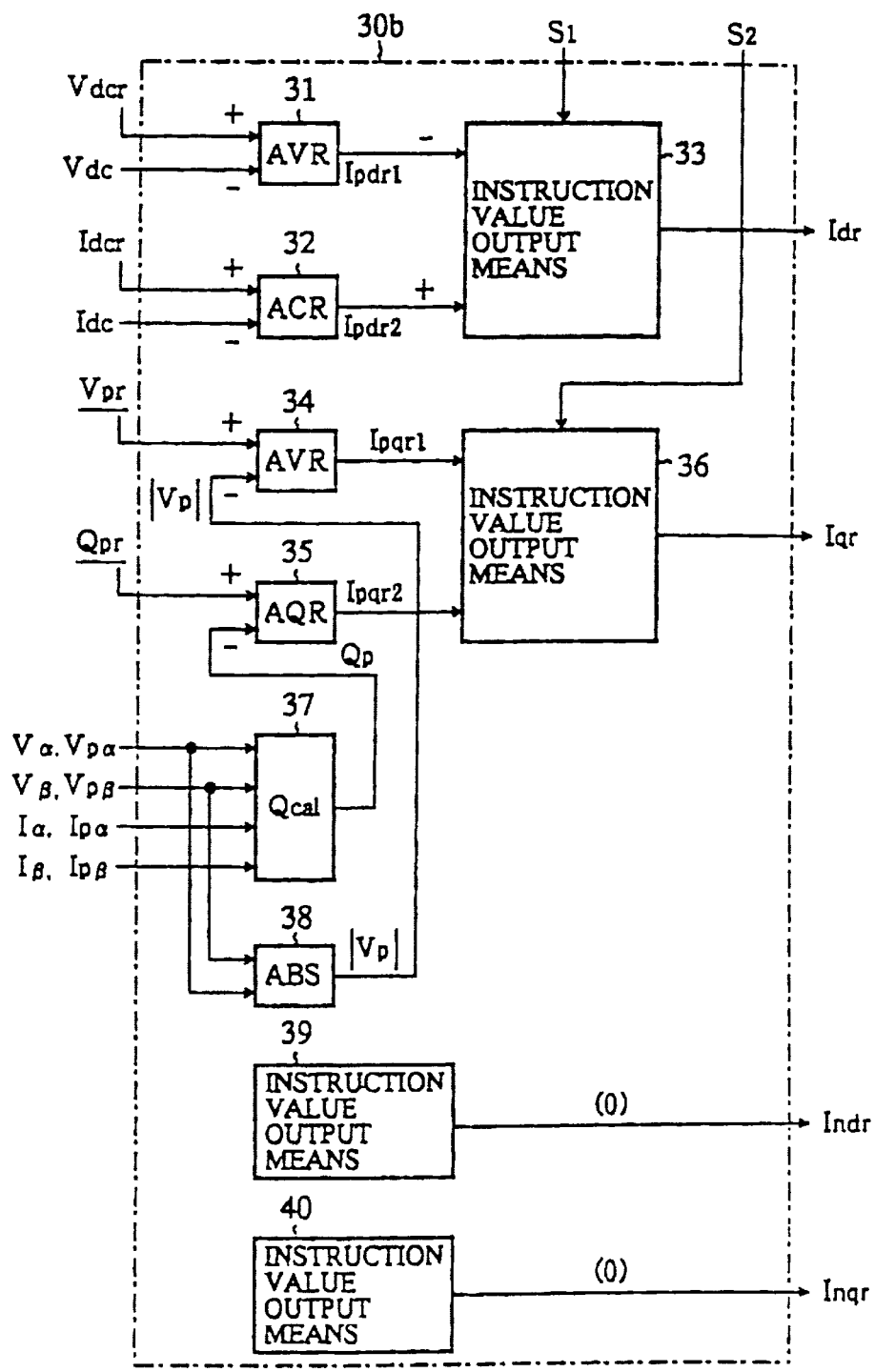
FIG. 7 is a diagram showing a configuration of an instruction value generation device according to a first embodiment of the invention.

FIG. 7 shows an instruction value generating means 30b according to a first embodiment. In the figure, 37 is an operation means which is supplied with positive-sequence component voltages Vpa, Vpb (or in the same way as the current, the voltages Va, Vb which are generated and the voltages after three-phase to two-phase conversion are taken to be positive-sequence component) and is supplied with an α axial current Iα and the β axial current Iβ and calculates a reactive electrical power force of the positive-sequence component Qp from these values.

The instruction generating means 30b may be used in the same way as the instruction generating means 30 in FIG. 18. In other words, it may be provided with an operation means for the positive-sequence component current and a separation means for the d axis current and the q axis current as stated above. In that case, the operation means 20b shown in FIGS. 20 and 21 may be used instead of the third operation means.

The operation of the invention will be discussed below.

It is usually desirable that no negative-sequence current is flowing in a line. Thus as can be understood from FIGS. 24 and 25 below, if a line which inserts a current value detection means 29 is appropriately selected, the negative-sequence current in a line can be controlled to zero by running the negative-sequence current in an power conversion section 5 (or a power converter circuit). The discussion here will be based on the case where d axis and q axis current instruction values Indr and Inqr for negative-sequence components are set to zero.

For example, when negative-sequence current flows due to fluctuations in the AC power system 1, at first, the influence of the negative-sequence current is seen on the d axis current and the q axis current Id, Iq which are taken to be positive-sequence. That is to say, when an alternating current which contains negative-sequence current is converted in that state to a positive-sequence component in a synchronous rotatory coordinate system, since twice-frequency pulsation is seen on the current after conversion, twice-frequency pulsation is seen in the current Id, Iq. However since the positive-sequence component voltages and the negative-sequence component voltages Vpd, Vpq, Vnd, Vnq are fed forward to the addition/subtraction means 23a, 23b, 23c, 23d, negative-sequence current due to such fluctuation is suppressed due to the continuous control of taking all detected current to be positive-sequence component.

Since the negative-sequence component voltage Vnd, Vnq are fed forward, the negative-sequence component voltage on both sides is balanced so that the power conversion section 5 generates an equal negative-sequence voltage to the negative-sequence voltage on the AC power system. Thus apart from problems arising from control errors, negative-sequence current stops flowing.

Therefore when the initial transient state has passed, the negative-sequence current is suppressed to zero. If the negative-sequence current is zero, the d axis current and the q axis current Id, Iq which are taken to be positive-sequence current are equivalent to the actual positive-sequence current.

As shown above, according to first embodiment, it is possible to simplify the calculation circuit which calculates a positive-sequence component power current by taking the values of the detected current to be positive-sequence component. Thus manufacturing costs can be reduced. Furthermore response delay and calculation delay in the calculation circuit can be reduced and it is possible to reduce the influence on control due to delays in the negative feed back of the current. Furthermore the response of the control system is lengthened as no distinction is made between positive and negative-sequence components.

Second Embodiment

The power conversion apparatus according to a second embodiment of the present invention alters the third operation means 20c in the first embodiment for the operation means 20d to be explained hereafter. Other components are the same as in the first embodiment and their explanation will not be repeated.

Figure 8:
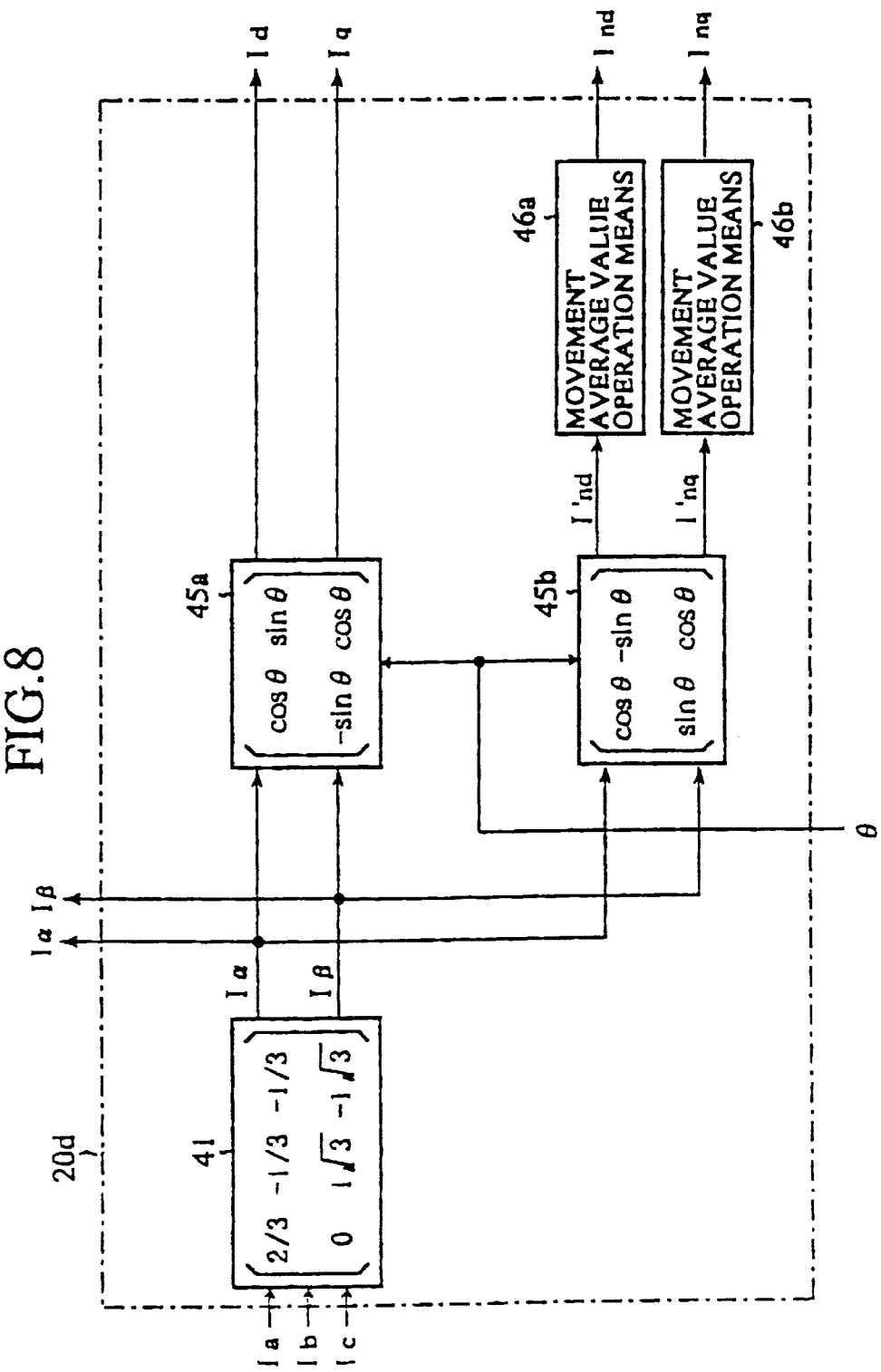
FIG. 8 is a diagram showing a configuration of an operation means in a power conversion apparatus according to a second embodiment of the invention.

FIG. 8 shows an operation means 20d in an power conversion apparatus according to a second embodiment of the present invention. In the figure, 45a and 45b are vector rotating means which are supplied with a two-phase current value Iα, Iβ from the three-phase to two-phase conversion means 41 and which perform the conversion of the coordinates to respectively positive and negative-sequence component in a synchronous rotatory coordinate system.

46a, 46b are moving average calculating means which are supplied with a negative-sequence current signals I'nd, I'nq which contain a twice-frequency pulsation from the vector rotating means 45b, and which calculate a moving average value for a signal in a ½ cycle period which corresponds to a frequency of the power system in order to eliminate the twice-frequency pulsation. The moving average value is output as a d axis component and a q axis component Ind, Inq in a negative-sequence component of a synchronous rotatory coordinate system.

Figure 9:
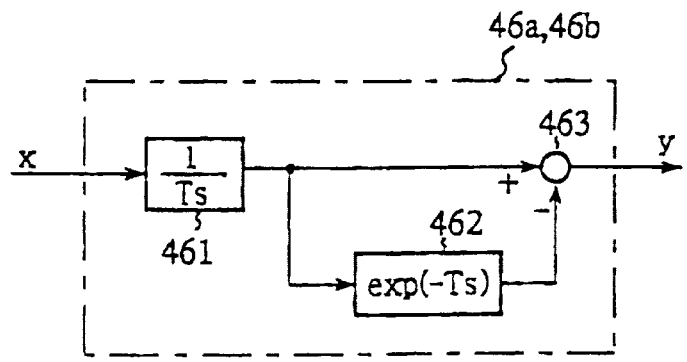
FIG. 9 is a diagram showing a configuration of a moving average calculating means.
Figure 10:
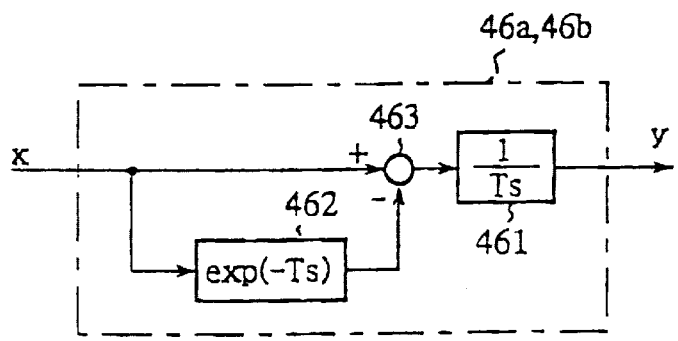
FIG. 10 is a diagram showing another example of the moving average calculating means.
Figure 11:
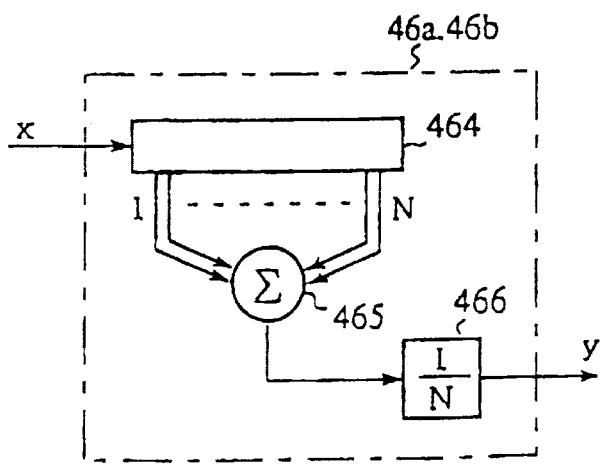
FIG. 11 is a diagram showing another configuration a moving average calculating means.

FIGS. 9 to FIG. 11 show an example of a moving average calculation means 46a, 46b. In FIG. 9, 461 is an integrator, 462 are time delay elements formed in each type of delay element, and 463 is a subtraction means. The moving average calculating means shown in FIG. 6 alters the integrator 461, the time delay elements 462, and the subtraction means 463 of FIG. 9.

In FIG. 11, 464 is a memory means such as a register for example which records an ordered sampling of supplied values. 465 is an addition means which calculates the total sum of values stored in the memory means 464. 466 is a division means which calculates and outputs an average value except the total sum in the sum total operation means 465 at a number N of values supplied to the sum total operation means 465 from the memory means 464.

All other kinds of moving average calculating means may be used.

The operation of the invention will now be explained.

The calculation of positive-sequence current values by the vector rotating means 45a is the same as that explained in first embodiment and such explanation will not be repeated here. The calculation of negative-sequence current values will be explained below.

The vector rotating means 45b is supplied with a two-phase current value Iα, Iβ from the three-phase to two-phase converter 41, performs the conversion of coordinates to a synchronous rotatory coordinate system and supplies the current value after conversion I'nd, I'nq to the moving average calculating means 46a, 46b. Since positive and negative-sequence components are not mixed in the output of the vector rotating means 45b, the output contains twice-frequency pulsation.

The moving average calculating means 46a, 46b are supplied with negative-sequence current signals I'nd, I'nq which contain twice-frequency pulsation. The moving average calculating means 46a, 46b calculate the moving average value of the negative-sequence current signal in a half (½) cycle period which corresponds to the frequency of the power system in order to eliminate the twice-frequency pulsation and outputs that moving average value as a d axial component and q axial component Ind, Inq in a negative-sequence component of a synchronous rotary coordinate system.

When the moving average calculating means 46a, 46b such as that shown in FIG. 9 or FIG. 10 are used, the output y of the moving average calculating means 46a, 46b which correspond to the input x is as shown in Formula (2).

$$y = \frac{1}{T} \int_{t}^{t+T} x \, dt. \quad (2)$$

When the frequency of the power system is taken to be f, then T=½f. In other words, since the moving average calculating means 46a, 46b calculates an average value of a signal in a ½ cycle period, the component of the twice-frequency in the signals is suppressed and only the negative-sequence component Ind, Inq is output from the moving average value operation means 46a, 46b.

On the other hand, when moving average calculating means 46a, 46b as shown in FIG. 11 is used, the value of the signal supplied from the vector rotating means 45b is sampled each sampling period Δt, stored in order in the memory means 464, and erased after a half (½) cycle. The sum total operation means 465 calculates the total of such values. When the number of values stored in the memory means 464 is taken to be N (=½fΔt), the division means 466 calculates an average value of a signal at a past half (½) cycle by dividing the total sum by the number N. Therefore since an average value of a signal is continuously calculated at half (½) cycle periods as a negative-sequence component, a negative-sequence component Ind, Inq which excludes twice-frequency components is output from the moving average calculating means 46a, 46b. Other operations are the same as in first embodiment and their explanation will not be repeated.

Thus it is possible to feedback the negative-sequence current and to feed back control each negative-sequence current component of the d axis and q axis. Therefore it is possible to suppress the negative-sequence current to zero by making the instruction values Indr, Inqr equal to zero. In addition, Id, Iq, which were taken to be positive-sequence current, actually become only a positive-sequence current component and the final positive-sequence current is accurately controlled.

As shown above, according to second embodiment, it is possible to simplify the structure of a calculation circuit which calculates a current value of a negative-sequence component. Thus manufacturing costs can be reduced. Furthermore it is possible to reduce response delays and calculation delays in the calculation circuit of the negative-sequence components of the current. Therefore the effect is obtained that the influence due to delays in the negative feedback of the current are reduced.

The twice-frequency pulsation generated in the negative-sequence current component I'nd, I'nq can be damped by using an N-th delay filter. In this case, the response delay is increased, and the response speed of the current control system becomes insufficient and so control becomes unstable.

Third Embodiment

Figure 12:
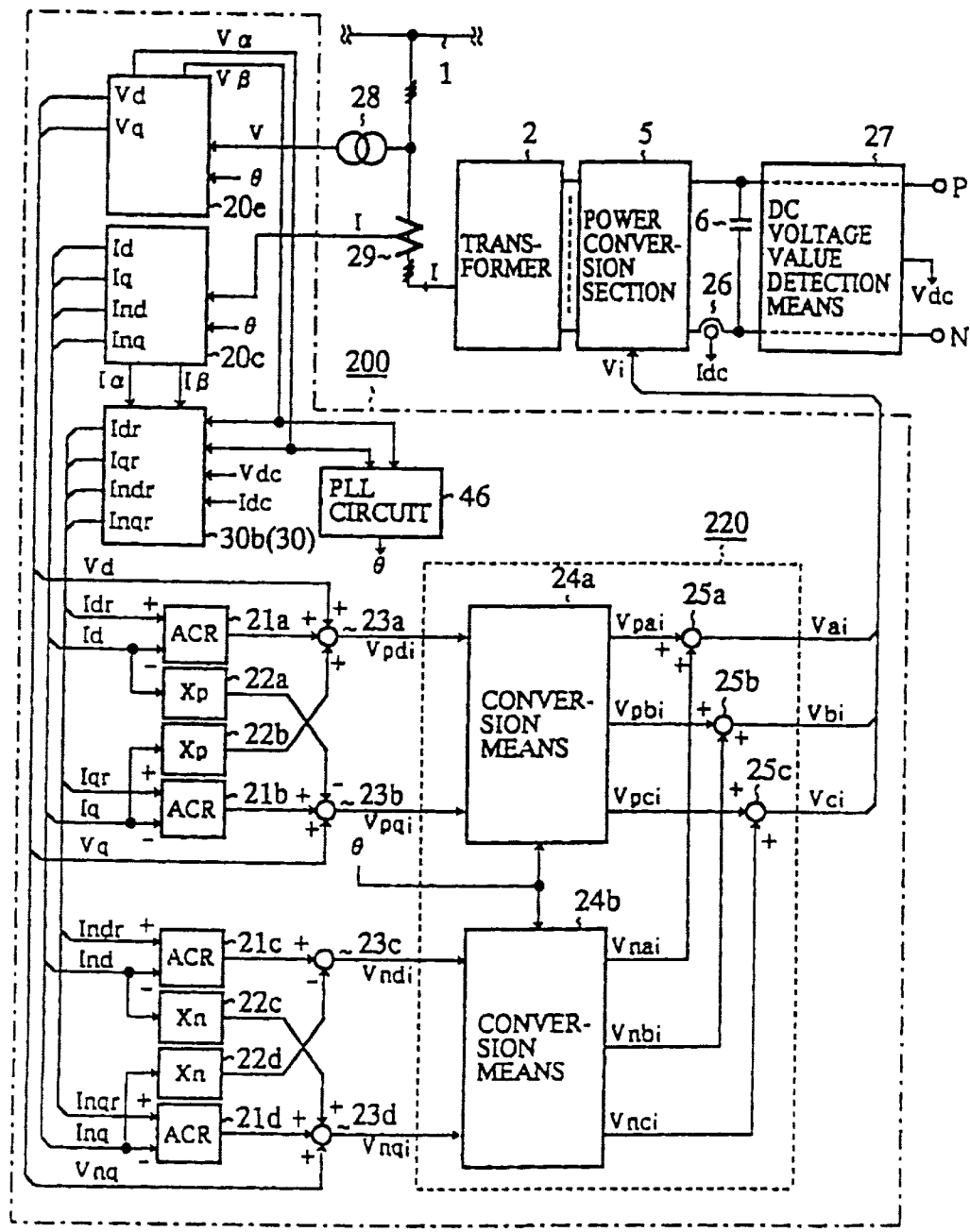
FIG. 12 is a diagram showing a configuration of a power conversion apparatus according to a third embodiment of the present invention.
Figure 13:
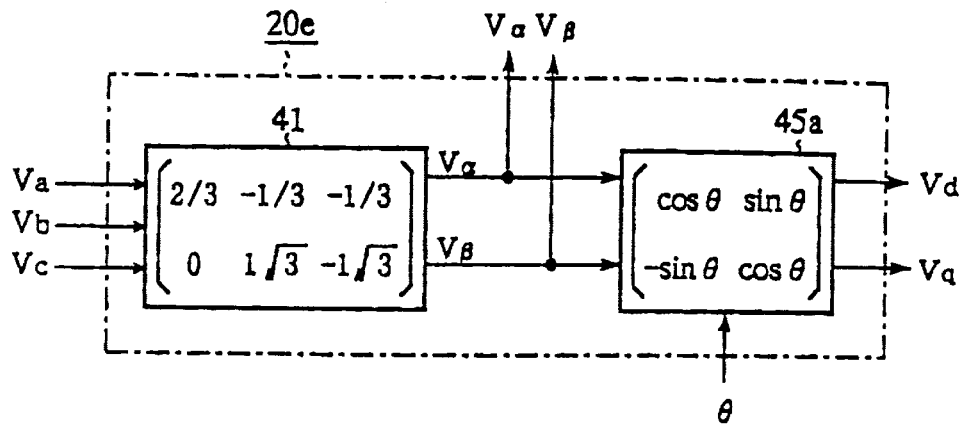
FIG. 13 is a diagram showing a configuration of a fifth operation means according to a third embodiment of the present invention.

FIG. 12 shows an power conversion apparatus according to a third embodiment of the present invention. FIG. 13 shows the structure of the fifth operation means 20e in the third embodiment. In the figure, 20e is a fifth operation means which calculates the two-axial components Vd, Vq in the positive phase direction of a synchronous rotatory coordinate system, without making a distinction between negative and positive-sequence components, from the three-phase voltage V. The resultant value is output to the addition/subtraction means 23a, 23b.

The fifth operation means 20e converts the three-phase voltage Va, Vb, Vc to a two-phase voltage Vα, Vβ by the three-phase to two-phase conversion means 41. Then it converts the two-phase voltage Vα, Vβ to a two-axis component Vd, Vq by the vector rotating means 45a in a positive phase direction of a synchronous rotatory coordinate system.

Other components are the same as in first embodiment and will not be explained here.

The operation of the invention will be explained below.

In third embodiment, the two-axis voltage component Vd, Vq in a positive phase direction of a synchronous rotatory coordinate system is fed-back to the addition/subtraction means 23a, 23b from the fifth operation means 20e. Thus the output of the addition/subtraction means 23a, 23b contains a two-axis voltage component Vd, Vq a positive phase direction of a synchronous rotatory coordinate system. A negative-sequence component is contained in this two-axis voltage component Vd, Vq. However the two-axis voltage component Vd, Vq without change, is converted to a three-phase voltage Vpai, Vpbi, Vpci of a fixed coordinate system by the conversion means 24a.

Conversion in the conversion means 24a is actually inverse transformation of the conversion performed by the fifth operation means 20e. Thus the negative and positive-sequence components of the three-phase voltage Va, Vb, Vc are restored by this inverse transformation. Both positive and negative-sequence components of the two-axis voltage components Vpd, Vpq, Vnd, Vnq in seventh embodiment are respectively supplied to the addition/subtraction means 23a, 23b, 23c, 23d and after the voltage instruction values Vpdi, Vpqi, Vndi, Vnqi have been generated and converted to a three-phase voltage, voltage instruction values Vai, Vbi, Vci, similar to calculating the sum of the negative and positive-sequence components of the three-phase voltage, are obtained.

Thus in third embodiment, the feed back of the negative-sequence component of the voltage Vnd, Vnq is omitted and feed back of both the positive and negative-sequence components of the voltage is achieved by the positive-sequence component of the control system. The voltage instruction value Vndi, Vnqi is supplied from the addition/subtraction means 23c, 23d to the conversion means 24b since the negative-sequence current has a value of zero. Since the method of control based on making the negative-sequence current zero is the same as the embodiment above, it will not be explained again here.

As shown above, according to third embodiment, when the voltage of the power system is in a state of unbalance, the effect is obtained of suppressing negative-sequence current in a line in which feedback control of the current is being performed. Furthermore the calculation circuit for the positive-sequence component and the negative-sequence component of the voltage is simplified and it is possible to reduce the response time of the calculation.

Thus in all embodiments of the invention above, it is possible to modify structural elements which perform algebraic calculations so that other structural elements may be used as a result of the modifications in the algebraic formula.

Fourth Embodiment

Figure 14:
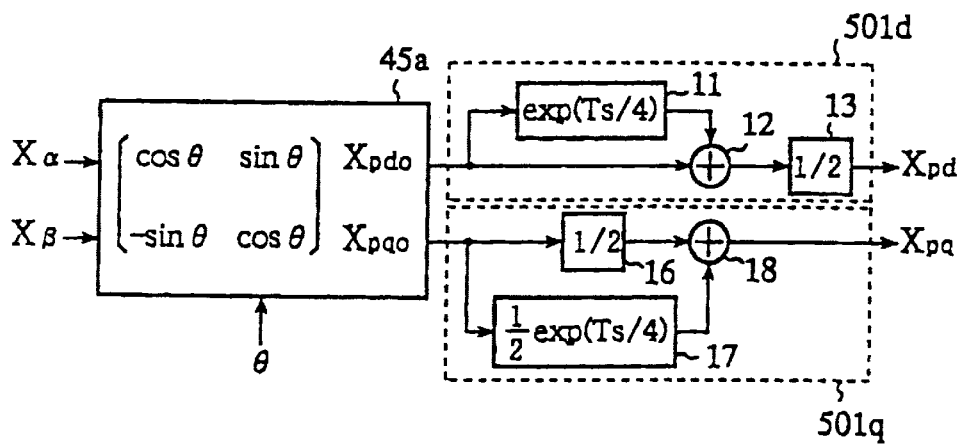
FIG. 14 is a block diagram of a conversion device of a synchronous rotating reference frame (with respect to positive-sequence components) according to a fourth embodiment.
Figure 15:
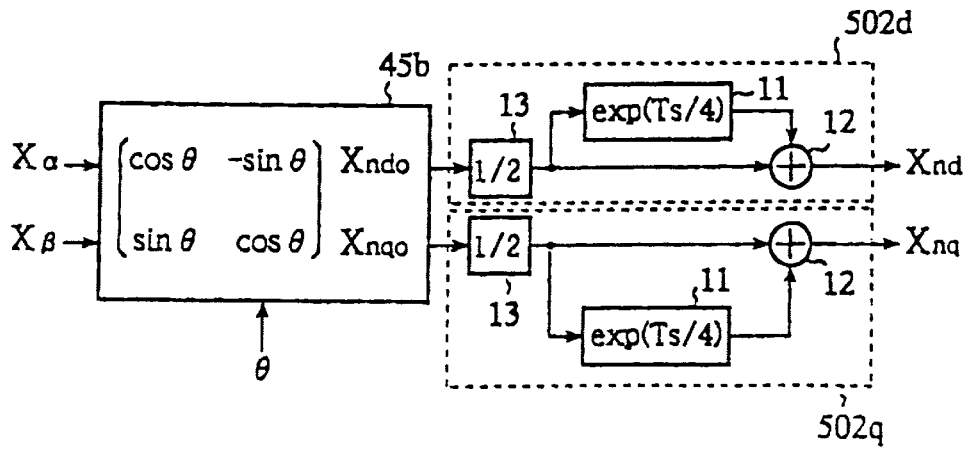
FIG. 15 is a block diagram showing a conversion device of a synchronous rotary coordinate system (with respect to negative-sequence components) according to a fourth embodiment.

FIGS. 14 and 15 are block diagrams which show a synchronous rotatory coordinate converter according to a fourth embodiment of the present invention. The three-phase to two-phase conversion section is the same as in that described above and so will not be described again here. The device shown in FIG. 14 is a synchronous rotatory coordinate converter which converts a two-phase alternating current signal Xα, Xβ to a signal Xpd, Xpq in a positive-sequence phase in a synchronous rotatory coordinate system. The device shown in FIG. 15 is a synchronous rotatory coordinate converter which converts a two-phase alternating current signal Xα, Xβ to a signal Xnd, Xnq in a negative-sequence component in a synchronous rotatory coordinate system.

In FIG. 14, 45a is the vector rotating means (synchronous rotating coordinate conversion means) which is supplied with a phase θ of a voltage of an power system and which converts a two-phase AC signal Xα, Xβ to a signal Xpdo, Xpqo in a positive-sequence component in a synchronous rotatory coordinate system which has been synchronized to the phase θ. 501d is a delay signal synthesizer which synthesizes the Xpdo signal which is coordinate converted by the vector rotating means 45a and the signal delayed by a ¼ cycle of the power system and which outputs a value, which is ½ the value of the synthesized signal, as an output Xpd signal. In the delay signal synthesizer 501d, 11 is a signal delaying means which delays an Xpd signal by ¼ of the cycle T (=T/4) of the power system. 12 is a synthesizing means which adds the signal delayed by the signal delaying means 11 and the signal Xpdo from the vector rotating means 45a. 13 is a parameter means which is supplied with the sum of the signal delayed by the signal delaying means 11 and the signal Xpdo from the vector rotating means 45a from the synthesizing means 12 and which outputs a value equal to ½ that value as an output Xpd signal.

501q is a delay signal synthesizer, which synthesizes the ½ value of the Xpq signal which is coordinate modified by the vector rotating means 45a, and a signal which delays that signal by ¼ a cycle of the power system and which is then halved. The delay signal synthesizer 501q then outputs the synthesized signal as an output Xpq signal. In the delay signal synthesizer 501q, 16 is a parameter means which outputs a value ½ that of the value of the Xpdo signal from the vector rotating means 45a. 17 is a signal delaying means which delays the Xpdo signal by ¼ cycle (=T/4) of the power system and which halves the value of the delayed signal and outputs the resulting value. 18 is a synthesizer which calculates the sum of the output value of the parameter means 16 and the output value of the signal delaying means 17 and which outputs this value as an output signal Xpq.

In FIG. 15, 45b is the vector rotating means which is supplied with the phase θ of the voltage of the power system and which converts the two-phase signal Xa, Xb to a signal Xndo, Xnqo in a negative-sequence component in a synchronous rotatory coordinate system which is synchronized to the phase (−θ). 502d is a delay signal synthesizer which, after the value of the Xndo signal which is coordinate modified by the vector rotating means 45b is halved, synthesizes that signal and the signal comprised of the first signal delayed by a ¼ cycle of the power system and which then outputs the value of the synthesized signal as an output Xnd signal. In the delay signal synthesizer 502d, 13 is a parameter means which halves the value of the signal Xndo from the vector rotating means 45a. 11 is a signal delaying means which delays the signal, which is half the value of the signal from the parameter means 13, by a ¼ cycle (=T/4) of the power system. 12 is a synthesizer which calculates the sum of the signal delayed by the signal delaying means 11 and the signal from the parameter means 13 and outputs the sum as a Xnd signal.

502q is a delayed signal synthesizing means which is comprised of a parameter means 13, a signal delaying means 11 and a synthesizer 12 in the same way as the delay signal synthesizer 502d, and which, after the value of the signal Xnqo which is coordinate converted by the vector rotating means 45b is halved, synthesizes that signal with a signal comprised of that first signal delayed by a ¼ cycle of the power system, and which outputs the synthesized signal as an output signal Xnq.

The structure of the delay signal synthesizing sections 501d, 501q, 502d, 502q may be in the form of a signal delaying means 11, a synthesizer 12 and a parameter means 13, or a parameter means 16, a signal delaying means 17, and a synthesizer 18 or a parameter means 13, a signal delaying means 11, and a synthesizer 12. Also the calculation order may be changed arbitrarily and in this respect the invention is not limited.

The operation of the invention will now be explained.

Figure 16A:
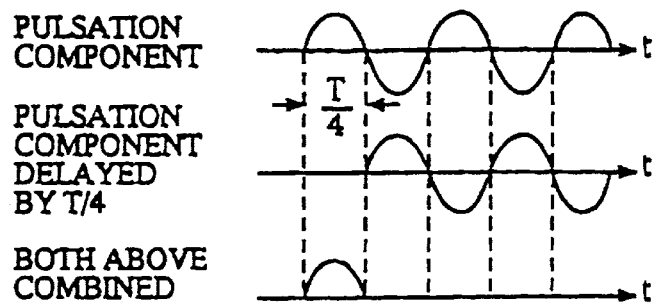
FIGS. 16A to 16B are diagrams to explain the reduction of pulsation.
Figure 16B:
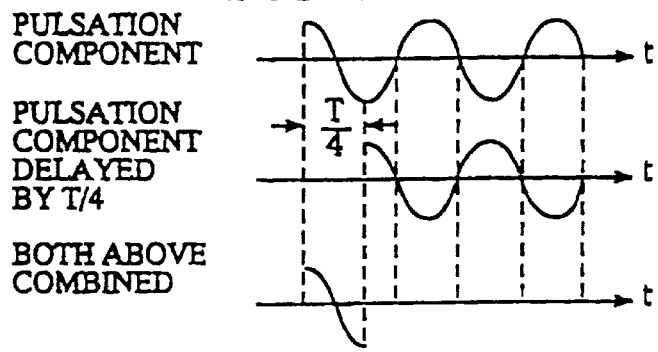
Figure 17A:
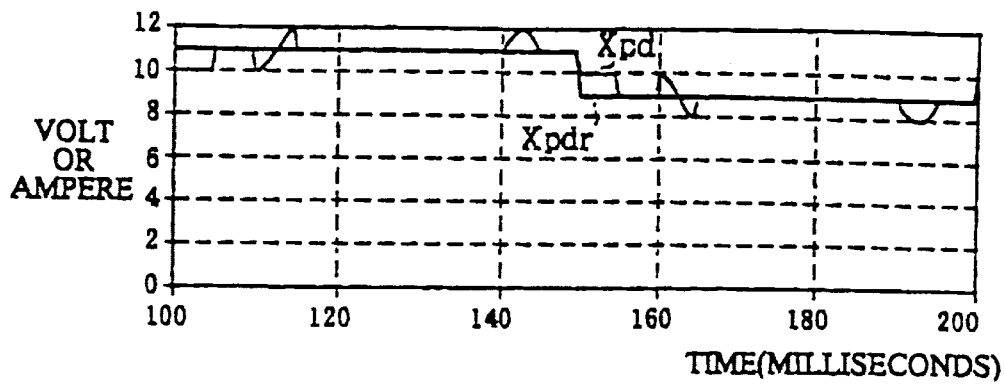
FIGS. 17A to 17D show the instruction signals Xpdr, Xpqr, Xndr, Xnqr which are supplied to the converter shown in FIG. 3 and the output signals Xpd, Xpq, Xnd, Xnq which are converted to the positive-sequence components and negative-sequence components of a synchronous rotary coordinate system.
Figure 17B:
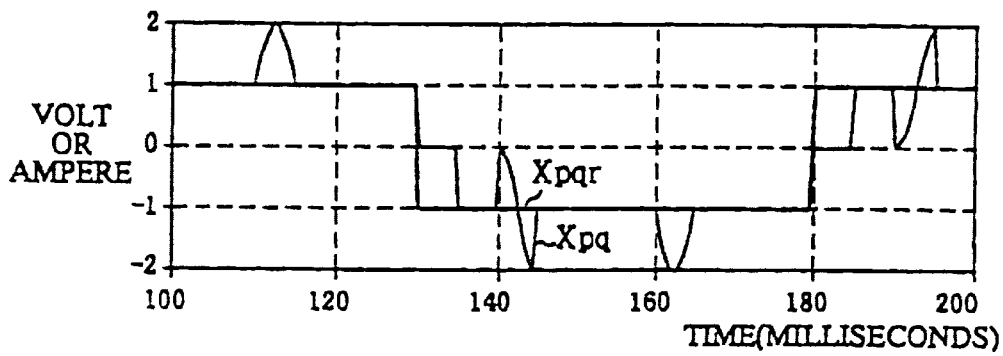
Figure 17C:
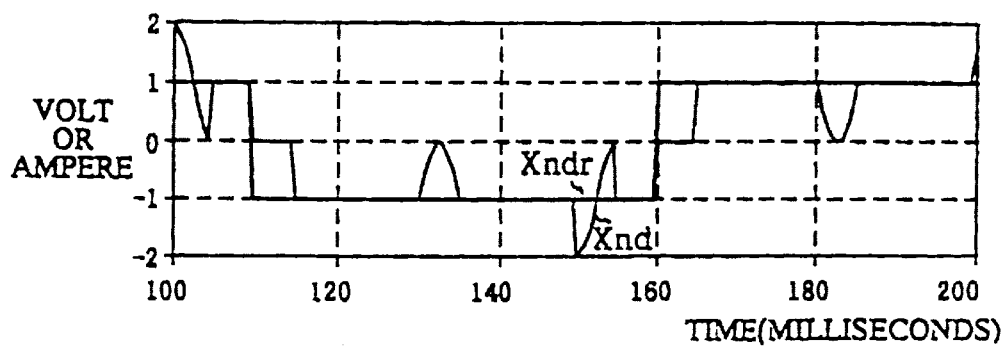
Figure 17D:
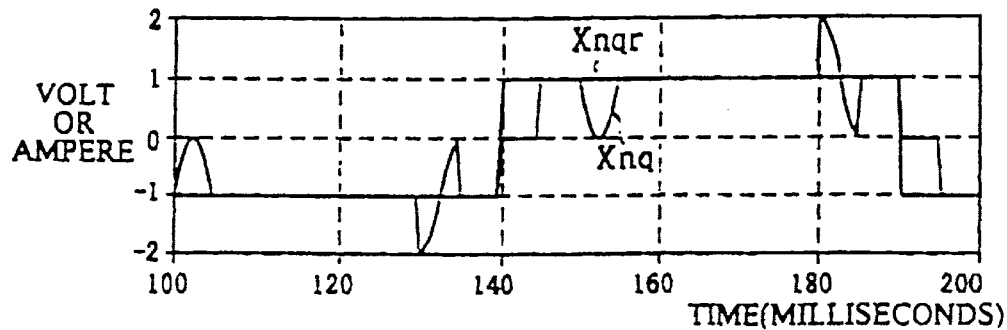

FIGS. 16A to 16B are explanatory figures showing the decrease in the pulsating component. The FIGS. 17A–17B show the instruction values Xpdr, Xpqr, Xndr, Xnqr which are supplied to the converter of FIG. 31 and the outputs Xpd, Xpq, Xnd, Xnq which are converted to signals in the positive and negative-sequence component of the synchronous rotatory coordinate system by the synchronous rotatory coordinate converter of FIG. 14 and FIG. 15 after the three-phase AC signal which is the output of the converter in FIG. 3 passes the three-phase to two-phase converter in FIG. 2.

Firstly the three-phase AC signal is converted to a two-phase AC signal Xα, Xβ by the three-phase to two-phase converter (not shown) and supplies this two-phase AC signal Xα, Xβ is supplied to the vector rotating means 45a, 45b. The two-phase AC signal Xα, Xβ is converted to a Xpdo, Xpqo signal in a positive-sequence component in a synchronous rotatory coordinate system by the vector rotating means 45a. That two-phase AC signal Xα, Xβ is converted to a Xndo, Xnqo signal in a negative-sequence component in a synchronous rotatory coordinate system by the vector rotating means 45b.

The delay signal synthesizing means 501d synthesizes that Xpdo signal and a signal comprised of the Xpdo signal delayed by a ¼ cycle of the power system and outputs a signal ½ the value of the synthesized signal as an output signal Xpd.

The delay signal synthesizing means 501q synthesizes a signal from a value ½ that of the Xpqo signal and a signal comprised of half the Xpqo signal delayed by a ¼ cycle of the power system and outputs the synthesized signal.

On the other hand, the delay signal synthesizing means 502d synthesizes a signal comprised of ½ the value of the Xndo signal and a signal comprised of the first signal delayed by ¼ the cycle of the power system and outputs the value of the synthesized signal as an output Xnd signal. The delay signal synthesizing section 502q synthesizes a value ½ that of the Xnqo signal and a signal comprised of half the Xnqo signal delayed by a ¼ cycle of the power system and outputs the synthesized signal as a Xnq output signal.

At this time, as shown in FIG. 16A, the pulsating component $\sin(2\theta)$ which is contained in Xpdo, Xpqo, Xndo, Xnqo which are the output signals of the vector rotating means 45a, 45b is controlled by adding the delay of the pulsating component of ¼ a cycle T (=T/4) of the power system. In the same way as shown in FIG. 16B, the pulsating component $\cos(2\theta)$ which is contained in Xpdo, Xpqo, Xndo, Xnqo which are the output signals of the vector rotating means 45a, 45b is controlled by adding the delay of the pulsating component of ¼ a cycle T (=T/4) of the power system.

In this way, the three-phase AC signals are converted to signals in the positive and negative-sequence component in a synchronous rotatory coordinate system.

Figure 1:
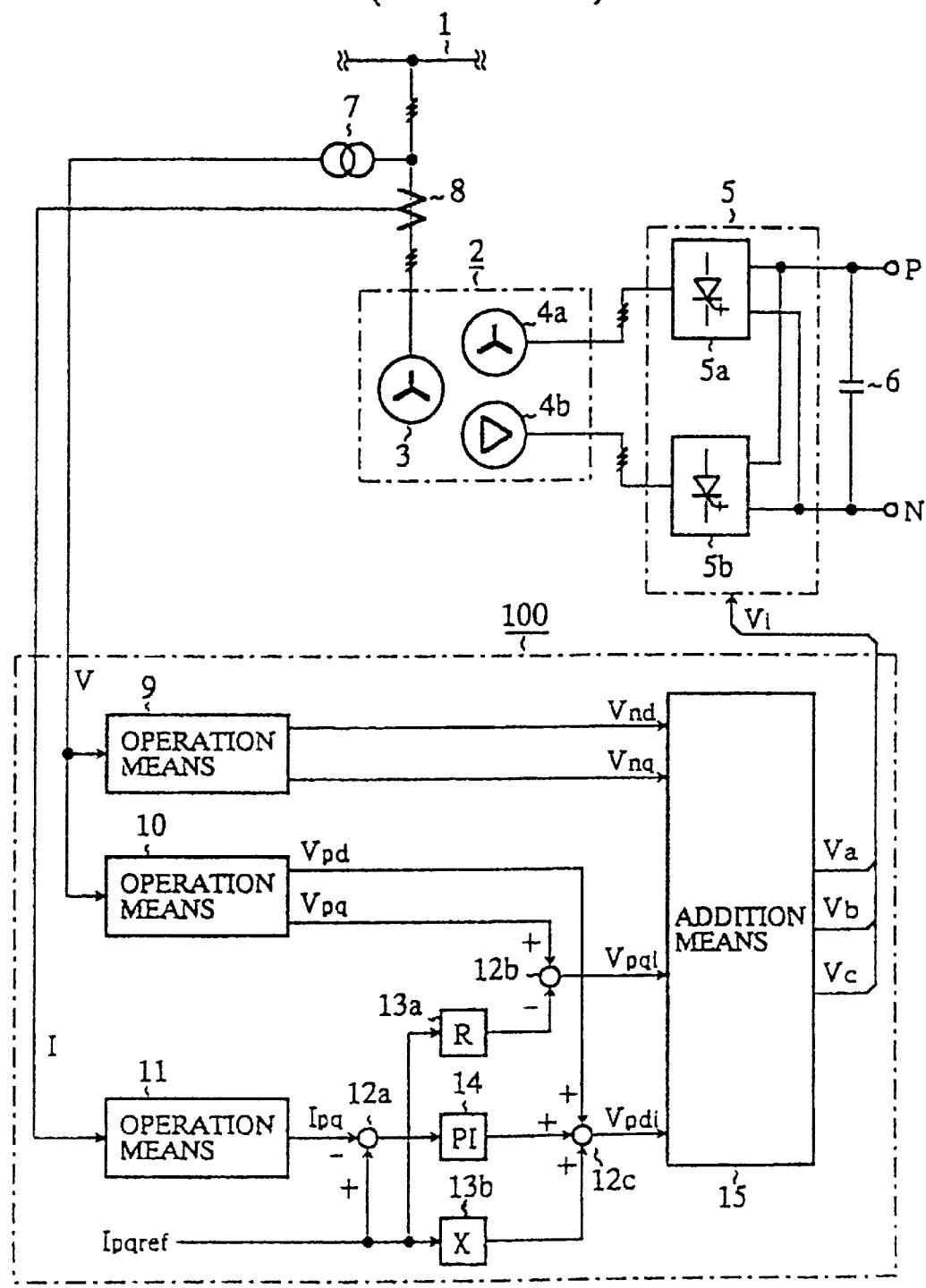
FIG. 1 is a diagram showing a configuration of a conventional power conversion apparatus.
Figure 2:
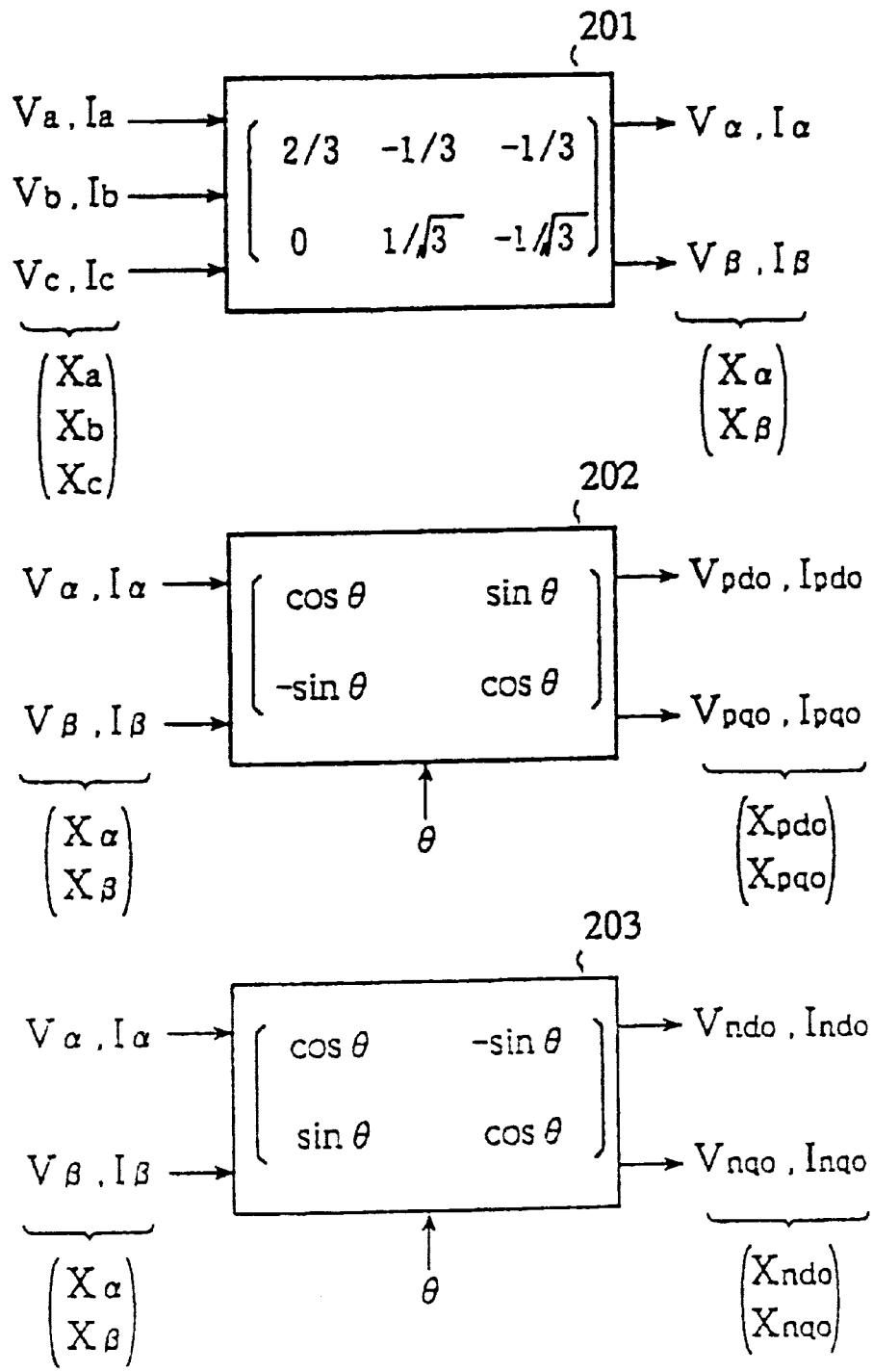
FIG. 2 is a block diagram of a rotary coordinate conversion method synchronous.
Figure 3:
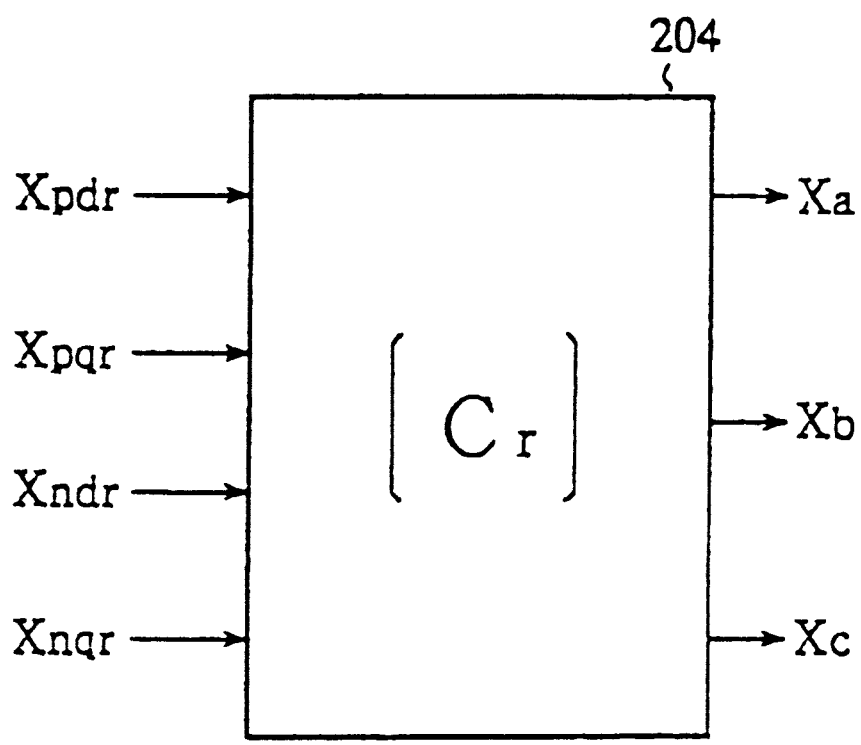
FIG. 3 is a block diagram showing the converter which converts the instruction values Xpdr, Xpqr with respect to the signal in the positive-sequence component of the synchronous rotatory coordinate system and instruction values Xndr, Xnqr with respect to the signal in the negative-sequence component of the synchronous rotatory coordinate system into three-phase signals.
Figure 4A:
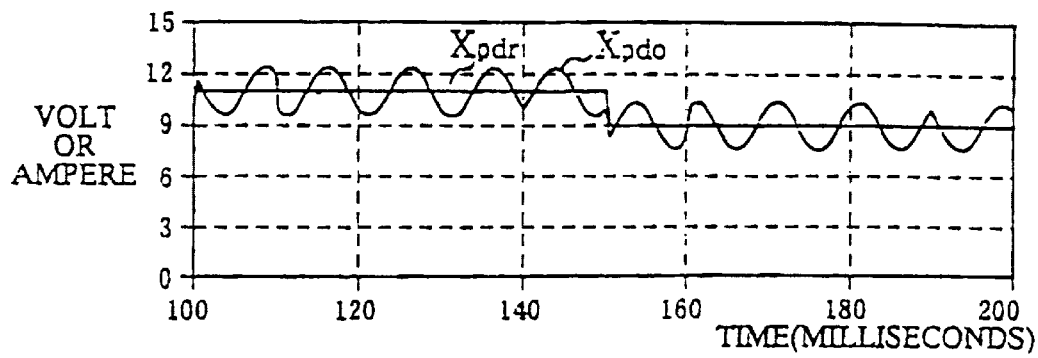
FIGS. 4A to 4D show the comparison of the instruction signals Xpdr, Xpqr, Xndr, Xnqr, which are supplied to the power conversion section in the power conversion apparatus of the invention as shown in FIG. 3, and the output signals Xpdo, Xpqo, Xndo, Xnqo which are converted to positive-sequence and negative-sequence components of a synchronous rotary coordinate system by the conventional power conversion apparatus.
Figure 4B:
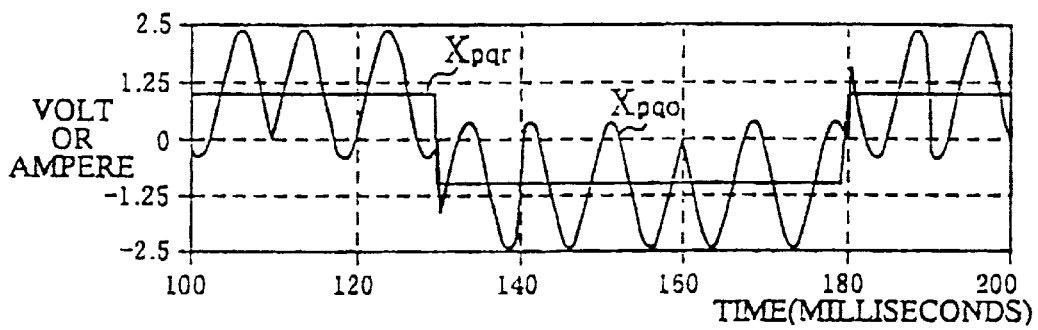
Figure 4C:
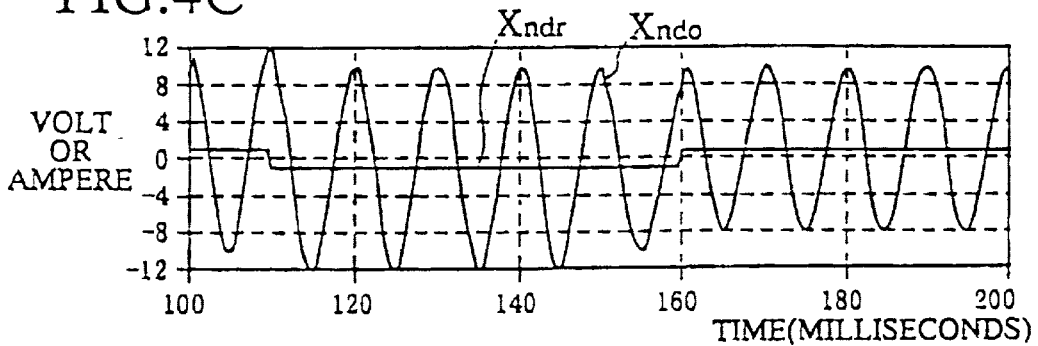
Figure 4D:
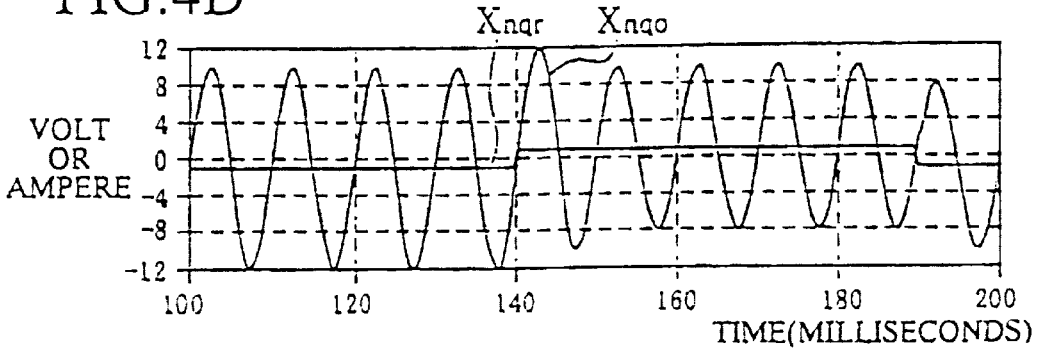

The instruction values Xndr, Xnqr which correspond to signals in a fixed negative-sequence component in a synchronous rotatory coordinate system and the signals Xpdr, Xpqr which correspond to signals in a fixed positive-sequence component in a synchronous rotatory coordinate system are converted to three-phase AC signals by a transformation matrix Cr. FIGS. 17A–17D shows the conversion of the three-phase AC signals into the signals Xpd, Xpq, Xnd, Xnq in the positive and negative-sequence component in a synchronous rotatory coordinate system by the three-phase to two-phase conversion section and the above mentioned synchronous rotatory coordinate conversion device as shown in FIG. 2. The signals are shown as instruction values Xpdr, Xpqr, Xndr, Xnqr and as output signals after conversion as Xpd, Xpq, Xnd, Xnq.

The relationship of the instruction values Xpr, Xnr and the signals Xp, Xn after conversion is as shown in Formula (3).

$$\begin{pmatrix} Xp(s) \\ Xn(s) \end{pmatrix} = \frac{1 + \exp(-Ts/4)}{2} \begin{pmatrix} Xpr(s) + C(2\theta)Xnr(s) \\ Xnr(s) + C(-2\theta)Xpr(s) \end{pmatrix} \quad (3)$$

where

Xp (s)=[Xpd (s), Xpq (s)]$^T$, Xn (s)=[Xnd (s), Xng (s)]$^T$,
Xpr (s)=[Xpdr (s), Xpqr (s)]$^T$, Xnr (s)=[Xndr (s), Xnqr (s)]$^T$ In FIGS. 17A–17D, the instruction value Xpdr which corresponds to the positive-sequence component in a d axis is set at a value 10 of up to 150 msec and after that it is set to the value 9. The instruction value Xpqr which corresponds to the positive-sequence component in a of the q axis is set to a value 1 of up to 130 msec and after that it is set to the value −1 of up to 180 msec. After that it is set to the value of 1. The instruction value Xndr which corresponds to the negative-sequence component in a d axis is set at a value 1 of up to 110 msec and after that it is set to the value −1 of up to 160 msec. After that it is set to 1. The instruction value Xnqr which corresponds to the negative-sequence component in a q axis is set at a value −1 of up to 140 msec and after that it is set to the value 1 of up to 190 msec. After that it is set to −1.

As shown in FIGS. 17A–17D, when one of the values of the instruction signals Xpdr, Xpqr, Xndr, Xnqr are modified, the instruction value has a value which differs by a generated error from the output signal in the synchronous rotatory coordinate system in the opposite phase relationship. However the time which generates the error is only a period of ¼ the cycle of the power system. After that time, no further errors are generated.

As above, according to fourth embodiment, the pulsating component of the coordinate after conversion is reduced by the synthesis of the signal after conversion which delays the signal to the synchronous rotatory coordinate system of the coordinate after conversion by a fixed time and the signal after delay. Thus the effect of accurately controlling the power system is obtained.

For example, when comparison is made with the output signals Xpdo, Xpqo, Xndo, Xnqo (FIGS. 4A–4D) after conversion due to the conventional device, the pulsation in the output signals Xpd, Xpq, Xnd, Xnq after conversion by the device in fourth embodiment is sufficiently small and the time in which it is generated is limited.

Fifth Embodiment

Figure 18A:
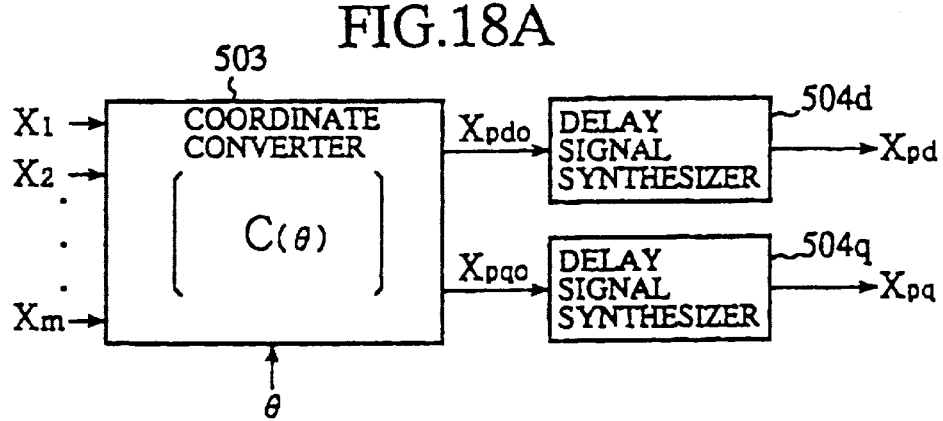
FIGS. 18A to 18B are block diagrams showing a conversion device of a synchronous rotatory coordinate system according to a fifth embodiment of the present invention.
Figure 18B:
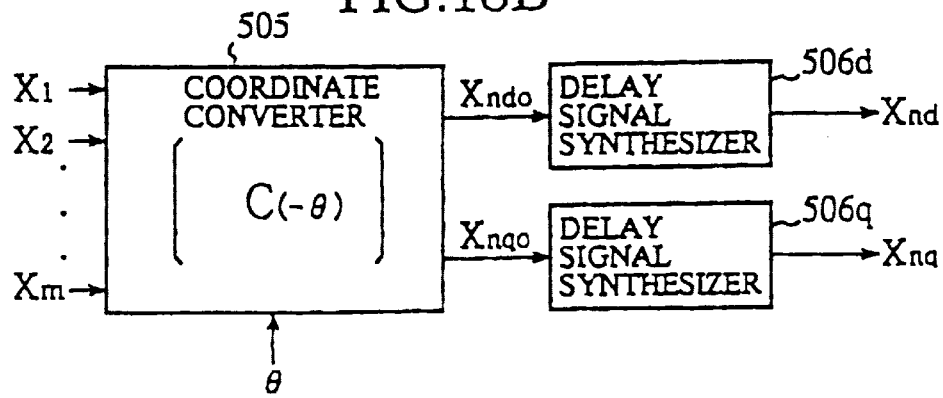

FIGS. 18A–18B is a block diagram showing the structure of a synchronous rotatory coordinate device according to a fifth embodiment of the present invention. The three-phase to two-phase converter is the same as that described above and its description will not be repeated. The device in FIG. 18A is a synchronous rotatory coordinate conversion device which converts an m phase AC signal X1–Xm to a signal Xpd, Xpq in a positive-sequence component in a synchronous rotatory coordinate system. The device 18B is a synchronous rotatory coordinate device which converts an m phase AC signal X1–Xm to a Xnd, Xnq signal in a negative-sequence component of a synchronous rotatory coordinate system.

In FIG. 18A, 503 is a coordinate converter (synchronous rotatory coordinate conversion means) which converts an m phase AC signal X1–Xm to a signal Xpdo, Xpqo in a positive-sequence component in a synchronous rotatory coordinate system. 504d is a delay signal synthesizing section (a delay synthesizing means) which is supplied with the signal Xpdo, and which delays the signal Xpdo by the period Ti shown in the following Formula and outputs an n number of signals multiplied by the parameter Ki as a signal Xpd, $$\sum_{i=1}^{n} Ki\{\exp(-Tis)\} Xpdo(s).$$

Both 504q and 504d are similar delay signal synthesizing sections (delay signal synthesizing means). The delay signal synthesizing sections 504q and 504d may have an arbitrary number n of synthesizing signals and delay elements and parameter means however the structural elements are the same as one of the above mentioned delay signal synthesizing sections 501d, 501q, 502d.

In FIG. 18B, 505 is a coordinate conversion section (synchronous rotatory coordinate conversion means) which converts an m phase AC signal 1–Xm to a signal Xndo, Xnqo in a negative-sequence component in a synchronous rotatory coordinate system. 506d is a delay signal synthesizing section (a delay synthesizing means) which is supplied with the signal Xndo, delays the signal Xndo by the period Tk shown in the following Formula and outputs an m number of signals multiplied by the parameter Kk as a signal Xnd.

$$\sum_{k=1}^{m} Kk\{\exp(-Tks)\} Xndo(s).$$

506q is a delay signal synthesizing section (delay signal synthesizing means) which is supplied with the signal Xnqo and outputs a signal as Xnq in the same way as the delay signal synthesizing section 506d. The delay signal synthesizing sections 506d, 506q may have an arbitrary number n of synthesizing signals and delay elements and parameter means however the structural elements are the same as one of the above mentioned delay signal synthesizing sections 501d, 501q, 502d.

The operation of the invention will now be explained.

Firstly an m phase AC signal is supplied to the coordinate conversion section 503, 505. The mR phase AC signal X1–Xm is converted to a signal Xpdo, Xpqo in a positive-sequence component in a synchronous rotatory coordinate system by the coordinate conversion section 503. The m phase AC signal X1–Xm is converted to a signal Xndo, Xnqo in a negative-sequence component in a synchronous rotatory coordinate system by the coordinate conversion section 505.

The delay signal synthesizing section 504d is supplied with the signal Xpdo, and as an example, a signal which is ½ the sum of that Xpdo signal and a signal comprised of the Xpdo signal delayed by ¼ cycle of the power system is output as an Xpd signal. The delay signal synthesizing section 504q is supplied with the signal Xpqo, and a signal which is ½ the sum of that Xpqo signal and a signal comprised of the Xpqo signal delayed by ¼ cycle of the power system is output as an Xpq signal.

On the other hand, the delay signal synthesizing section 506d is supplied with the signal Xndo, and as an example, a signal which is ½ the sum of that Xndo signal and a signal comprised of the Xndo signal delayed by ¼ cycle of the power system is output as an Xnd signal. The delay signal synthesizing section 506q is supplied with the signal Xnqo, and a signal which is ½ the sum of that Xnqo signal and a signal comprised of the Xnqo signal delayed by ¼ cycle of the power system is output as an Xnq signal.

In this way, m phase AC signals are converted to signals in a positive. and negative-sequence component in a synchronous rotatory coordinate system.

As discussed above, according to fifth embodiment, m phase AC signals are converted to signals in a synchronous rotatory coordinate system. The signal after conversion is delayed by a fixed period and pulsating components after coordinate conversion are reduced by synthesizing the signal after conversion and the signal after delay. Thus it is possible to accurately control an power system of an arbitrary number of phases m and not only a three-phase power system.

In fourth and fifth embodiments above, pulsating components which have twice the frequency of the frequency of the power system are suppressed by the addition of a signal which has been delayed by a period of a ¼ cycle of the power system to the original signal. However it is possible to suppress pulsating components which have I times (where I is an arbitrary integer) the frequency of the power system by the addition of a signal which has been delayed by a period of a (2×I) cycle of the power system to the original signal. It is possible to suppress a plurality of pulsations which all have different frequencies by repeating the operation of adding all signals, which have been delayed by a period equal to (2×I) the cycle of the power system (where I is an arbitrary integer), to the original signal and by taking the sum of the multiple of the parameters Ki which differs from the signal of the appropriately differing delay time Ti. In this case, when the gain which corresponds to the delayed signal is taken as Ki, a signal which multiplies the gain Ki to each delayed signal is added to the original signal so as to satisfy Formula (4). Thus the plurality of pulsation components can be eliminated by the ordered application of this principle.

$$\sum_{i=1}^{n} Ki\{\exp(-j\omega Ti)\} \cdot V\omega = 0. \tag{4}$$

wherein, Vω is a sinusoidal wave of a fixed angular frequency ω.

Sixth Embodiment

Figure 19:
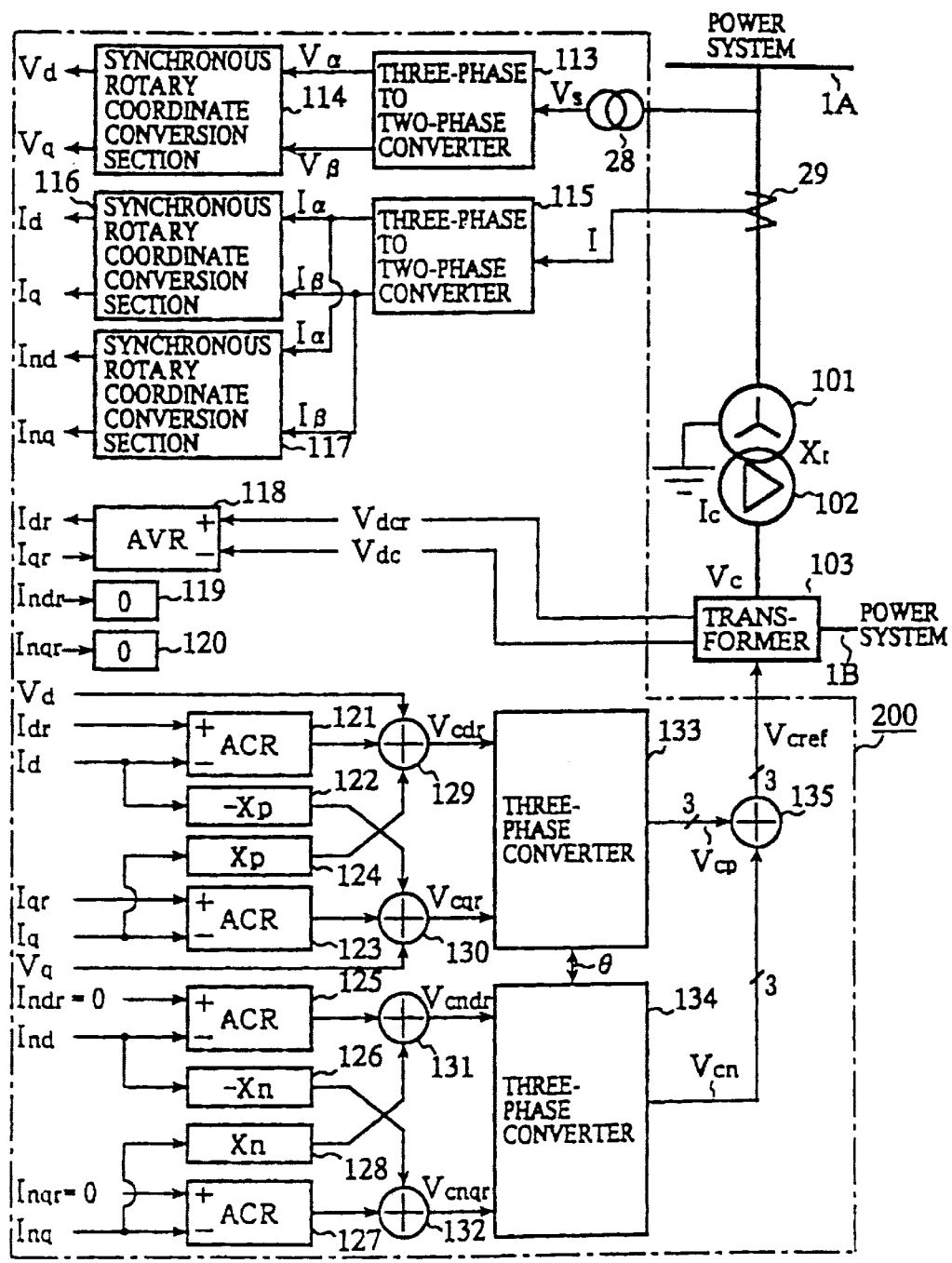
FIG. 19 is a block diagram showing a power conversion apparatus according to a sixth embodiment of the present invention.

FIG. 19 is a block diagram of the structure of an power conversion apparatus according to a sixth embodiment of the present invention. In the figure, 1A is a three-phase AC power system to which this power conversion apparatus is connected. 101 is a primary winding of a transformer. 102 is a secondary winding of a transformer. 103 is a power conversion section (power force modifying means) which uses a switching element or the like to perform the modification of the power force between an alternating and a direct current. 28 is a voltage value detection means which detects a voltage of a connecting line which connects the AC system 1A to the primary winding 101. 29 is a current value detection means which detects a value of the current flowing in the connecting line.

113 is a three-phase to two-phase conversion section which converts a three-phase voltage signal detected by the voltage value detection means 28 to a two-phase voltage signal Vα, Vβ. 114 is a synchronous rotatory coordinate conversion section which converts two-phase voltage signals Vα, Vβ converted by the three-phase to two-phase conversion section 113 to signals Vd, Vq in a synchronous rotatory coordinate system.

115 is a three-phase to two-phase conversion section which converts a three-phase current signal detected by the current value detection means 29 to a two-phase current signal Iα, Iβ. 116 is a synchronous rotatory coordinate conversion section which converts two-phase current signals Iα, Iβ converted by the three-phase to two-phase conversion section 115 to signals Id, Iq in a synchronous rotatory coordinate system which has a positive phase rotational direction (a conventional synchronous rotatory coordinate conversion section which takes the influence of negative-sequence component to be positive-sequence component).

117 is a synchronous rotatory coordinate conversion section (negative-sequence component in a synchronous rotatory coordinate conversion means) which converts the two-phase current signals Iα, Iβ converted by three-phase to two-phase conversion section into signals Ind, Inq in a negative-sequence component in a synchronous rotatory coordinate system by applying the synchronous rotatory coordinate conversion device of fourth embodiment.

118 is an instruction value generating means which is supplied with a direct current voltage Vdc from the power system (the second power system) 1B and a corresponding instruction value Vdcr and which then generates instruction values Idr, Iqr which correspond to the current values Id, Iq in the synchronous rotatory coordinate system. Idr and Iqr can be instructed as necessary by an element not shown. 119 is an instruction value generating means which outputs a value 0 as an instruction value Indr which corresponds to the signal Ind in the negative-sequence component in a synchronous rotatory coordinate system. 120 is an instruction value generating means which output a value 0 as an instruction value Inqr which corresponds to the signal Inq in the negative-sequence component in a synchronous rotatory coordinate system. Apart from the above, Indr and Inqr instruction values can take other values of 0 as necessary.

121 is a current component control means which compares the instruction value Idr which is generated by the instruction value generation means or another means with the signal Id which is converted by the synchronous rotatory coordinate section 116 and which outputs a value corresponding to the result of the comparison. 122 is a parameter means which multiplies the value Xp which corresponds to the positive-sequence reactance with the signal Id which is converted by the synchronous rotatory coordinate section 116 and outputs a value which is further multiplied by −1. Needless to say, the sign of the value may be made opposite by the addition/subtraction means 130 which will be explained below instead of the parameter −1. Other operations are the same.

123 is a current component control means which compares the instruction value Iqr which is generated by the instruction value generation means 118 or another means with the signal Iq which is converted by the synchronous rotatory coordinate section 116 and outputs a value corresponding to the result of the comparison. 124 is a parameter means which outputs a value which is the multiple of the value Xp which corresponds the positive-sequence reactance with the signal Iq which is converted by the synchronous rotatory coordinate section 116.

125 is a current component control means which compares the instruction value Indr (for example=0) which is generated by the instruction value generation means 119 or another means with the signal Ind which is converted by the synchronous rotatory coordinate section 117 and outputs a value corresponding to the result of the comparison. When Indr=0, the comparison is unnecessary and the value Ind is fedback. 126 is a parameter means which outputs a value which is the multiple of the value Xn which corresponds the positive-sequence reactance with the signal Ind which is converted by the synchronous rotatory coordinate section 117 and further multiplies this value by −1. Of course the sign of the value may be changed by the addition means to be discussed below without multiplication by −1.

127 is a current component control means which compares the instruction value Inqr (for example=0) which is generated by the instruction value generation means 120 or another means with the signal Inq which is converted by the synchronous rotatory coordinate section 117 and outputs a value corresponding to the result of the comparison. 128 is a parameter means which outputs a value which is the multiple of the value Xn which corresponds the positive-sequence reactance with the signal Inq which is converted by the synchronous rotatory coordinate section 117.

129 is an addition/subtraction means which calculates the sum of the signal Vd which is converted by the synchronous rotatory coordinate section 114, the output value of the current component control means 121 and the output value of the parameter means 124 and which outputs the resultant total as a voltage instruction value Vcdr in a d axis of a synchronous rotatory coordinate system. 130 is an addition/subtraction means which calculates the sum of the signal Vq which is converted by the synchronous rotatory coordinate section 114, the output value or the current component control means 123 and the output value of the parameter means 122 and which outputs the resultant total as a voltage instruction value Vcqr in a q axis of a synchronous rotatory coordinate system.

131 is an addition/subtraction means which calculates the sum of the output value of the current component control means 125 and the output value of the parameter means 128 and which outputs the resultant total as a voltage instruction value Vcndr in a d axis of a synchronous rotatory coordinate system. 132 is an addition/subtraction means which calculates the sum of the output value of the current component control means 127 and the output value of the parameter means 126 and which outputs the resultant total as a voltage instruction value Vcnqr in a q axis of a synchronous rotatory coordinate system.

133 is a three-phase conversion section which converts the two-axis component after rotation to a three-phase component Vcp after the voltage instruction values Vcdr, Vcqr from the addition/subtraction means 129, 130 have been rotated by a phase θ of the AC power system 1A. 134 is a three-phase conversion section which converts the two-axis component after rotation to a three-phase component Vcn after the voltage instruction values Vcndr, Vcnqr from the addition/subtraction means 131, 132 have been rotated in a negative direction by a phase θ of the AC power system 1A. 135 is a synthetic section which adds a three-phase component Vcp, which is converted by the three-phase converter 133, and a three-phase component Vcn, which corresponds to the negative phase converted by the three-phase converter 134, to each respective phase and which outputs the calculated value Vcref to the converter 103 as a control signal.

The operation of the invention will now be explained.

Firstly the voltage value detection means 28 detects a voltage in the connecting line which connects the AC power system 1A to the primary coil 101 of the power conversion section 1. A three-phase voltage signal which expresses that voltage value is output to the three-phase to two-phase conversion section 113. The current value detection means 29 detects a current in the connecting line and outputs a three-phase current signal which expresses that current value to the three-phase to two-phase conversion section 115.

The three-phase to two-phase conversion section 113 converts the three-phase voltage signal detected by the voltage value detection means 28 to a two-phase voltage signal Vα, Vβ.

The synchronous rotatory coordinate conversion section 114 outputs a signal Vd to the addition/subtraction means 129 after the two-phase voltage signals Vα, Vβ are converted to signals Vd, Vq in a synchronous rotatory coordinate system and the signal Vq is output to the addition/subtraction means 130.

On the other hand, the three-phase to two-phase conversion section 115 converts the three-phase current signal detected by the current value detection means 29 to a two-phase current signal Iα, Iβ. The synchronous rotatory coordinate conversion section 116 outputs a signal Id to the current component control means 121 and the parameter means 122 after the two-phase current signals Iα, Iβ are converted to signals Id, Iq in a synchronous rotatory coordinate system and the signal Iq is output to the current component control means 123 and the parameter means 124. The synchronous rotatory coordinate conversion section 117 outputs a signal Ind to the current component control means 125 and the parameter means 126 after the two-phase current signals Iα, Iβ are converted to signals Ind, Inq in a negative-sequence component in a synchronous rotatory coordinate system. The signal Ind is output to the current component control means 125 and the parameter means 126 and the signal Inq is output to the current component control means 127 and the parameter means 128.

The instruction value generation means 118 is supplied with the direct current voltage Vdc in the power conversion section 103 or the power system 1B and the corresponding instruction value Vdcr. After an instruction value Idr, Iqr which corresponds to the current values Id, Iq in the synchronous rotatory coordinate system is generated, an instruction value Idr is output to the current component control means 121 and an instruction value Iqr is output to the current component control means 123. A current instruction may be added to the values Idr, Iqr from other components as needed. An instruction value generation means 119 outputs the value 0 to the current component control means 125 as an instruction signal Indr in a negative-sequence component in a synchronous rotatory coordinate system and an instruction value generation means 120 outputs the value 0 to the current component control means 127 as an instruction signal Inqr which corresponds to the signal Inq in a negative-sequence component in a synchronous rotatory coordinate system. As required, negative-sequence current instructions may be added to the values Indr, Inqr as needed from other components.

The current component control means 121 compares the instruction value Idr and the signal Id and outputs a value which depends on the result of the comparison to the addition/subtraction means 129. The parameter means 124 outputs a value which is the multiple of the value Xp which corresponds to the reactance of the positive-sequence component with the signal Iq. The addition/subtraction means 129 calculates the sum of the signal Vd, the output value of the current component control means 121, and the output value of the parameter means 124 and outputs the resultant total to the three-phase conversion section 133 as a voltage instruction value Vcdr in the d axis of the synchronous rotatory coordinate system.

The parameter means 122 multiplies the signal Id with the value Xp which corresponds to the positive-sequence reactance and outputs this value to the addition/subtraction means after further multiplying the value by −1. The current component control means 123 compares the instruction value Iqr and the signal Iq and outputs a value which corresponds to the result of the comparison to the addition/subtraction means 130. The addition/subtraction means 130 calculates the sum of the signal Vq, the output value of the current component control means 123, and the output value of the parameter means 122 and outputs the resultant total to the three-phase conversion section 133 as a voltage instruction value Vcqr in the q axis of the synchronous rotatory coordinate system.

In a similar way, the current component control means 125 compares the instruction value Indr and the signal Ind and outputs a value which corresponds to the result of the comparison to the addition/subtraction means 131. The parameter means 128 multiplies the signal Inq with the value Xn which corresponds to the negative-sequence reactance and outputs this value to the addition/subtraction means 131. The addition/subtraction means 131 calculates the sum of the output value of the current component control means 125 and the output value of the parameter means 128 and outputs the resultant total to the three-phase conversion section 134 as a voltage instruction value Vcndr in the d axis of the negative-sequence component in a synchronous rotatory coordinate system.

The parameter means 126 multiplies the signal Ind with the value Xn which corresponds to the negative-sequence reactance and outputs this value to the addition/subtraction means 132 after further multiplying it by −1. The current component control means 127 compares the instruction value Inqr and the signal Inq and outputs a value which corresponds to the result of the comparison to the addition/subtraction means 132. The addition/subtraction means 132 calculates the sum of the output value of the current component control means 127 and the output value of the parameter means 126 and outputs the resultant total to the three-phase conversion section 134 as a voltage instruction value Vcnqr in the q axis of the negative-sequence component in a synchronous rotatory coordinate system.

The three-phase converter 133 converts a two-axis component after rotation to a three-phase component Vcp after the voltage instruction value Vcdr, Vcqr has been rotated by a phase θ of the AC power system 1A. The three-phase converter 134 converts a two-axis component after rotation to a three-phase component Vcn after the voltage instruction value Vcndr, Vcnqr has been rotated in a negative direction to the three-phase conversion section 133 by a phase θ of the AC power system 1A. The synthesizing section 135 adds a three-phase component Vcp which is converted by the three-phase conversion section 133 and a three-phase component Vcn which corresponds to the negative phase which is converted by the three-phase conversion section 134 to each respective component and outputs a calculates value Vcref as a control signal to the power conversion section 103. The power conversion section 103 operates based on this control signal.

As shown above, a voltage value and a current value for the AC power system 1A are detected and are compared with the fixed instruction values Idr, Iqr, Indr, Inqr in a synchronous rotatory coordinate system. The power conversion section 103 is controlled based on the result of the comparison.

This control in a positive-sequence component in a synchronous rotatory coordinate system is performed based on signals Vd, Vq, Id, Iq in a synchronous rotatory coordinate system in which positive and negative-sequence components co-exist. Since inverse transformation performed by the three-phase conversion section 133 on the conversion of the Vd, Vq signals performed by the three-phase to two-phase conversion section 113 and the synchronous rotatory coordinate conversion section 114, the three-phase voltage signal which is detected by the voltage value detection means 28 appears again in Vcref as a three-phase component which corresponds to the signals Vd, Vq.

Although the original pulsating component mentioned above is contained in the signals Id and Iq, it is possible to reduce the size of the pulsating component which corresponds to the original signal component by increasing the gain of the current component control means 123 and the current component control means 121. By reducing the pulsating component, the current value is accurately controlled and the current of the negative-sequence component is suppressed.

It is possible to reduce stationary errors of the instruction values Indr, Inqr and Ind, Inq by a control system which corresponds to the signals Ind, Inq for example the integration control contained in the current component control means 125. Thus the current value Ind, Inq of the negative-sequence component is more accurately controlled.

As shown above, according to sixth embodiment, the pulsating component after coordinate conversion is reduced by synthesizing a signal after conversion, which delays a signal after coordinate conversion to the synchronous rotatory coordinate system by a fixed time, and a signal after delay. Thus it is possible to reduce the pulsating component contained in the negative-sequence component of the current value and to accurately control the power system.

Since control in the positive-sequence of the synchronous rotatory coordinate system is executed in this way based on a signal in the synchronous rotatory coordinate system in which positive and negative-sequences are mixed without separating positive and negative-sequences, it is possible to improve the response time during control. At this time, it is possible prioritize control of the high response time on the positive-sequence side and to control the control system with respect to the negative-sequence components although the response time is slow. In particular by making the negative-sequence instruction values Indr, Inqr, equal to zero, interference from the positive-sequence and negative-sequence control is reduced. The present invention may be adapted to other devices and is not limited by the present embodiment.

Seventh Embodiment

Figure 20:
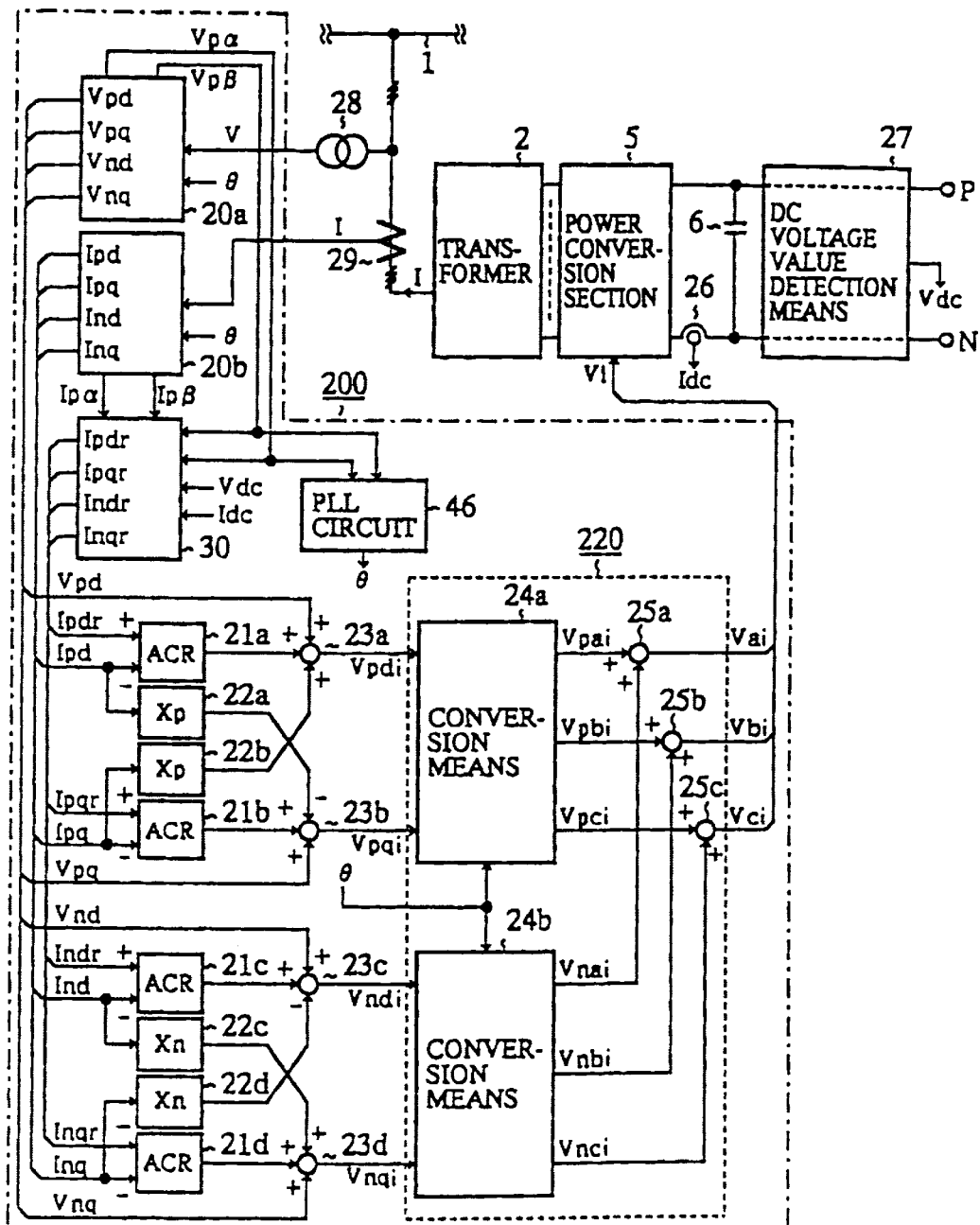
FIG. 20 shows a power conversion apparatus according to a seventh embodiment of the present invention.

FIG. 20 shows a power conversion apparatus according to seventh embodiment of the present invention. In FIG. 20, 1 is a three-phase alternating current power system to which a power conversion apparatus is attached. 2 is a transformer comprised of a primary and a secondary winding, 5 is a power conversion section which executes power conversion between alternating and direct currents using a switching element such as a GTO, 6 is a direct current capacitor, 28 is a voltage value detection means which detects a voltage value in a connecting line which connects the transformer 2 and the alternating power system 1, 29 is a current value detection means which detects a value of a current which is flowing in a connecting line, 200 is a control section (current component control section) which controls the power conversion section 5 based on a detected value by the voltage value detection means 28 and the current value detection means 29.

26 is a direct current voltage value detection means which detects a value Idc of a direct current which is mixed in a power conversion section 5. 27 is a direct current voltage detection means which detects a direct current voltage value Vdc in a direct current power system connected to the power conversion section 5.

In the controller 200, 20a is a operation means which calculates positive-sequence components Vpα, Vpβ, and negative-sequence components Vnα, Vnβ, which respectively correspond to the orthogonal two-axis (α,β,), from the voltage value detected by the voltage value detection means 28 and coordinate converts these values to a synchronous rotatory coordinate system (d, q). The positive-sequence components and the negative-sequence components of the d axis component and the q axis component Vpd, Vpq, Vnd, Vnq in the synchronous rotatory coordinate system are output.

20b is a operation means (operation means, separation means) which calculates positive-sequence components Ipα, Ipβ, and negative sequence components Inα, Inβ, which respectively correspond to the fixed two-axis (α,β,), from the current value detected by the current value detection means 29 and coordinate converts these values to a synchronous rotatory coordinate system (d, q). The positive-sequence components and the negative-sequence components of the d axis component and the q axis component Ipd, Ipq, Ind, Inq in the synchronous rotatory coordinate system are output. In the present embodiment, coordinate conversion to a synchronous rotatory coordinate system is performed after the conversion of three-phase to two-phase (α,β,). However it is possible to perform direct coordinate conversion from three-phase to the synchronous rotatory coordinate system.

30 is an instruction value generation means which generates instruction values Ipdr, Ipqr, Indr, Inqr which correspond to the positive-sequence and negative-sequence d axis and q axis components Ipd, Ipq, Ind, Inq in the synchronous rotatory coordinate system based on the positive-sequencecomponent Vpα, Vpβ, calculated by the operation means 20a, the positive-sequence component Ipα, Ipβ calculated by the operation means 20b, the direct current voltage Vdc of the direct current power system which is connected to the power conversion section 5, and the DC current Idc which is input into the power conversion section 5.

21a–21d are current component control means which compare the current components Ipd, Ipq, Ind, Inq output by the operation means 20b with the current instruction values Ipdr, Ipqr, Indr, Inqr which are output by the instruction value generation means 30 and which then output the result of the comparison to the addition/subtraction means 23a, 23b, 23c, 23d.

22a is a parameter means which multiplies the value Xp which corresponds with the positive-sequence reactance with the positive-sequence component of the d axis component Ipd which is output by the operation means 20b. 22b is a parameter means which multiplies the value Xp which corresponds with the positive-sequence reactance with the positive-sequence component of the q axis component Ipq which is output by the operation means 20b.

22c is a parameter means which multiplies the value Xn which corresponds with the negative-sequence reactance with the negative-sequence component of the d axis component Ind which is output by the operation means 20b. 22d is a parameter means which multiplies the value Xn which corresponds with the negative-sequence reactance with the negative-sequence component of the q axis component Inq which is output by the operation means 20b.

23a is an addition/subtraction means which adds the sum of the positive-sequence component of the d axis component Vpd which is output by the operation means 20a, the output value of the current component control means 21a, and the output value of the parameter means 22b and outputs the total as a control signal of a positive-sequence component of the d axis component Vpdi. 23b is an addition/subtraction means which subtracts the output value of the parameter means 22a from the sum of the positive-sequence component of the q axis component Vpq which is output by the operation means 20a and the output value of the current component control means 21b, and outputs the total as a control signal of a positive-sequence component of the q axis component Vpqi.

23c is an addition/subtraction means which subtracts the output value of the parameter means 22d from the sum of the negative-sequence component of the d axis component Vnd which is output by the operation means 20a and the output value of the current component control means 21c, and outputs the total as a control signal of a negative-sequence component of the d axis component Vndi. 23d is an addition/subtraction means which adds the sum of the negative-sequence component of the q axis component Vnq which is output by the operation means 20a, the output value of the current component control means 21d, and the output value of the parameter means 22c and outputs the total as a control signal of a negative-sequence component of the q axis component Vnqi.

24a is a conversion means which converts the two-axis component (α, β axis) after rotation to the three-phase component Vpai, Vpbi, Vpci after the control signal of the positive-sequence component Vpdi, Vpqi from the addition/subtraction means 23a, 23b has been rotated by a phase θ of the AC power system 1. Another method shown in FIG. 23 allows the direct conversion into the three-phase component Vpai, Vpbi, Vpci. 24*b* is a conversion means which converts the two-axis component (α, β axis) after rotation to the three-phase component Vnai, Vnbi, Vnci after the control signal of the negative-sequence component Vndi, Vnqi from the addition/subtraction means 23*c*, 23*d* has been rotated in the opposite direction to the positive-sequence component by a phase θ of the AC power system.

25*a*, 25*b* is an addition means which adds the three-phase component Vpai, Vpbi, Vpci. of the positive-sequence converted by the conversion means 24*a* and the three-phase component Vnai, Vnbi, Vnci of the negative-sequence converted by the conversion means 24*b* and outputs the totals Vai, Vbi, Vci to the power conversion section 5 as a control signal. The conversion means 24*a*, 24*b* and the addition means 25*a*–25*c* comprise the circuit 220 which generates the three-phase control signal Vai, Vbi, Vci of the signals from the addition/subtraction means 23*a*–23*d*. However the structure of the circuit is not limited to that shown in the present embodiment and may be in the form of another having the same function (for example the operation means in FIG. 31 may be used).

As a reference signal for the positive-sequence component Vpα, Vpβ of the voltage value calculated by the operation means 20*a*, 46 is a phase operation means such as a PLL (phase locked loop) circuit which outputs a rotational angle of a vector (Vpα, Vpβ) as the phase θ of the voltage of the AC power system.

Figure 21:
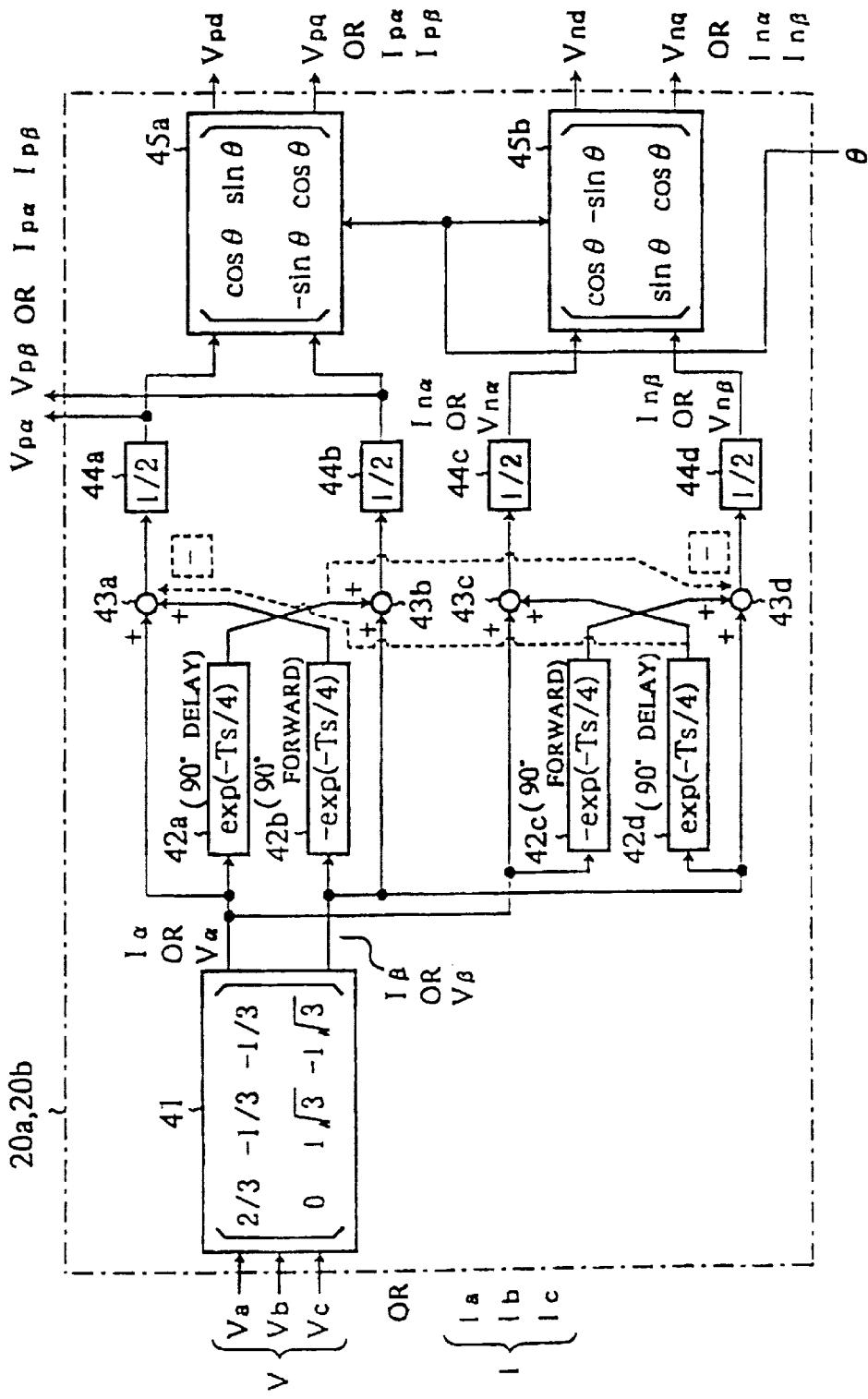
FIG. 21 is a block diagram showing the details of the operation means of FIG. 20.

FIG. 21 is a block diagram showing a detail of the operation means of FIG. 20. The operation means 20*b* is similar and a current value may be input instead of a voltage value. In the figure, 41 is a three-phase to two-phase conversion means which converts a voltage value Va, Vb, Vc detected by the voltage detection means 28 into a component Vα, Vδ which corresponds to the orthogonal two-axis (α,β).

42*a* and 42*d* are phase shifters which respectively delay, by 90 degrees, the phase of the α axis component Vα and the β axis component Vβ which are detected by the three-phase to two-phase detection means 41. 42*b* and 42*c* are phase shifters which respectively forward, by 90 degrees, the phase of the α axis component Vα and the β axis component Vβ.

For example the phase shifter 42*a*, 42*d* delay and output an input value which is delayed by a ¼ cycle. The phase shifters 42*b*, 42*c* forward the phase by 90 degrees by outputting a value of the which the sign has been reversed after the input value has been delayed by a ¼ cycle. Furthermore it is possible to use the integral element (ω/s, where s is Lapacean) as a phase shifter which has an integral parameter of the angular frequency ω of the AC power system.

As shown by the broken line in the figure, a value representing the output of the phase shifter 42*d*, the sign of which has been reversed, is input into the addition/subtraction means 43*a* instead of the output of the phase shifter 42*b*. Thus the phase shifter 42*b* can be omitted. In the same way, a value representing the output of the phase shifter 42*a*, the sign of which has been reversed, is input into the addition/subtraction means 43*d* instead of the output of the phase shifter 42*b*. Thus the phase shifter 42*c* can be omitted.

43*a* is an addition/subtraction means which calculates and outputs the sum of the α axis component Vα converted by the three-phase to two-phase conversion means 41, and the β component Vβ, the phase of which has been forwarded by 90 degrees by the phase shifter 42*b*. 43*b* is an addition/subtraction means which calculates and outputs the sum of the β component Vβ converted by the three-phase to two-phase conversion means 41, and the α axis component Vα the phase of which has been delayed by 90 degrees by the phase shifter 42*a*.

43*c* is an addition/subtraction means which calculates and outputs the sum of the α axis component Vα and the β component Vβ, the phase of which has been delayed by 90 degrees by the phase shifter 42*d*. 43*d* is an addition/subtraction means which calculates and outputs the sum of the β component Vβ and the α axis component Vα, the phase of which has been forwarded by 90 degrees by the phase shifter 42*c*.

44*a*, 44*b*, 44*c*, 44*d* are parameter means which respectively halve the value of the output of the addition/subtraction means 43*a*, 43*b*, 43*c*, 43*d* and which respectively output these values as Vpα, Vpβ, Vnα, Vnβ.

45*a* is the vector rotating means which rotates the vector (Vpα, Vpβ) of the positive-sequence component in the α-β axial coordinate in the same direction as the rotational direction as the positive-sequence by a phase θ according to Formula (5) and which generates a positive-sequence component Vpd, Vpq in a positive-sequence of a synchronous rotatory coordinate.

$$\begin{bmatrix} Vpd \\ Vpq \end{bmatrix} = \begin{bmatrix} \cos\theta & \sin\theta \\ -\sin\theta & \cos\theta \end{bmatrix} \begin{bmatrix} Vp\alpha \\ Vp\beta \end{bmatrix}. \tag{5}$$

45*b* is the vector rotating means which rotates the vector (Vnα, Vnβ) of the negative-sequence component in the α-β axial coordinate in the same direction as the rotational direction as the positive-sequence by a phase θ according to Formula (6) and which generates a negative-sequence component Vnd, Vnq in a positive-sequence of a synchronous rotatory coordinate.

$$\begin{bmatrix} Vnd \\ Vnq \end{bmatrix} = \begin{bmatrix} \cos\theta & -\sin\theta \\ \sin\theta & \cos\theta \end{bmatrix} \begin{bmatrix} Vn\alpha \\ Vn\beta \end{bmatrix}. \tag{6}$$

The phase shifter 42*c*, 42*d* the addition/subtraction means 43*c*, 43*d*, the coefficient means 44*c*, 44*d* and the vector rotating means 45*b* function as a negative-sequence coordinate conversion means.

Figure 22:
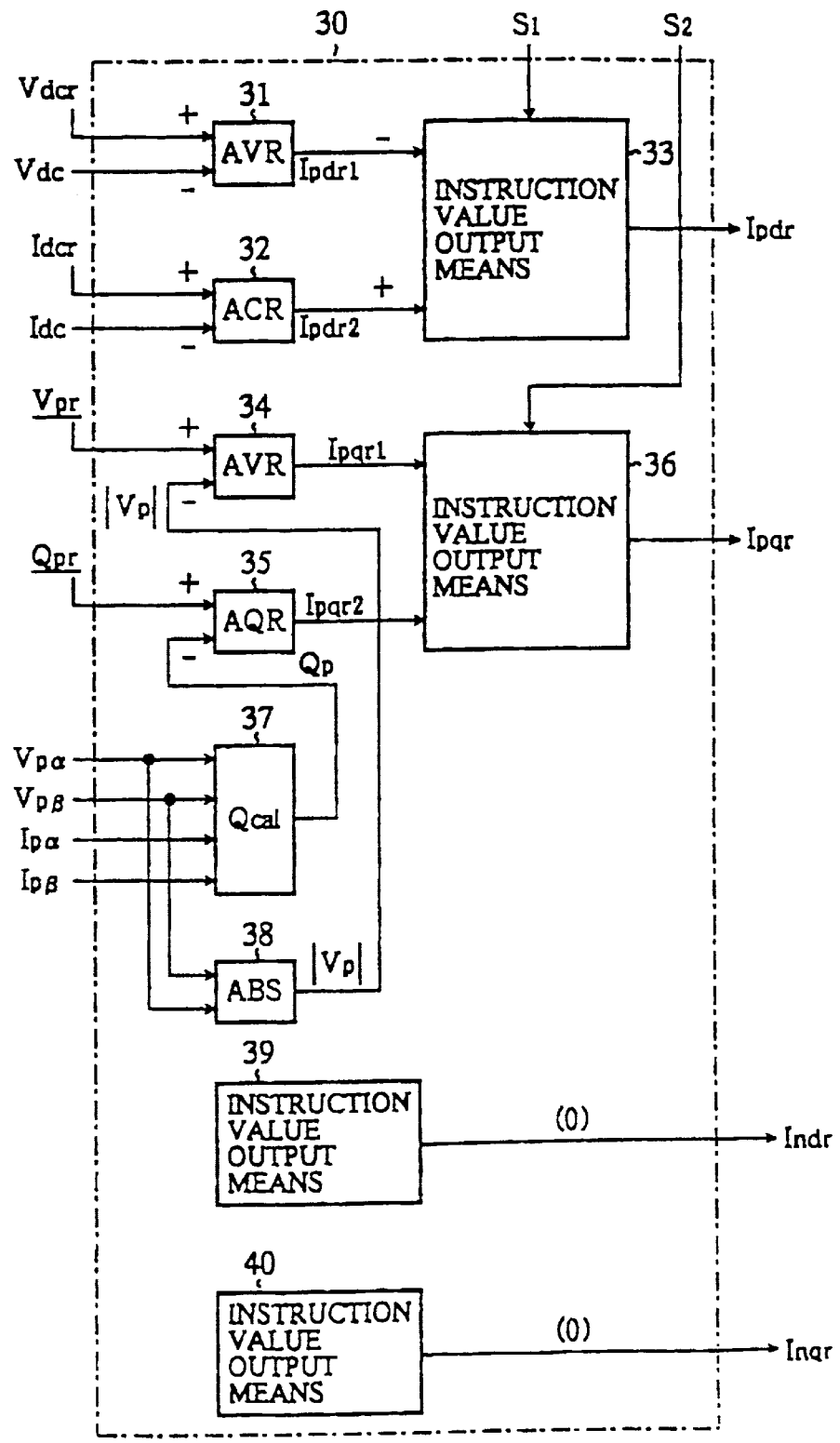
FIG. 22 is a block diagram showing the details of the instruction value generation means of FIG. 20.

FIG. 22 is a block diagram which shows the detailed structure of an instruction value generating means 30 of FIG. 20. In the diagram, 31 is an instruction value operation means (a direct current voltage regulator) which compares the fixed direct current voltage instruction value Vdcr and the voltage Vdc of the direct current power system detected by the direct current voltage detection means 27 and which outputs a first current instruction value Ipdr1 of the d axial component of the positive-sequence component.

37 is an operation means which the positive-sequence component of the positive-sequence component of the reactive electricity power Qp (=Vpα×Ipβ−Vpβ×Ipα) from the positive-sequence component of the voltage value Vpα, Vpβ calculated by the operation means 20*a* and the positive-sequence current value Ipα, Ipβ calculated by the operation means 20*b*. 38 is an absolute value operation means which calculates the size of the absolute value of the positive-sequence component of the voltage value |Vp|, that is to say, the vector (Vpα, Vpβ) based on the positive-sequence component of the voltage value Vpα, Vpβ which is calculated by the operation means 20*a*.

34 is an instruction value operation means which calculates and outputs a first current instruction value Ipqr1 of the positive-sequence component of the q axial component (the reactive current of the positive-sequence component) based on the difference between the positive-sequence instruction value Vpr supplied from outside and the absolute value |Vp| of the voltage value of the positive-sequence component calculated by the absolute value operation means 38. 35 is an instruction value operation means which calculates and outputs a second current instruction value Ipqr2 of the positive-sequence component of the q axial component (the reactive current of the positive-sequence component) based on the difference between the positive-sequence component reactive power instruction value Qpr supplied from outside and the reactive power Qp of the positive-sequence component calculated by the absolute value operation means 37.

33 is an instruction output means which selects, on the basis of a selection signal S1 which is input depending on the use purpose, a first current instruction value Ipdr1 or a second current instruction value Ipdr2 of the d axial component above depending on a selection signal S1 supplied from outside and which either outputs the value as a current instruction value Ipdr of the d axial component or outputs a current instruction value Ipdr on the d axial component of the positive-sequence component which is the sum of the first current instruction value Ipdr1 and a second current instruction value Ipdr2 which is weighted by a fixed ratio depending on the signal S1. 36 is an instruction output means which selects, on the basis of a signal S2 which is input depending on the purpose, a first current instruction value Ipqr1 or a second current instruction value Ipqr2 of the q axial component above depending on a selection signal S2 supplied from outside and which either outputs the value as a current instruction value Ipqr of the q axial component or outputs a current instruction value Ipqr on the q axial component of the positive-sequence component which is the sum of the first current instruction value Ipqr1 and a second current instruction value Ipqr2 which is weighted by a fixed ratio depending on the signal S2.

39 is an instruction output means which outputs a value of zero as the current instruction value Indr of the d axial component of the negative-sequence component. 40 is an instruction output means which outputs a value of zero as the current instruction value Inqr of the q axial component of the negative-sequence component. The instruction value output means 39, 40 may also calculate and output a negative-sequence component current instruction value from the negative-sequence components Vnα, Vnβ, Inα, Inβ calculated by the operation means 20a, 20b in the same way as the above means 31–38 depending on the use of the electrical conversion device. Apart from the above, the instruction may be given from the outside depending on the purpose.

Figure 23:
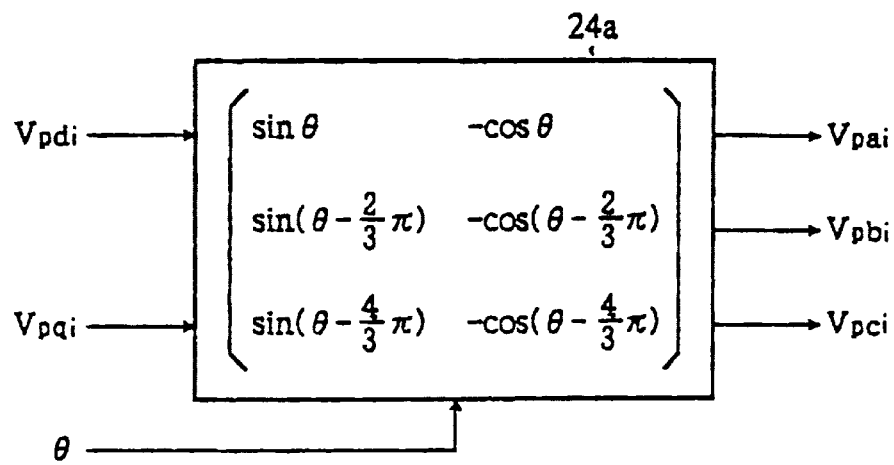
FIG. 23 is a block diagram showing a conversion means in FIG. 20.

FIG. 23 is a block diagram showing the conversion means 24a of FIG. 20. In the figure, 24a is a conversion means which converts the positive-sequence component of the voltage instruction value Vpdi, Vpqi, which is separated into the d axial component and the q axial component, into the positive-sequence component of the voltage instruction value Vpai, Vpbi, Vpci, which depend on each of three-phases, according to Formula (7).

$$\begin{bmatrix} Vpai \\ Vpbi \\ Vpci \end{bmatrix} = \begin{bmatrix} \cos\theta & -\sin\theta \\ \cos\left(\theta - \frac{2}{3}\pi\right) & -\sin\left(\theta - \frac{2}{3}\pi\right) \\ \cos\left(\theta - \frac{4}{3}\pi\right) & -\sin\left(\theta - \frac{4}{3}\pi\right) \end{bmatrix} \begin{bmatrix} Vpdi \\ Vpqi \end{bmatrix}. \tag{7}$$

The conversion means 24b also converts the negative-sequence component of the voltage instruction value Vndi, Vnqi, which is separated into the d axial component and the q axial component, into the negative-sequence component of the voltage instruction value Vnai, Vnbi, Vnci which depend on each of the three-phases according to Formula (8). If the sign of θ is reversed, using the positive-sequence calculation method in Formula (8), the conversion Formula (8) of the conversion means 24a is used.

$$\begin{bmatrix} Vnai \\ Vnbi \\ Vnci \end{bmatrix} = \begin{bmatrix} \cos\theta & \sin\theta \\ \cos\left(\theta + \frac{2}{3}\pi\right) & \sin\left(\theta + \frac{2}{3}\pi\right) \\ \cos\left(\theta + \frac{4}{3}\pi\right) & \sin\left(\theta + \frac{4}{3}\pi\right) \end{bmatrix} \begin{bmatrix} Vpdi \\ Vpqi \end{bmatrix}. \tag{8}$$

Figure 24:
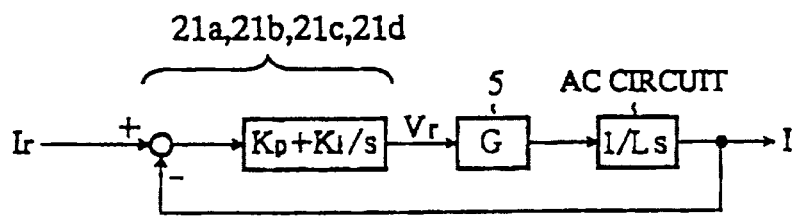
FIG. 24 is a block diagram showing the unity feedback system that is equivalent in function to the control system of the power conversion apparatus.

FIG. 24 is a block diagram showing the unity feedback control system and the control system of the power conversion apparatus. The current component control means 21a, 21b, 21c, 21d compare the current component Ipd, Ipq, Ind, Inq output by the operation means 20b (I in the figure) with current instruction values Ipdr, Ipqr, Indr, Inqr (Ir in the figure) output by the instruction value generation means 30 and output the result of the comparison.

In the current component control means 21a, 21b, 21c, 21d, the multiple of the difference of the current component I and the current instruction value Ir with the proportional parameter Kp is calculated. Then the integral of the difference of I and Ir is multiplied by the integral parameter which satisfies the condition formula expressed in Formula (9). The current component control means 21a, 21b, 21c, 21d output the sum of the two values.

$$Ki \leq (1/30) \times KP^2 \times G/L. \tag{9}$$

However G is a ratio of the voltage which the power conversion section 5 generates with respect to the voltage of the alternating current power system 1 and the voltage of the control signal Vi input to the power conversion section 5 and represents the synthesized gain of the transformer and the power conversion section 5. L is circuit inductance which contains the transformer which views the alternating current power system from the internally generated voltage of the power conversion section which is generated to the primary winding of the transformer 2.

The desired proportional parameter Kp is set depending on the target response frequency ωc which is required by the power conversion apparatus. In other words, the cross over frequency, in which the open loop gain of the control system shown in FIG. 20 takes a value of 1 when the integral parameter Ki is zero, is taken as the target response frequency ωc. Thus from Formula (10), the desired proportional parameter Kp is set depending on Formula (11).

$$\omega c = Kp \times G/L, \tag{10}$$

$$Kp = \omega c \times L/G. \tag{11}$$

The operation of the invention will now be explained.

The operation means 20a of the control section 200 calculates a positive-sequence component Vpα, Vpβ and a negative-sequence component Vnα, Vnβ, which correspond respectively to the orthogonal two-axis (α and β axis), from the voltage value detected by the voltage value detection means 28. It then coordinate converts these values to the synchronous rotatory coordinate system (d, q), and outputs the positive-sequence component of the d axial component Vpd and the q axial component Vpq and negative-sequence component of the d axial component Vnd and the q axial component Vnq in the synchronous rotatory coordinate system.

In other words, the operation means 20*a* first converts the three-phase voltage values Va, Vb, Vc which are detected by the voltage value detection means 28 to components Vα, Vβ which correspond to the orthogonal two-axis (α, β) by the three-phase to two-phase conversion means 41.

Next the operation means 20*a* separates each component into the negative-sequence components Vnα, Vnβ and the positive-sequence components Vpα, Vpβ by the phase shifter 42*a*–42*d*, the addition/subtraction means 43*a*–43*d* and the parameter means 44*a*–44*d*.

The operation means 20*a* rotates the positive-sequence components of the vector (Vpα, Vpβ) in the α-β axial coordinate in the same direction as the rotational direction of the positive-sequence components by a phase of θ according to Formula (5) by the vector rotating means 45*a*, 45*b*. It then generates and outputs a positive-sequence component Vpd, Vpq in the synchronous rotatory coordinate system. At the same time, the negative-sequence components of the vector (Vnα, Vnβ) in the α-β axial coordinate are rotated in the same direction as the rotational direction of the negative-sequence components by a phase of θ according to Formula (6). The operation means 20*a* then generates and outputs a negative-sequence component Vnd, Vnq in the synchronous rotatory coordinate system.

In this way, the operation means 20*a* outputs a positive-sequence component of the d axial component Vpd and a q axial component Vpq and a negative-sequence component of the d axial component Vpd and a q axial component Vpq in the synchronous rotatory coordinate system.

In the same way, the operation means 20*b* calculates a positive-sequence component Ipα, Ipβ and a negative-sequence component Inα, Inβ, which correspond respectively to the fixed two-axis (α and β axis), from the current value detected by the current value detection means 29. It then coordinate converts these values to the synchronous rotatory coordinate system (d, q), and outputs the positive-sequence component of the d axial component Ipd and the q axial component Ipq and negative-sequence component of the d axial component Ind and the q axial component Inq in the synchronous rotatory coordinate system.

The instruction value generation means 30 generates the current instruction values Ipdr, Ipqr, Indr, Inqr which correspond to the positive and negative-sequence component of the d axial component and the q axial component Ipd, Ipq, Ind and Inq in the synchronous rotatory coordinate system based for example on the positive-sequence component Vpα, Vpβ of the voltage value detected above, the detected current value of the positive-sequence component Ipα, Ipβ, the direct current voltage Vdc of the direct current power system which is connected to the power conversion section 5, the direct current Idc input into the power conversion section 5 or the like.

That is to say, the instruction value generation means 30 for example, firstly compares the fixed direct current voltage instruction value Vdcr from the instruction value operation means 31 with the voltage value Vdc of the direct current power system detected by the direct current value detection means 27 and then calculates a first current instruction value Ipdr1 of the positive-sequence components of the d axial component. Otherwise it compares the fixed direct current instruction value Idcr from the instruction value operation means 32 with the current value Idc detected by the direct current value detection means 26 and then calculates a second current instruction value Ipdr2. Furthermore depending on a selection signal S1 from the outside, the positive-sequence components of the first d axis current instruction value Ipdr and the second d axis current instruction value Ipdr2 are selected or calculated by weighted means and output as a positive-sequence component of the d axis current instruction value Ipdr.

On the other hand, the instruction value generation means 30 for example firstly calculates a reactive electric power Qp of the positive-sequence component from the positive-sequence component of the voltage value Vpα, Vpβ calculated by the operation means 20*a* and the positive-sequence component of the current value Ipα, Ipβ calculated by the operation means 20*b*. Furthermore the absolute value operation means 38 calculates an absolute value |Vp| of the voltage value of the positive-sequence component from the positive-sequence component of the voltage value Vpα, Vpβ.

The instruction value generation means 30, for example, calculates a first current instruction value Ipqr1 of the positive-sequence component of the q axis based on the difference of the positive-sequence instruction value Vpr supplied from the outside by the instruction value operation means 34 and the absolute value |Vp| of the voltage value of the positive-sequence component calculated by the absolute value operation means 38. The instruction value generation means 30 further calculates a second current instruction value Ipqr2 based on the difference of the positive-sequence reactive electric power instruction value Qpr supplied from the outside by the instruction value operation means 35 and the reactive electric power Qp of the positive-sequence component calculated by the operation means 37. Furthermore depending on a selection signal S2 given from the outside, a first current instruction value Ipdr1 and the second current instruction value Ipdr2 are selected or calculated by weighted means and output as a positive-sequence component of the q axis component of the current instruction value Ipqr.

The current value generation means 30 for example outputs zero as a negative-sequence component of a d axial component of a current instruction value Indr from the instruction value output means 39 and outputs zero as a negative-sequence component of a q axial component of a current instruction value Inqr from the instruction value output means 40.

In this way, the instruction value generation means 30 outputs each current instruction value Ipdr, Ipqr, Indr, Inqr. Also direct current voltage and direct current are controlled by the operation of the current instruction value Ipdr of the positive-sequence of the d axial component. The output voltage or output of the reactive electric power by the power conversion means 5 is controlled by the operation of the current instruction value Ipq of the positive-sequence of the q axial component.

The current component control means 21*a*–21*d* compares respectively the current components Ipd, Ipq, Ind, Inq output by the operation means 20*b* with the current instruction value Ipdr, Ipqr, Indr, Inqr output by the instruction value generation means 30 and outputs the respective results of the comparison to the addition/subtraction means 23*a*, 23*b*, 23*c*, 23*d*.

On the other hand, the parameter means 22*a*, 22*b* multiplies the value Xp which corresponds to positive-sequence reactance with the positive-sequence component Ipd, Ipq of the current output from the operation means 20*b* and respectively outputs the value of the multiple to the addition/subtraction means 23*a*, 23*b*. The parameter means 22*c*, 22*d* multiplies the value Xn which corresponds to negative-sequence reactance with the negative-sequence component Ind, Inq of the current output from the operation means 20*b* and respectively outputs the value of the multiple to the addition/subtraction means 23*d*, 23*c*.

The addition/subtraction means 23a calculates the sum of the d axial component of the positive-sequence component of the voltage output by the operation means 20a, the output value of the current component control means 21a and the output value of the parameter means 22b and outputs the result to the conversion means 24a as a positive-sequence component of the d axial component Vpdi of the voltage control signal. The addition/subtraction means 23b subtracts the output value of the parameter means 22a from the sum of the q axial component Vpq of the positive-sequence component of the voltage output by the operation means 20a, the output value of the current component control means 21a and outputs the result to the conversion means 24a as a positive-sequence component of the q axial component Vpqi of the voltage control signal.

In the same way, the addition/subtraction means 23c subtracts the output value of the parameter means 22d from the sum of the d axial component Vnd of the negative-sequence component of the voltage output by the operation means 20a and the output value of the current component control means 21a and outputs the result to the conversion means 24b as a negative-sequence component of the d axial component Vndi of the voltage instruction signal. The addition/subtraction means 23d calculates the sum of the q axial component Vnq of the negative-sequence component of the voltage output by the operation means 20a, the output value of the current component control means 21d and the output value of the parameter means 22c and outputs the result to the conversion means 24b as a negative-sequence component of the q axial component Vnqi of the voltage instruction.

The conversion means 24a converts the positive-sequence components Vpdi, Vpqi of the voltage instruction from the addition/subtraction means 23a, 23b to a three-phase voltage instruction (positive-sequence) Vpai, Vpbi, Vpci in accordance with Formula (7). The conversion means 24b converts the negative-sequence component Vndi, Vnqi of the voltage instruction from the addition/subtraction means 23c, 23d to a three-phase voltage instruction (negative-sequence) Vnai, Vnbi, Vnci in accordance with Formula (8).

The addition/subtraction means 25a, 25b, 25c adds respectively the positive-sequence component of the three-phase voltage instruction Vpai, Vpbi, Vpci converted by the conversion means 24a to the negative-sequence component of the three-phase voltage instruction Vnai, Vnbi, Vnci converted by the conversion means 24b and outputs the calculated value Vai, Vbi, Vci to the power conversion section 5 as a voltage instruction signal Vi.

The power conversion section 5 performs power conversion by the bridge connected switching element switching in response to a supplied control signal. At this time, the ON-OFF time ratio and the switching phase are controlled. It is possible to use a switching control means known in the art for this purpose.

In this way, the power conversion section 5 is controlled by the control section 200 in the power conversion apparatus.

Next a simulation result of simulating the operation of the power conversion apparatus in a power system will be explained.

Figure 25:
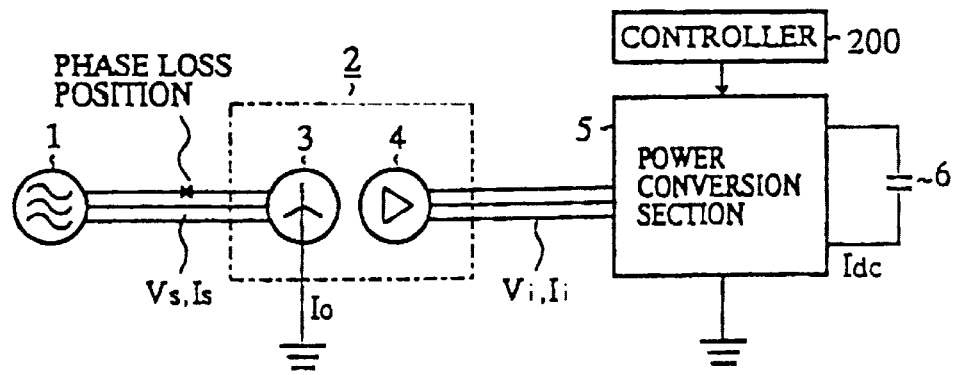
FIG. 25 is a diagram to explain a simulation by an electrical power simulator.

FIG. 25 is an explanatory figure which shows a simulation performed by an power system simulator. In this simulation, the estimation of the current value or the voltage value in each position is calculated when one phase interruption (that is to say when one line is open) is generated in an alternating current power system 1 by supplying only the positive-sequence component of the reactive electric current instruction value Ipqr and making the other instruction value zero. In the simulation, the number of phases in the power conversion section 5 were sufficiently high and the carrier frequency of the PWM modulation was sufficiently high.

Figure 26:
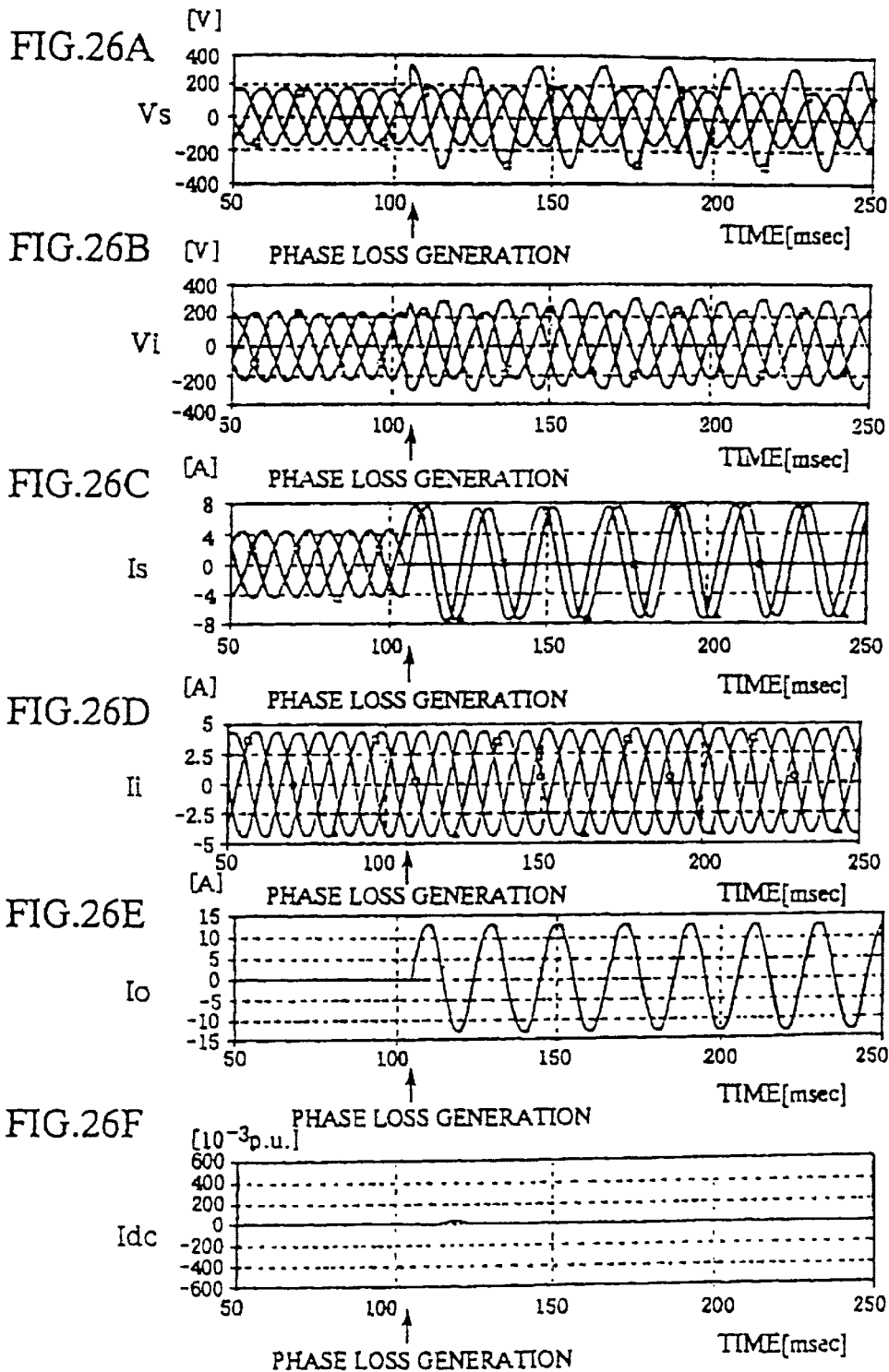
FIGS. 26A to 26F are diagrams showing the estimation of current and voltage at each position calculated by the simulation.

FIGS. 26A to 26F show the estimation of current and voltage values at each position calculated by the simulation. FIG. 26A shows the estimation of a phase voltage Vs of the alternating current power system 1 in the transformer 2. FIG. 26B shows the estimation of a voltage Vi to ground on the power conversion section 5 of the transformer 2. FIG. 26C shows the estimation of a line current Is of the alternating current power system 1. FIG. 26D shows the estimation of a line current Ii of the transformer 2 of the power conversion section 5. FIG. 26E shows the estimation of a neutral line current Io of the transformer 2. FIG. 26F shows the estimation of a current Idc on the direct current power system side of the power conversion section 5.

When phase interruption occurs, the line voltage of the phase in which interruption has occurred rises (refer to FIG. 26A). At this time, the line current of the phase in which interruption has occurred becomes zero (refer to FIG. 26C).

In the present situation, since the primary and secondary windings of the transformer 2 are connected by a star-delta connection, the two-phase voltage of the line voltage Vi to ground on the side of the power conversion section 5 of the transformer 2 rises (refer to FIG. 26B). At this time, the output current Ii of the power conversion section 5 remains a balanced three-phase current (refer to FIG. 26D). In other words, only the positive-sequence component of the current flows and the negative-sequence component of the current is suppressed. However since one phase of the alternating current power system is undergoing phase interruption, a neutral line current Io is generated in the primary winding line 3 of the transformer 2 (refer to FIG. 26E). Furthermore since the generation of the negative-sequence component of the current is suppressed, the power, which is the product of the current and the voltage of the positive-sequence is maintained at a roughly constant level and the power which is the product of the current of the positive-sequence component and the voltage of the negative-sequence component is suppressed. Thus the instantaneous value from the power conversion section 5 is roughly maintained before and after the phase interruption.

In this way, the power conversion section 5 undergoes almost no fluctuation during phase interruption and has improved operation characteristics with respect to unsymmetrical operation of the alternating power system 1. Furthermore twice-frequency pulsation of direct and alternating current in a direct current power system which is generated by the conventional power conversion apparatus when unsymmetrical voltages are present, is suppressed. Furthermore high frequencies such as triple frequency in three-phase alternating currents in an alternating current power system 1 which are generated in the output current or output voltage of the power conversion sections are suppressed.

As shown above, according to seventh embodiment, since feedback control is performed with respect to respectively the four components Ipd, Ipq, Ind, Inq of the line current output to the alternating current power system 1, the influence of each type of cause of error is suppressed and it is possible to set the line current output to the alternating current power system 1 accurately to the instruction value.

Furthermore since the control signal which is supplied to the power conversion section 5 is generated based on the positive-sequence component of the d axial component Vpd and the q axial component Vpq and the negative-sequence component of the d axial component Vnd and the q axial component Vnq which are lead through from the alternating current power system 1, it is possible to suppress unsymmetrical output current in the power conversion section 5 which is caused by lack of symmetry or fluctuations in the voltage of the alternating current power system 1.

Since circuit reactance is calculated not by the current instruction value but on the basis of the d axial component Ipd and the q axial component Ipq of the positive-sequence component and the negative-sequence component of the d axis Ind and the q axis Inq lead through from the detected three-phase line current, it is possible to accurately calculate the voltage of the circuit reactance based on each component of the current. That is to say, it is possible to accurately separate the voltage of the circuit reactance into the d axial component and the q axial component and thus it is possible to supply an accurate control signal to the power conversion section 5.

Furthermore since the value which satisfies the condition expressed in Formula (9) is set to the integral parameter Ki in the current component control means 21a, 21b, 21c, 21d, it is possible to improve the phase characteristics of the control system which deteriorate due to the unnecessary time elements which originate in the switching operation of the switching element of the PWM modulation. Thus response time can be reduced. That is to say, it is possible to increase stability with the same desired proportional parameter Kp. In other words, Kp is increased at the same stability and the response speed is increased.

In the conventional device, the integral parameter Ki was set according to the Formula (12) so that the degree of overshoot is most appropriate in the step response. However when it is set in this way, it is desirable to set the value in the power conversion apparatus of seventh embodiment according to Formula (8) above since a sufficient response speed or stability is not obtained.

$$Ki=(1/10\sim1/5)\times KP^2\times G/L. \qquad (12)$$

After the detected voltage and current are separated into the positive and negative-sequence components in an operation means 20a in the device according to seventh embodiment, since those positive and negative-sequence components are converted into a synchronous rotatory coordinate system, it is possible to control the generation of twice-frequency pulsation with respect to the frequency of the alternating current power system 1 which is generated when conversion is performed to a synchronous rotatory coordinate system without separating the values into positive and negative-sequence components. Thus since it is not longer necessary to use a filter which cuts the twice-frequency pulsation, it is possible to avoid phase delay which is generated as a result of the filter and to improve the phase characteristics of the control system.

Furthermore since the phase θ of the voltage of the alternating current power system 1 is calculated based on the voltage of the positive-sequence component Vpα, Vpβ, it is possible to calculate the phase θ of the voltage of the alternating current power system 1 by the calculated voltage phase based on the voltage value in which positive and negative-sequence are mixed.

In addition since zero is respectively output from the instruction value generation means 30 as a current instruction value of the negative-sequence component of the d axial component and the q axial component, the generation of negative-sequence current is suppressed and the detected current of the line can maintained in a state of balance even in a situation where the negative-sequence current is suppressed to zero and the voltage is unsymmetrical. Also when the voltage is unsymmetrical in a conventional two-axis current control system, unsymmetrical or excessive current may sometimes occur, however in the present device the generation of such current is suppressed. In other words, the proportion of the positive-sequence component of the current is increased and the instantaneous value of power due to negative-sequence current and positive-sequence voltage approaches zero, due to setting the negative-sequence current instruction value to zero. Since instantaneous power value of the positive-sequence current and negative-sequence voltage does not pulsate, it is possible to suppress the generation of pulsation in the instantaneous power values which are synthesized with such powers. As may be understood from the simulation discussed above, since the instantaneous value of the direct current power system and that of the alternating current power system are the same, the generation of pulsation in the direct current may be suppressed. Thus the capacity of the direct current capacitor which is provided in the direct current power system is reduced.

Eighth Embodiment

Figure 27:
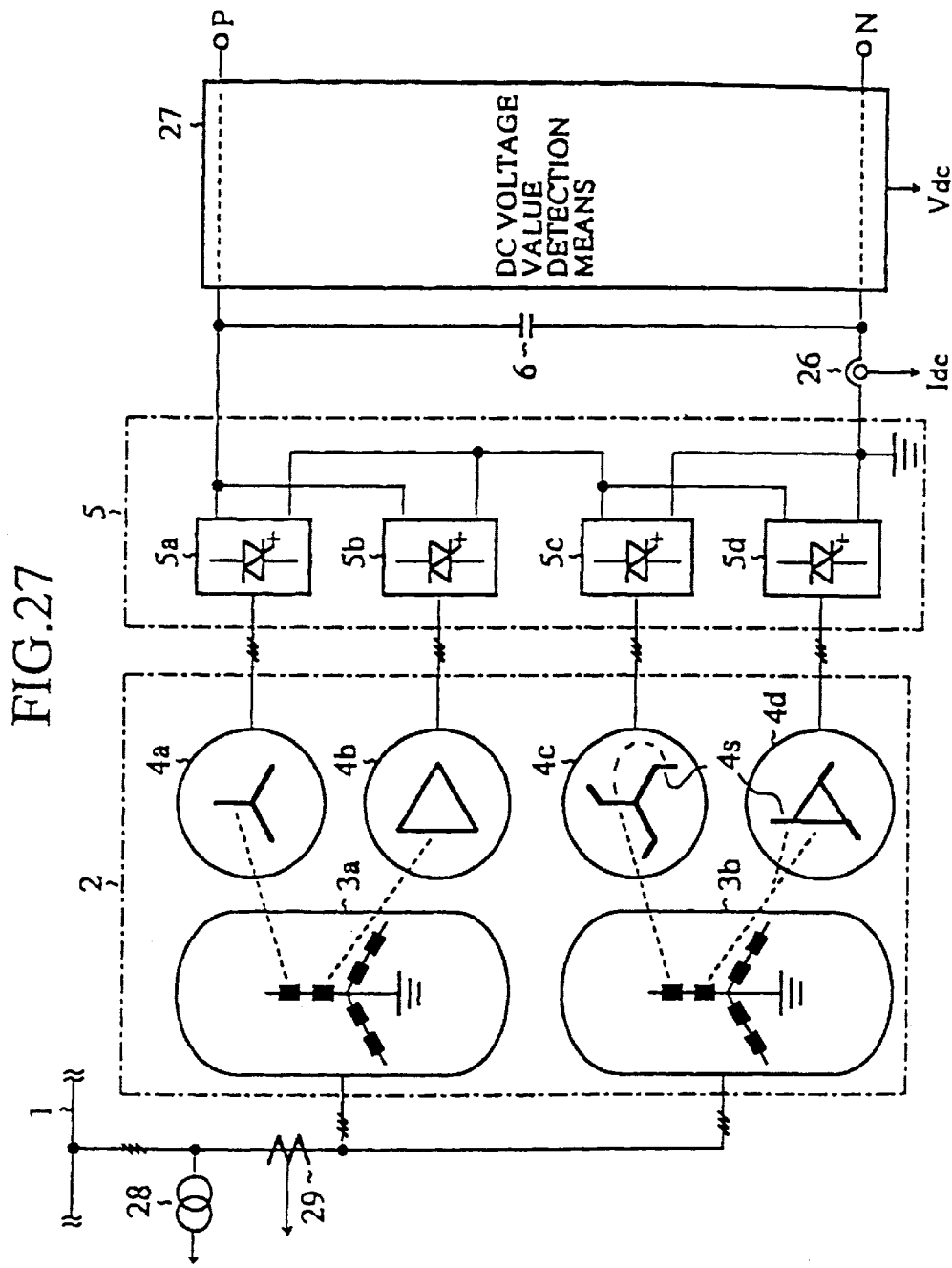
FIG. 27 is a diagram showing both the power conversion device and transformer in a power conversion apparatus according to an eighth embodiment of the present invention.

FIG. 27 shows a power conversion section 5 and a transformer 2 in a power conversion apparatus according to eighth embodiment of the present invention. In the figure, 2 is a transformer which has primary windings 3a, 3b in which two windings are connected in series with respect to one phase and which are star connected, a secondary winding 4a which is star connected respectively with respect to one of the windings of each phase of the primary winding 3a, a secondary winding 4b which is delta connected with respect to the other winding of each phase of the primary winding 3a, a secondary winding 4c which is star connected respectively with respect to one of the windings of each phase of the primary winding 3b, and a secondary winding 4d which is delta connected with respect to the other winding of each phase of the primary winding 3b. A phase winding 4s is provided on the secondary windings 4c, 4d in the transformer 2.

5 is a 24 phase power conversion section which has power converters 5a–5d which are connected to the secondary windings 4a–4d. The direct current terminals of the power converter 5a, 5b are connected in parallel series and the direct current terminals of the power converter 5c, 5d are connected in parallel series.

The secondary windings 4c, 4d of the transformer 2 have a phase difference of 15 degrees with the secondary windings 4a, 4b with respect to the operational phase difference of the transformers 5a–5d which convert power and are in 24 phase configuration. In this case, the power of each power transformer is equal, the respective direct currents which are input into the power transformers 5a, 5b are mutually equal. Furthermore the respective direct currents which are input into the power transformers 5c, 5d are mutually equal. Since the direct current terminals are connected in parallel series, it is obvious that the sum of the direct current value of the transformers 5a, 5b is equal to that of the direct current value of the transformers 5c, 5d. Since the power of each transformer is equal as shown above, the direct current is balanced and the balance characteristics of the direct current voltage are improved. Other elements are the same as those in seventh embodiment and so their explanation will be omitted.

The operation of the invention will now be explained.

The transformer 5a–5d performs power conversion on 24 phases and outputs voltage and current at each phase to the secondary windings 4a–4d. When power is transmitted to the primary windings 3a, 3b from the secondary windings 4a–4d of the transformer 2, the voltage and current on 24 phases are converted to three-phase.

As shown above, according to eighth embodiment, even when the transformers 5a, 5b and the transformers 5c, 5d are simply connected in parallel series, the problem of asymmetry in the direct current voltage applied to the transformers 5a, 5b and in the direct current voltage applied to the transformers 5c, 5d does not particularly arise. Furthermore since the primary windings 3a, 3b of the transformer 2 are connected in parallel series, asymmetry occurring in the direct current voltage applied to the transformers 5a, 5b and in the direct current voltage applied to the transformers 5c, 5d can be suppressed.

Thus even in a situation where the alternating current power system is in a state of unbalance, the direct current voltage applied to the transformers 5a, 5b and the direct current voltage applied to the transformers 5c, 5d remain in a state of balance. In this way, since the direct current voltage applied to the electrical transformer connected in parallel series is maintained in balance, the power conversion apparatus is adapted to use in self-exciting DC power devices.

Further a phase winding 4s may be added to the secondary windings 4c, 4d to which the transformer, which is connected to the low voltage side of the DC voltage is joined. Thus insulation with respect to the high voltage side is a simple star-delta winding, and the phase winding 4s which is difficult to form on the insulation may be formed on the direct current low voltage side. As a result, since the insulation coordination is simple, the device is adapted for use in direct current devices of high voltages.

Ninth Embodiment

Figure 28:
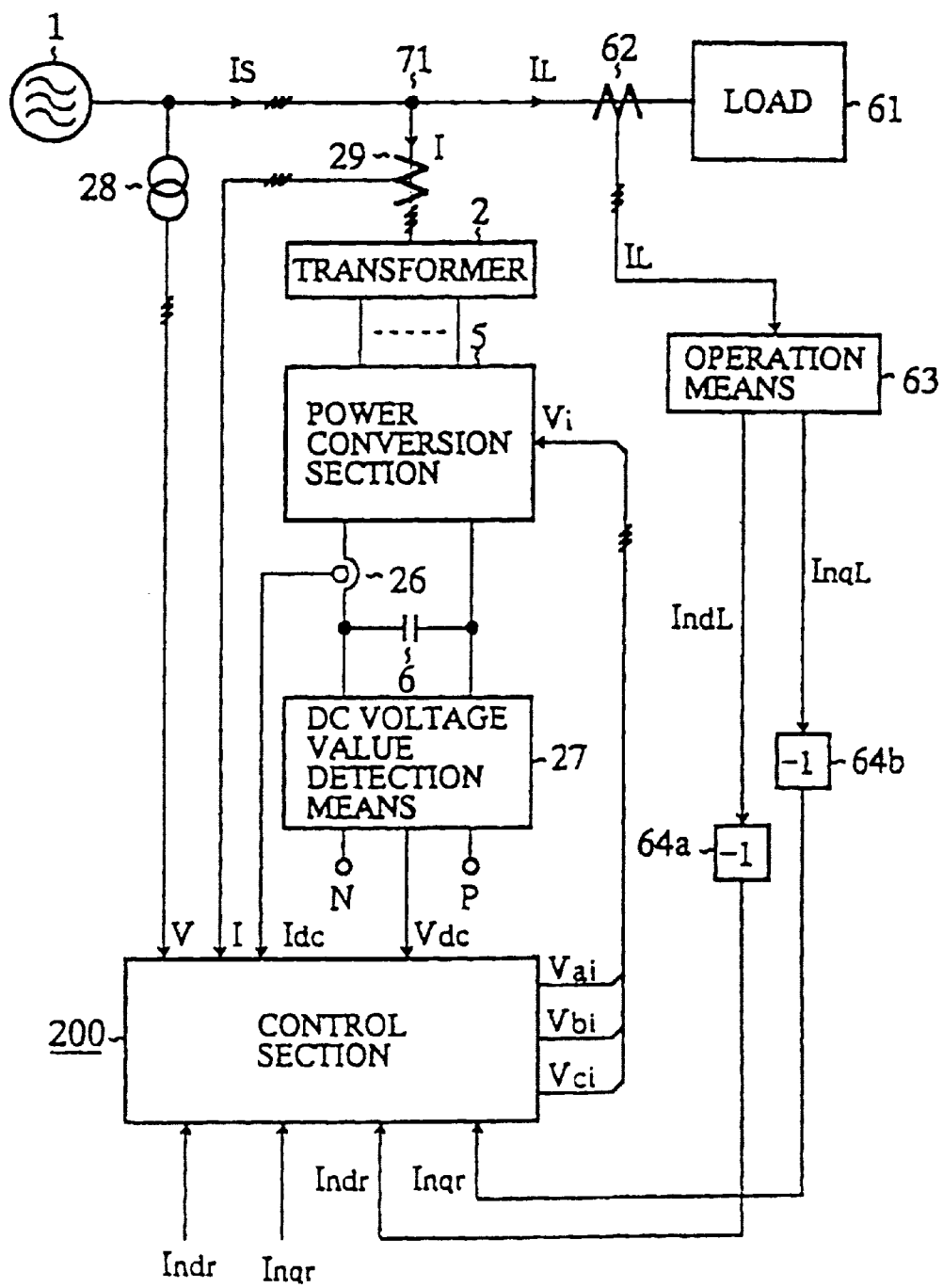
FIG. 28 is a diagram showing a power conversion apparatus according to a ninth embodiment of the present invention.

FIG. 28 shows a power conversion apparatus according to ninth embodiment of the present invention. In the figure, 61 is a load such as an arc electric furnace or an AC electric railway for example which is sometimes in a state of unbalance. 62 is a current value detection means which detects a current IL which is input into the load 61. 63 is an operation means which calculates a negative-sequence component of a d axial component IndL and a q axial component InqL, from the current value IL which is input into the load 61 which is detected by the current value detection means 62. 64a, 64b are sign reversing means which output a supplied value, the sign of which has been reversed.

29 is a current value detection means which detects a value of a current flowing in a connecting line from a branch point 71 to a transformer 2. 62 is a current value detection means which detects a current value input into the load 61. 63 is an operation means which calculates the negative-sequence components of the d axial component IndL and the q axial component InqL from the current value IL which is input into the load 61 and detected by the current value detection means 62. The operation means 63 outputs the result to the sign reversal means 64a, 64b. The sign reversal means 64a, 64b reverse the sign of the signal of the value of the negative-sequence components of the d axial component IndL and the q axial component InqL output by the operation means 63. In the power conversion apparatus according to ninth embodiment, the value from the sign reversing means 64a, 64b is used rather than the current instruction value generated from the instruction value generation means 30 of the control section 200. Other elements are the same as those in eighth embodiment and such explanation will be omitted.

The operation of the invention will now be explained.

The operation means 63 calculates a negative-sequence component of a d axial component IndL and a q axial component InqL, from the current value IL which is input into the load 61 and which is detected by the current value detection means 62. The respective values are output to the sign reversing means 64a, 64b.

The sign reversing means 64a, 64b supply a sign reversed value (−IndL, −InqL) of the respectively supplied negative-sequence components of the d axial component IndL and the q axial component InqL to the control section 200 as a negative-sequence component of a d axial component of an instruction value Indr and a q axial component of an instruction value Inqr.

The control section 200 makes the negative-sequence component of the current I input into the transformer 2 a sign reversed value (−IndL, −InqL) of the current IL input into the load 61.

As shown above, according to ninth embodiment, since the negative-sequence component of the current I input into the transformer 2 is suppressed to a sign reversed value of the negative-sequence component of the current IL input into the load 61, the negative-sequence component of the current input into the power conversion apparatus and the load 61 is cancelled out. As a result, the effect is achieved that the negative-sequence component of the current Is of the alternating current power system 1 is suppressed to almost zero.

At this time, the instruction values Ipdr, Ipqr of the positive-sequence component of the current are set to zero. By doing so, consumption of power by the positive-sequence component of the power conversion apparatus is not necessary.

Furthermore in connection with another purpose, when the reactive electric power of the alternating current voltage or the direct current voltage are suppressed, the positive-sequence components of the instruction value Ipdr, Ipqr may be appropriately supplied to the control section 200 as in seventh embodiment.

Tenth Embodiment

Figure 29:
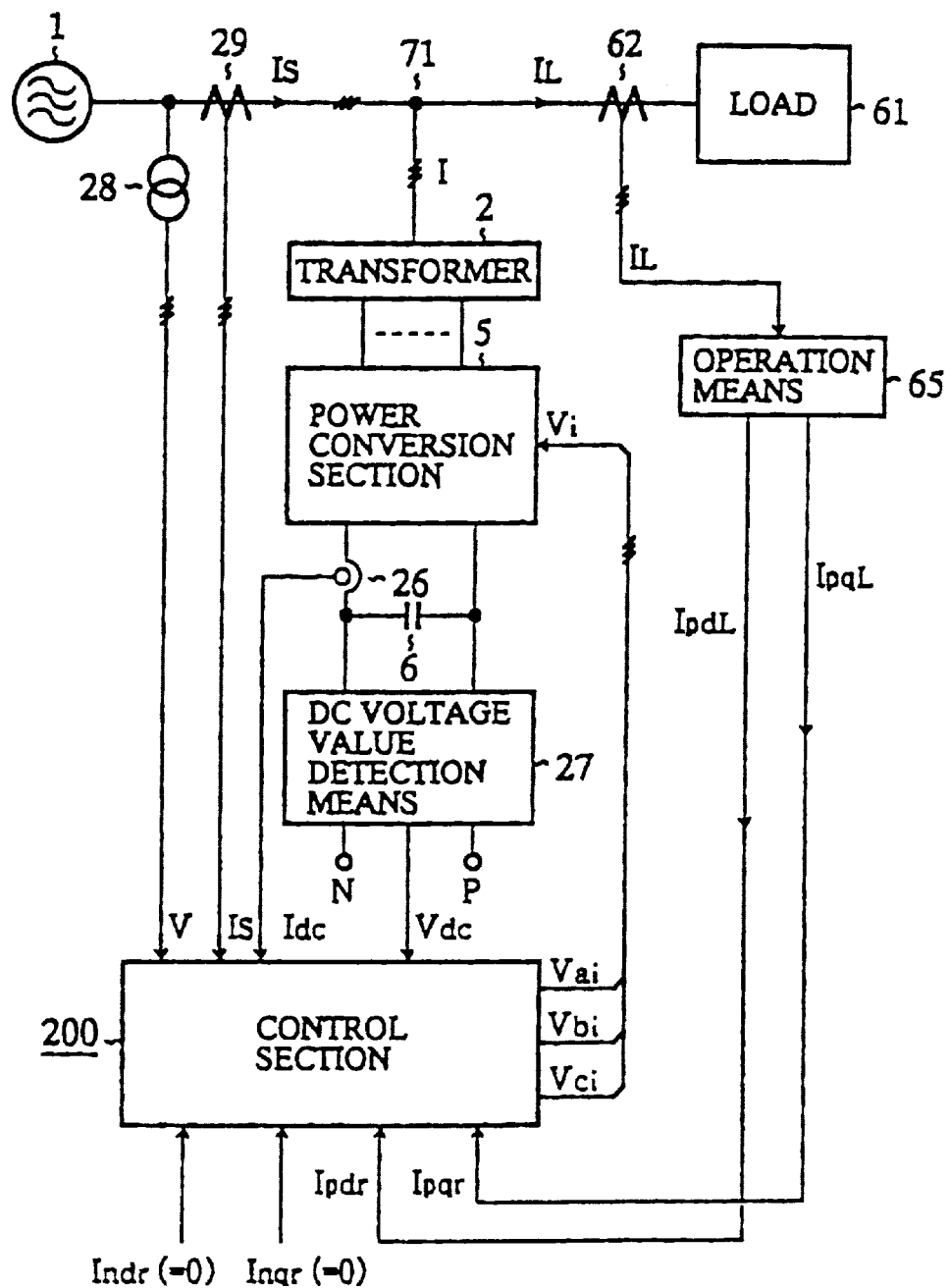
FIG. 29 is a diagram showing a power conversion apparatus according to a tenth embodiment of the present invention.

FIG. 29 shows a power conversion apparatus according to tenth embodiment of the present invention. In the figure, 65 is a calculation section which calculates the positive-sequence component of the d axial component IpdL and the q axial component IpqL, detected by the current value detection means 62, from the current IL input into the load 61. The operation section 65 supplies the positive-sequence component of the d axial component Ipdr and the q axial component Ipqr to the control section 200. The negative-sequence component of the d axial component of the instruction value Indr and the q axial component of the instruction value Inqr which are supplied to the control section 200 are set to zero.

29 is a current value detection means which detects a value of a current flowing in the connecting line from a branching point 71, which is situated with the line to the transformer 2 and the line to the load 61, to the alternating current power system 1.

In the power conversion apparatus according to tenth embodiment, the value from the operation means 65 or the like is used rather than the current instruction value generated from the instruction value generation means 30 of the control section 200. Other elements are the same as those in ninth embodiment and so such explanation will be omitted.

The operation of the invention will now be explained.

The operation means 65 calculates the positive-sequence component of the d axial component IpdL and the q axial component IpqL, detected by the current value detection means 62, from the current IL input into the load 61 and supplies the positive-sequence component of the d axial component Ipdr and the q axial component Ipqr to the control section 200.

The control section 200 controls the negative-sequence component of the current Is input into the branching point 71 to zero and the positive-sequence component of the current Is input into the load 61 to the same value (IpdL, IpqL).

As shown above, according to tenth embodiment, the negative-sequence component of the current Is input into the branching point 71 is suppressed to zero and the positive-sequence component of the current Is input into the load 61 is suppressed to the same value as the positive-sequence component of the current IL input into the load 61. Thus the effect is achieved that it is possible to suppress the total of the negative-sequence components of the current IS input into the power conversion apparatus and the load 61 from the alternating current power system 1 to roughly zero.

Eleventh Embodiment

Figure 30:
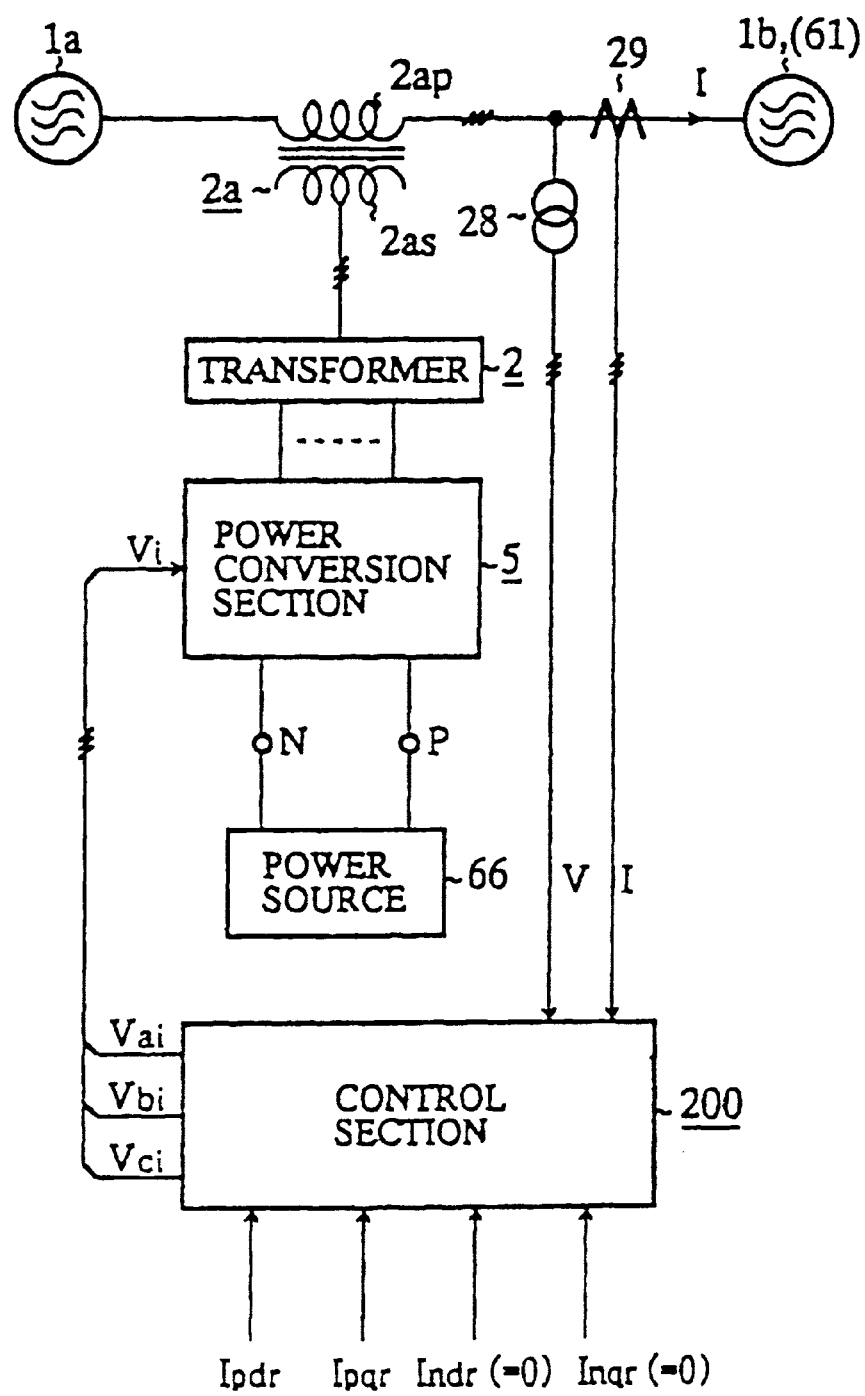
FIG. 30 is a diagram showing a power conversion apparatus according to an eleventh embodiment of the present invention.

FIG. 30 shows a power conversion apparatus according to eleventh embodiment of the present invention. In the figure, 2a is a transformer which is connected in sequence between the power system (first power system) 1a and for example a power system on the load side (second power system) 1b which contains a load 61. Primary windings Zap are inserted in sequence in the connecting line with the power systems 1a, 1b. Secondary windings 2 as are connected primary windings of the electrical converter 2.

28 is a voltage value detection means which detects a voltage value of a line between a transformer 2a and an power system on the load side 1b. 29 is a current detection means which detects a current value flowing in a line between a transformer 2a and an power system on the load side 1b.

66 is a power source for example a secondary battery, a superconductivity energy accumulator, a flywheel energy accumulator, an electrical double layer field capacitor or the like which is connected to the direct current system side of the power conversion apparatus. In addition another direct current system may be connected instead of the power source 66.

In the power conversion apparatus according to eleventh embodiment, the value from the outside is used instead of the current instruction value generated from the instruction value generation means 30 of the control section 200. Furthermore the negative-sequence component of the current instruction value Indr, Inqr is set to zero. Other components of the embodiment are the same as those in seventh embodiment and thus such explanation will be omitted.

The operation of the invention will now be explained.

During normal performance, the flow of the power between each power system 1a, 1b and the power source 66 is appropriately executed depending on the positive-sequence component of the current instruction value Ipdr, Ipqr. On the other hand, when for some reason, the voltage in the line between the power system 1a and the transformer 2a is in a state of unbalance, the control section 200 normally controls the power conversion apparatus 5 so that the negative-sequence component of the current flowing in the line between the power system 1b on the load side and the transformer 2a becomes zero. Thus the power conversion apparatus generates a voltage which eliminates the negative-sequence component of the voltage generated by the power system 1a as a result of the negative-sequence component of the voltage generated by the transformer 2a. As a result the voltage of the line on the load side of the electrical power system 1b is maintained in balance.

As shown above, according to eleventh embodiment, it is possible to control the generation of unsymmetrical current and unsymmetrical voltage in an electrical power system on the load side 1b by executing control based on inserting a transformer 2a between an power system 1a and an electrical power system 1b on the load side and by controlling the voltage value and current value of a line between the transformer 2a and the electrical power system 1b on the load side.

Needless to say, as shown in FIGS. 29 and 30, the configurations of both first and second embodiments may be used in the same way as seventh embodiment.

Twelfth Embodiment

In a power conversion section 5, it is often the case that the relationship between the instruction voltage and the voltage actually output, in particular the fundamental wave voltage of the voltage generated to the AC power system is not linear. For example, there is non-linearity which accompanies PWM modulation. When the degree of modulation increases because the fundamental wave output voltage has increased, saturation characteristics appear in the output voltage as non-linear characteristics. In addition, while satisfying the conditions to suppress high frequency waves, non-linearity is generated when the fundamental wave output voltage varies.

Figure 31:
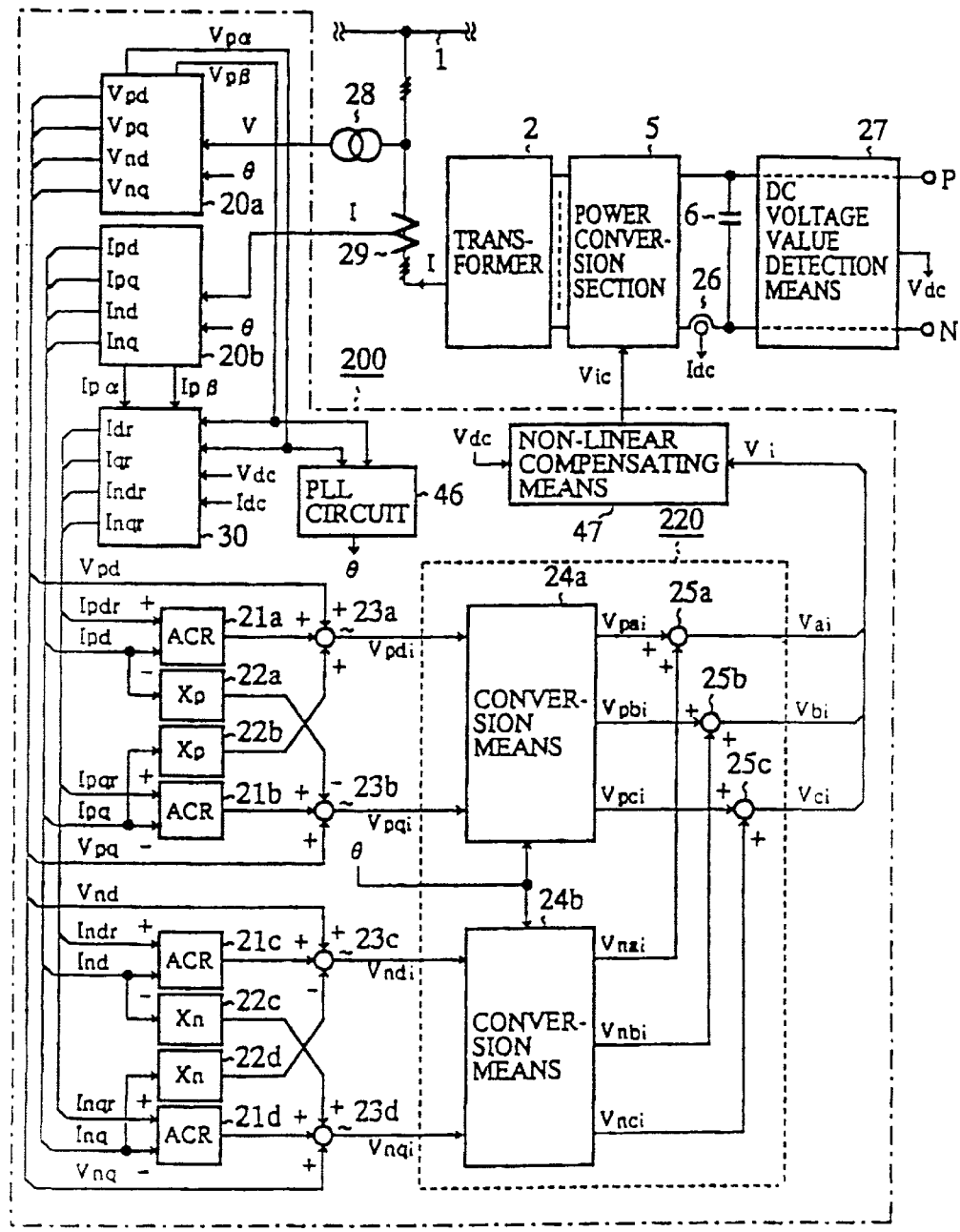
FIG. 31 is a diagram showing a power conversion apparatus according to a twelfth embodiment of the present invention.
Figure 32:
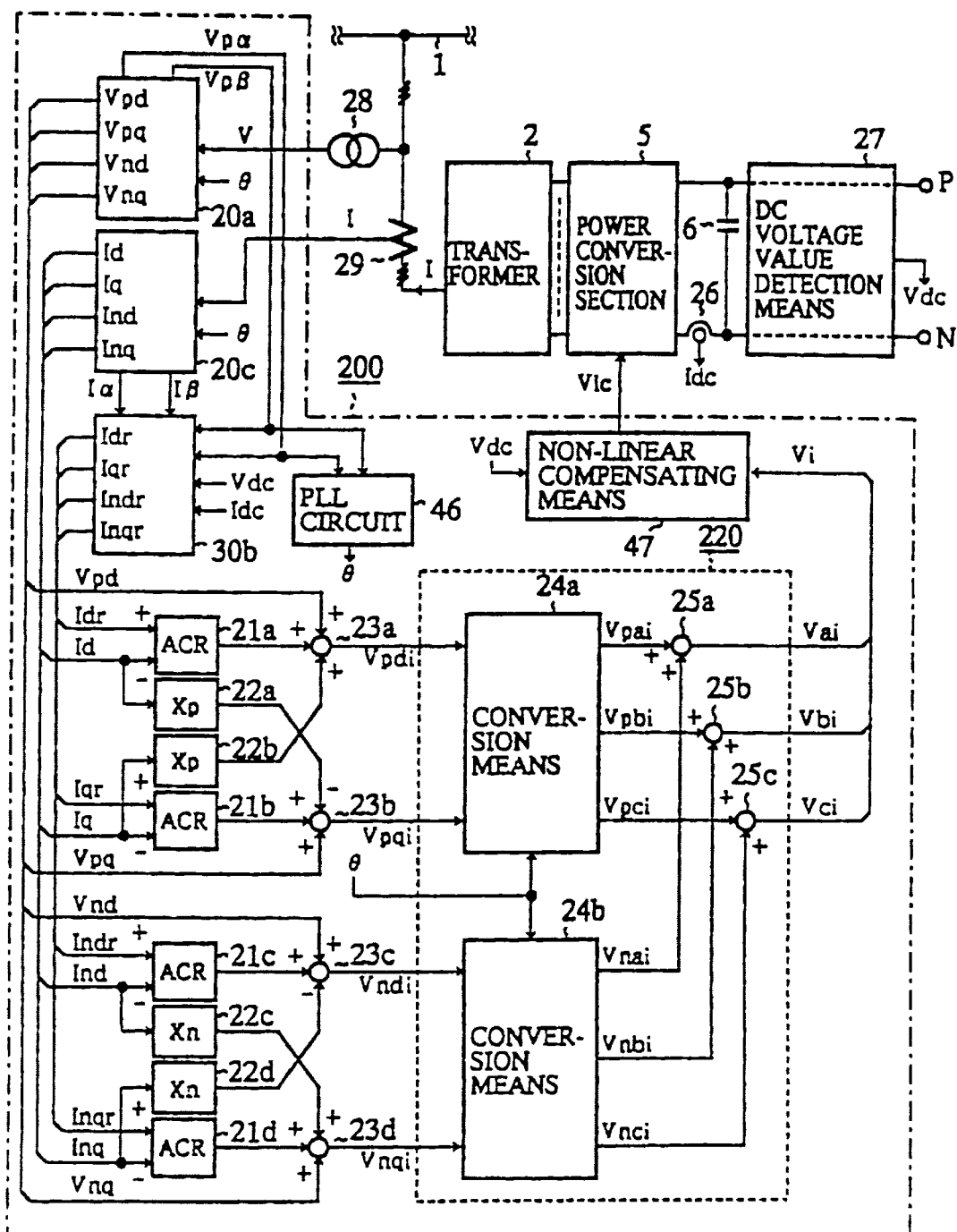
FIG. 32 is a diagram showing a power conversion apparatus according to the twelfth embodiment of the present invention.

FIGS. 31 and 32 show a power conversion apparatus according to twelfth embodiment of the present invention. The power conversion apparatus shown in FIG. 31 represents an improvement on the device according to seventh embodiment (refer to FIG. 20) since it reduces the influence due to non-linearity as discussed above. Similarly the power conversion apparatus shown in FIG. 32 is an improvement on the power conversion apparatus according to first embodiment (refer to FIG. 5).

In FIGS. 31 and 32, 47 is a non-linear compensation means which receives each phase voltage instruction value (Vai, Vbi, Vci) output from the circuit 220, calculates a voltage instruction value Vic which compensates the voltage instruction value Vi based on the non-linear relationship discussed above and which supplies the voltage instruction value Vic to the power conversion section 5. The non-linear compensation means 47 calculates and outputs a voltage instruction value Vic to the power conversion means 5 so that for example when the saturation characteristics due to modulation are the cause of non-linearity, the size of the voltage instruction value Vic actually output increases with the size of the amplitude of the voltage instruction value Vi.

When executing the compensation of complex non-linearity, a table in which the relationship between direct current voltage Vdc and desired alternating current voltage is calculated beforehand is stored in a ROM (read only memory) or the like. Thus depending on the value of direct current voltage, the non-linear compensation means 47 reads and outputs those voltages which should be output from the ROM.

As shown above, according to twelfth embodiment of the present invention, voltage feed-forward (the positive-sequence voltage components and negative-sequence voltage components Vpd, Vpq, Vnd, Vnq are fed forwardly to the addition/subtraction means 23a, 23b, 23c, 23d), it is possible to reduce errors which the power conversion section 5 actually generates in the fundamental wave voltage of the voltage generated to the alternating current power system. In addition, it is possible to suppress the current fluctuations such as over current when the system is out of order.

The negative-sequence current may be simply put to zero and so when it is not necessary to control the negative-sequence components of the voltage, the current component control means 21c, 21d for the negative-sequence current components may be omitted. In that case, since the negative-sequence components generated by the power conversion apparatus to the alternating current power system 1 equals the negative-sequence voltage of the alternating current power system depending on the negative-sequence voltage Vnd, Vnq which is fed forwardly, the negative-sequence current may be controlled to approximately zero.

Furthermore according to twelfth embodiment, since the voltage instruction value Vic which compensates for the non-linearity and which is calculated from each phase voltage instruction value Vi output from the circuit 220, is supplied to the power conversion section 5, it is possible to reduce the difference between the instruction value and the actually generated voltage value. Thus it is possible to reduce current fluctuations such as over current for example when the system is out of order. Furthermore since it is possible to suppress the negative-sequence components of the current even without performing feedback control for negative-sequence current components, it is possible to simplify the circuit.

Furthermore a pulse signal which deals with non-linearity may be supplied by reading the PWM modulation on the non-linearity compensation means 47 and outputting such a signal as a voltage instruction value Vic, or as a PWM modulation signal which ON-OFF controls the switching elements of the power conversion section 5.

As described above in detail, the present invention is provided with a current value detection means which detects a value of a current of each phase which is input from a first power system or output from a first power system, and a current component control section which converts alternating current components detected by a current value detection means into positive-sequence components of a synchronous rotatory coordinate system (or a synchronous rotating reference frame) and which converts the negative-sequence components of the alternating current component of the current value into a synchronous rotatory coordinate system and which adds the alternating current component to a fixed instruction value after conversion, which generates a control signal which limits the negative-sequence components based on the negative-sequence components and the alternating current component after conversion and which outputs the value to the power conversion section. Thus the negative-sequence components of the power system are suppressed and it is possible to improve electrical conversion between the electrical system.

According to the present invention, the current component control section as regards the negative-sequence components, is adapted to generate a control signal which damps the twice-frequency components in the negative-sequence components of a synchronous rotatory coordinate system in which the positive-sequence components are mixed. Thus the negative-sequence components of the power system are suppressed by a simple device and it is possible to accurately control the power system and reduce the manufacturing costs of the device.

The current component control means present invention is provided with a synchronous rotatory coordinate transformation means which calculates the d axial component and q axial component in a synchronous rotatory coordinate system of a current value detected by the current value detected means, a negative-sequence components coordinate transformation means which calculates an alternating current negative-sequence component of an alternating current value detected by the current value detection means and which thereafter calculates the d axial component and q axial component in the negative-sequence components a synchronous rotatory coordinate system, a control signal operation means which compares the d axial component and q axial component of the negative-sequence components and the d axial component and q axial component in a synchronous rotatory coordinate system with the fixed current component instruction value for each component and which outputs the result of the comparison using the desired transmission characteristics, and a transformation means which rotates the first vector comprising the comparison result of the q axial component and the comparison result of the d axial component with respect to the synchronous rotatory coordinate system detected by the control signal operation means. The transformation means which rotates the second vector comprising the comparison result of the q axial component and the comparison result of the d axial component with respect to the negative-sequence components. These two vectors are respectively rotated in the reverse direction to each other by a phase which varies depending on a fixed angular speed. The transformation means as calculating means converts the vectors respectively to control signals which correspond to each phase of the first power system and outputs the result to the power conversion section. Thus it is possible to simplify the structure of the calculation circuit which calculates the current value of the negative-sequence components. At the same time, the manufacturing costs of the device can be reduced. Furthermore it is possible to reduce the calculation or response delay by the calculation circuit of the negative-sequence component current and to reduce the influence of delays in the negative feed back system of the current.

Since the present invention sets current component instruction values, which correspond to negative-sequence components, to zero, it is possible to make the negative-sequence current which is input from the first power system and output to the first power system equal to zero. In this case, the instantaneous value of the power of the negative and positive phase current becomes zero and since no pulsation is generated in the instantaneous power value by the negative and positive phase current, the generation of pulsation in instantaneous power value is controlled thereby.

In addition, the instantaneous power in the first and second power systems is normally equal as regards the power conversion section in the power conversion apparatus, it is possible to control the generation of pulsation of direct current in the second power system which is the direct current system. As a result, it is possible to employ a small capacity direct current capacitor for smoothing which is provided in the second power system which is the direct current power system.

The present invention is provided with a direct current value operation means which detects a current value in the second power system which is the direct power system, a direct current voltage detection means which detects the voltage value of the second power system, and an instruction value generation means which generates a current component instruction value based on the voltage value detected by the direct current voltage value detection means and the current value detected by the direct current value detection means. Thus it is possible to execute power conversion and to maintain the voltage and current of the second power system which is the direct current power system in an improved state.

The current component control means present invention is provided with a voltage detection means which detects a voltage of the alternating current power system and a two-axis voltage vector operation means which calculates a two-axis voltage vector which is comprised of a d axis component and a q axis component in a positive phase direction of a synchronous rotatory coordinate system from the detected output of the voltage value detection means. Since the two-axis voltage vector is added to the first vector even when the voltage of the power system is unbalanced, it is possible to suppress the negative-sequence current of the line in which current is detected and which controls feedback. Furthermore since it is possible to omit the calculation of the negative-sequence components and the positive-sequence components of the voltage, it is possible to reduce the response delay of the calculation.

The present invention is provided with a current value detection means which detects a current value of each phase which is input from a first power system or output to a first power system, a operation means which calculates negative and positive-sequence components of a current in a first power system from a current value which is detected by a current value detection means, a separation means which respectively separates the negative and positive-sequence components calculated by the operation means into d axis components and q axis components in respectively positive and negative-sequences in a synchronous rotatory coordinate system, a control signal operation means which compares the d axis components and q axis components of the positive-sequences and the d axis components and q axis components of the negative-sequences respectively with the fixed current component instruction value which corresponds with each d axis component and q axis component and which outputs the result of the comparison using fixed transmission characteristics and a transformation means as a calculating means which rotates the first vector comprising the comparison result of the q axial component and the comparison result of the d axial component of the positive-sequence component with respect to the synchronous rotatory coordinate system detected by the control signal operation means. The transformation means as calculating means which rotates the second vector comprising the comparison result of the q axial component and the comparison result of the d axial component with respect to the negative-sequence components. These two vectors are respectively rotated in the reverse direction to each othe by a phase which varies depending on a fixed angular speed. The conversion means converts the vectors respectively to control signals which correspond to each phase of the first power system and outputs the result to the power conversion section. Thus it is possible to suppress the generation of negative-sequence components of the current based on the power instruction value even when the voltage of the power system is not in balance and to convert the power of the system in an improved manner.

While the above provides a full and complete disclosure of the preferred embodiments of the present invention, various modifications, alternate constructions and equivalents may be employed without departing from the scope of the invention. Therefore the above description and illustration should not be construed as limiting the scope of the invention, which is defined by the appended claims.

What is claimed is:

1. A power conversion apparatus which converts power between a first multiple-phase AC power system and a second power system using a power converter circuit connected between AC terminals of said first AC power system and terminals of said second power system, wherein said power conversion apparatus comprises:

current detecting means for detecting an AC current of each phase of multiple-phase AC lines connected between the AC terminals of said power converter circuit and the AC terminals of said first multiple-phase AC power system, for detecting an AC current input from said first multiple-phase AC power system to said power converter circuit or output from said power converter circuit to said first multiple-phase AC power system;

first coordinate transformation means for transforming the AC current from a stationary reference frame to a first d-q axis component on a positive-sequence synchronously rotating reference frame;

second coordinate transformation means for transforming a negative-sequence component of the AC current from the stationary reference frame to a second d-q axis component on a negative-sequence synchronously rotating reference frame;

first current control means for controlling the first d-q axis component on the positive-sequence synchronously rotating reference frame by comparing the first d-q axis component and a positive-sequence component command;

second current control means for controlling the second d-q axis component on the negative-sequence synchronously rotating reference frame by comparing the second d-q axis component and a negative-sequence component command; and control signal generating means for generating a control signal to control said power converter circuit based on outputs of said first and second current control means, wherein the positive-sequence component of the AC current is controlled at a high speed and a negative-sequence component of the AC current is controlled at a low speed.

2. The power conversion apparatus according to claim 1, further comprising eliminating means having an input supplied from said second coordinate transformation means for decreasing a doubled frequency component proportional to the positive-sequence component of the AC current and mixed with the output of said second coordinate transformation means, wherein, by operation of said eliminating means, the doubled frequency component is decreased and the output of said second coordinate transformation means is selectively obtained.

3. The power conversion apparatus according to claim 2, wherein said eliminating means includes moving average calculating means calculating a moving average value of the output of said second coordinate transformation means according to a moving time interval with a time interval of one-half cycle of the AC current.

4. The power conversion apparatus according to claim 2, wherein said eliminating means comprises at least one signal delaying means delaying the output of said second coordinate transformation means; and adding means for adding the delayed output of said signal delaying means and the output of said second coordinate transformation means.

5. The power conversion apparatus according to claim 1, wherein said second coordinate transformation means comprises:

first calculating means for obtaining a negative-sequence component of the AC current on the stationary reference frame; and second calculating means for transforming the negative-sequence component obtained by said first calculating means into the second d-q axis component on the synchronously rotating negative-sequence reference frame.

6. The power conversion apparatus according to claim 2, wherein said control signal generating means has a vector rotating means for rotating a first vector of output by said first current control means and for rotating a second vector of output by said second current control means for generating the control signal to control said power converter circuit based on the first and second vectors.

7. The power conversion apparatus according to claim 5, wherein said control signal generating means has a vector rotating means for rotating a first vector of output by said first current control means and for rotating a second vector of output by said second current control means for generating the control signal to control said power converter circuit based on the first and second vectors.

8. The power conversion apparatus according to claim 1, wherein the negative-sequence component command is designated as zero.

9. The power conversion apparatus according to claim 6, wherein the negative-sequence component command is designated as zero.

10. The power conversion apparatus according to claim 1, further comprising:
    AC voltage detecting means for detecting an AC voltage on AC lines of said first multiple-phase AC power system;
    third coordinate transformation means for transforming the AC voltage detected from the stationary reference frame to a third d-q axis component on the positive-sequence synchronously rotating reference frame; and
    voltage feed-forward means for adding an output vector of said third coordinate transformation means and an output vector of said first current control means, wherein a fluctuation of the AC current occurs due to decreasing of the AC voltage of said first multiple-phase AC power system.

11. The power conversion apparatus according to claim 8, further comprising:
    AC voltage detecting means for detecting an AC voltage on AC lines of said first multiple-phase AC power system;
    third coordinate transformation means for transforming the AC voltage detected from the stationary reference frame to a third d-q axis component on the positive-sequence synchronously rotating reference frame; and
    voltage feed-forward means for adding an output vector of said third coordinate transformation means and an output vector of said first current control means, wherein a fluctuation of the AC current occurs due to decreasing of the AC voltage of said first multiple-phase AC power system.

12. The power conversion apparatus according to claim 1, wherein said second power system consists of a DC power system, and said power converter apparatus further comprises:
    DC current detecting means for detecting DC current of a DC line connecting said DC power system and said power converter circuit;
    DC voltage detecting means for detecting DC voltage of a DC line connecting said DC power system and said power converter circuit; and
    command generating means for generating at least the positive-sequence component command based on at least one of the DC current detected and the DC voltage detected.

13. The power conversion apparatus according to claim 10, wherein said second power system consists of a DC power system, and said power converter apparatus further comprises:
    DC current detecting means for detecting DC current of a DC line connecting said DC power system and said power converter circuit;
    DC voltage detecting means for detecting DC voltage of a DC line connecting said DC power system and said power converter circuit; and
    command generating means for generating at least the positive-sequence component command based on at least one of the DC current detected and the DC voltage detected.

14. The power conversion apparatus according to claim 1, further comprising:
    AC variable detecting means for detecting AC variables such as AC voltage, AC current, and AC power of an AC line connecting AC terminals of said power converter circuit and AC terminals of said first multiple-phase AC power source system; and
    command generating means for generating at least the positive-sequence component command based on the variables detected.

15. The power conversion apparatus according to claim 10, further comprising:
    AC variable detecting means for detecting AC variables such as AC voltage, AC current, and AC power of an AC line connecting AC terminals of said power converter circuit and AC terminals of said first multiple-phase AC power source system; and
    command generating means for generating at least the positive-sequence component command based on the variables detected.

16. A power conversion apparatus which converts power between a first multiple-phase AC power system and a second power system using a power converter circuit comprising switching means connected between AC terminals of said first multiple-phase AC power system and terminals of said second power system, wherein said power conversion apparatus comprises:
    current detecting means for detecting an AC current of each phase of multiple-phase AC lines connected between the AC terminals of said power converter circuit and the AC terminals of said first multiple-phase AC power system, for detecting an AC current input from said first multiple-phase AC power system to said power converter circuit or output from said power converter circuit to said first multiple-phase AC power system;
    calculating and transformation means for calculating a positive-sequence component and a negative-sequence component of the AC current in said first multiple-phase AC power system based on the AC current detected by said current detecting means, for transforming the positive-sequence component and the negative-sequence component into positive-sequence and negative-sequence d-q components on positive-sequence and negative-sequence synchronously rotating frames;
    first current control means for controlling the d-q axis component on the positive-sequence synchronously rotating reference frame by comparing the d-q axis component with a positive-sequence component command;
    second current control means for controlling the d-q axis component on the negative-sequence synchronously rotating reference frame by comparing the d-q axis component with a negative-sequence component command; and control signal generating means having a vector rotating means for rotating, in opposite directions, a first vector and a second vector obtained based on the comparison of the d-q axis components on the positive-sequence and negative-sequence synchronously rotating reference frames, respectively, by a phase to be changed and corresponding to an angular velocity, and for generating a control signal for controlling said power converter circuit based on rotation.

17. The power conversion apparatus according to claim 16, wherein the negative-sequence component command is designated as zero.

* * * * *